United States Patent
Sugio et al.

(10) Patent No.: US 9,161,036 B2
(45) Date of Patent: Oct. 13, 2015

(54) IMAGE DECODING METHOD AND IMAGE DECODING APPARATUS

(71) Applicant: Panasonic Intellectual Property Corporation of America, Torrance, CA (US)

(72) Inventors: Toshiyasu Sugio, Osaka (JP); Takahiro Nishi, Nara (JP); Youji Shibahara, Osaka (JP); Kyoko Tanikawa, Osaka (JP); Hisao Sasai, Osaka (JP); Toru Matsunobu, Osaka (JP); Kengo Terada, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/228,651

(22) Filed: Mar. 28, 2014

(65) Prior Publication Data

US 2014/0211857 A1 Jul. 31, 2014

Related U.S. Application Data

(63) Continuation of application No. PCT/JP2012/006005, filed on Sep. 21, 2012.

(60) Provisional application No. 61/543,365, filed on Oct. 5, 2011.

(51) Int. Cl.
*H04N 19/593* (2014.01)
*H04N 19/51* (2014.01)
(Continued)

(52) U.S. Cl.
CPC ... *H04N 19/00733* (2013.01); *H04N 19/00684* (2013.01); *H04N 19/51* (2014.11);
(Continued)

(58) Field of Classification Search
None
See application file for complete search history.

(56) References Cited

U.S. PATENT DOCUMENTS

2002/0118862 A1* 8/2002 Sugimoto et al. ............. 382/103
2007/0291846 A1* 12/2007 Hussain ................... 375/240.16
(Continued)

FOREIGN PATENT DOCUMENTS

WO 2012/057583 5/2012
WO 2012/177644 12/2012

OTHER PUBLICATIONS

Supplementary European Search Report issued Feb. 9, 2015 in corresponding European Patent Application No. 12837786.8.
(Continued)

*Primary Examiner* — Hung Dang
*Assistant Examiner* — Sunghyoun Park
(74) *Attorney, Agent, or Firm* — Wenderoth, Lind & Ponack, L.L.P.

(57) ABSTRACT

An image decoding method includes: dividing a current block into sub-blocks; deriving, for each sub-block, one or more prediction information candidates; obtaining an index; and decoding the current block using the prediction information candidate selected by the index. The deriving includes: determining whether a neighboring block neighboring each sub-block is included in the current block, and when not included in the current block, determining the neighboring block to be a reference block available to the sub-block, and when included in the current block, determining the neighboring block not to be the reference block; and deriving a prediction information candidate of the sub-block from prediction information of the reference block; and when the number of prediction information candidates is smaller than a predetermined number, generating one or more new candidates without using the prediction information of the reference block till the number of prediction information candidates reaches the predetermined number.

6 Claims, 49 Drawing Sheets

(51) Int. Cl.
*H04N 19/52* (2014.01)
*H04N 19/583* (2014.01)
*H04N 19/96* (2014.01)
*H04N 19/176* (2014.01)
*H04N 19/61* (2014.01)
*H04N 19/107* (2014.01)

(52) U.S. Cl.
CPC ............ *H04N 19/52* (2014.11); *H04N 19/593* (2014.11); *H04N 19/96* (2014.11); *H04N 19/107* (2014.11); *H04N 19/176* (2014.11); *H04N 19/61* (2014.11)

(56) References Cited

U.S. PATENT DOCUMENTS

| | | | | |
|---|---|---|---|---|
| 2010/0246675 | A1* | 9/2010 | Gharavi-Alkhansari et al. | 375/240.13 |
| 2012/0281752 | A1* | 11/2012 | Zheng et al. | 375/240.03 |
| 2013/0077691 | A1 | 3/2013 | Zheng et al. | |
| 2013/0215968 | A1 | 8/2013 | Jeong et al. | |

OTHER PUBLICATIONS

M. Zhou et al., "A study on HM3.0 parsing throughput issue", Joint Collaborative Team on Video Coding (JCT-VC) of ITU-T SG16 WP3 and ISO/IEC JTC1/SC29/WG11, 6$^{th}$ Meeting: Torino, IT, Jul. 14-22, 2011.

B. Bross et al., "BoG report of CE9: MV Coding and Skip/Merge operations", Joint Collaborative Team on Video Coding (JCT-VC) of ITU-T SG16 WP3 and ISO/IEC JTC1/SC29/WG11, 5$^{th}$ Meeting: Geneva, CH, Mar. 16-23, 2011.

Bin Li et al., "On merge candidate construction", Joint Collaborative Team on Video Coding (JCT-VC) of ITU-T SG16 WP3 and ISO/IEC JTC1/SC29/WG11, 5$^{th}$ Meeting: Geneva, CH, Mar. 16-23, 2011.

Yunfei Zheng, "Merge Candidate Selection in 2N×N, N×2N, and N×N Mode", Joint Collaborative Team on Video Coding (JCT-VC) of ITU-T SG16 WP3 and ISO/IEC JTC1/SC29/WG11, 6$^{th}$ Meeting: Torino, IT, Jul. 14-22, 2011.

International Search Report issued Dec. 25, 2012 in International (PCT) Application No. PCT/JP2012/006005.

"Advanced video coding for generic audiovisual services", Recommendation ITU-T H. 264, Mar. 2010.

Thomas Wiegand et al., "WD3: Working Draft 3 of High-Efficiency Video Coding", Joint Collaborative Team on Video Coding(JCT-VC) of ITU-T SG16 WP3 and ISO/IEC JTC1/SC29/WG11, JCTVC-E603, 5th Meeting: Geneva, CH, Mar. 16-23, 2011.

Minhua Zhou, "Parallelized merge/skip mode for HEVC", Joint Collaborative Team on Video Coding(JCT-VC) of ITU-T SG16 WP3 and ISO/IEC JTC1/SC29/WG11, JCTVC-F069, 6th Meeting: Torino, IT, Jul. 14-22, 2011.

Toshiyasu Sugio et al., "Parsing Robustness for Merge/AMVP", Joint Collaborative Team on Video Coding (JCT-VC) of ITU-T SG16 WP3 and ISO/IEC JTC1/SC29/WG11, JCTVC-F470, 6th Meeting: Torino, IT, Jul. 14-22, 2011.

Guillaume Laroche et al., "CE9: Description of experiments ROB01 and ROB02", Joint Collaborative Team on Video Coding (JCT-VC) of ITU-T SG16 WP3 and ISO/IEC JTC1/SC29WG11, JCTVC-F474, 6th Meeting: Torino, IT, Jul. 14-22, 2011.

Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d2, Ver.4, 6th Meeting: Torino, IT, Jul. 14-22, 2011.

* cited by examiner

Reference picture list 0

| Reference picture index 0 | Display order |
|---|---|
| 0 | 2 |
| 1 | 1 |
| 2 | 0 |

Reference picture list 1

| Reference picture index 1 | Display order |
|---|---|
| 0 | 1 |
| 1 | 2 |
| 2 | 0 |

FIG. 5

Size of merging block candidate list = 2

| Merging block candidate index | Assigned bit sequence |
|---|---|
| 0 | 0 |
| 1 | 1 |

Size of merging block candidate list = 3

| Merging block candidate index | Assigned bit sequence |
|---|---|
| 0 | 0 |
| 1 | 10 |
| 2 | 11 |

Size of merging block candidate list = 4

| Merging block candidate index | Assigned bit sequence |
|---|---|
| 0 | 0 |
| 1 | 10 |
| 2 | 110 |
| 3 | 111 |

Size of merging block candidate list = 5

| Merging block candidate index | Assigned bit sequence |
|---|---|
| 0 | 0 |
| 1 | 10 |
| 2 | 110 |
| 3 | 1110 |
| 4 | 1111 |

FIG. 14B

| Merging block candidate index | Merging block candidate |
|---|---|
| 0 | Neighboring block B(Prediction direction 1, (MvL1_B, RefL1_B)) |
| 1 | Co-located merge block(Bi-directional prediction, (MvL0_Col, RefL0_Col), (MvL1_Col, RefL1_Col)) |
| 2 | New candidate |

FIG. 14C

| Merging block candidate index | Merging block candidate |
|---|---|
| 0 | Prediction direction A(Prediction direction 0, (MvL0_A, RefL0_A)) |
| 1 | Co-located merge block(Bi-directional prediction, (MvL0_Col, RefL0_Col), (MvL1_Col, RefL1_Col)) |
| 2 | New candidate |

FIG. 14D

| Merging block candidate index | Merging block candidate |
|---|---|
| 0 | Co-located merge block(Bi-directional prediction, (MvL0_Col, RefL0_Col), (MvL1_Col, RefL1_Col)) |
| 1 | New candidate |

FIG. 26

| prediction_unit(x0, y0, log2PUWidth, log2PUHeight, PartIdx, InferredMergeFlag){ | Descriptor |
|---|---|
| if(skip_flag[x0][y0]){ | |
| merge_idx[x0][y0] | ue(v) \| ae(v) |
| } else if(PredMode == MODE_INTRA){ | |
| ... | u(1) \| ae(v) |
| } else {/* MODE_INTER */ | |
| if(!InferredMergeFlag) | |
| merge_flag[x0][y0] | u(1) \| ae(v) |
| if(merge_flag[x0][y0]){ | |
| merge_idx[x0][y0] | ue(v) \| ae(v) |
| } else { | |
| ... | |
| } | |
| } | |
| } | |

Merging block candidate index → merge_idx[x0][y0]
Merging flag → merge_flag[x0][y0]
Merging block candidate index → merge_idx[x0][y0]

FIG. 36
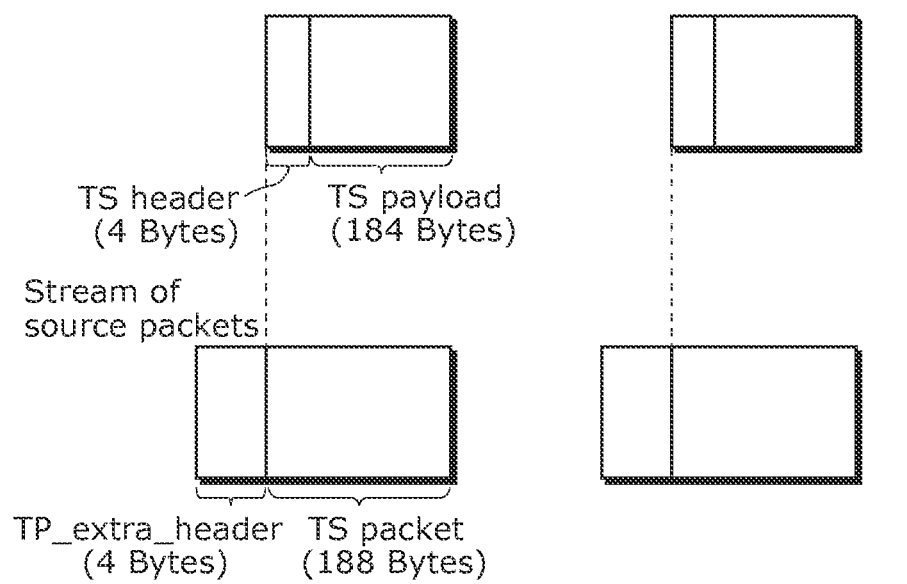
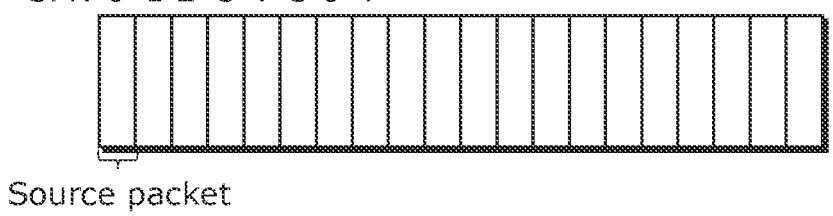

FIG. 44

| Corresponding standard | Driving frequency |
|---|---|
| MPEG-4 AVC | 500 MHz |
| MPEG-2 | 350 MHz |
| ⋮ | ⋮ |

IMAGE DECODING METHOD AND IMAGE DECODING APPARATUS

CROSS REFERENCE TO RELATED APPLICATION

This is a continuation application of PCT Patent Application No. PCT/JP2012/006005 filed on Sep. 21, 2012, designating the United States of America, which is based on and claims priority of U.S. Provisional Patent Application No. 61/543,365 filed on Oct. 5, 2011. The entire disclosures of the above-identified applications, including the specifications, drawings and claims are incorporated herein by reference in their entirety.

FIELD

One or more exemplary embodiments disclosed herein relate generally to an image decoding method and an image decoding apparatus.

BACKGROUND

Generally, in encoding processing of a moving picture, the amount of information is reduced by compression for which redundancy of a moving picture in spatial direction and temporal direction is made use of. Generally, conversion to a frequency domain is performed as a method in which redundancy in spatial direction is made use of, and encoding using prediction between pictures (the prediction is hereinafter referred to as inter prediction) is performed as a method of compression for which redundancy in temporal direction is made use of. In the inter prediction encoding, a current picture is encoded using, as a reference picture, an encoded picture which precedes or follows the current picture in order of display time. Subsequently, a motion vector is derived by performing motion estimation on the current picture with reference to the reference picture. Then, redundancy in temporal direction is removed using a calculated difference between picture data of the current picture and prediction picture data which is obtained by motion compensation based on the derived motion vector (see NPL 1, for example). Here, in the motion estimation, difference values between current blocks in the current picture and blocks in the reference picture are calculated, and a block having the smallest difference value in the reference picture is determined as a reference block. Then, a motion vector is estimated from the current block and the reference block.

CITATION LIST

Non Patent Literature

[NPL 1] ITU-T Recommendation H.264 "Advanced video coding for generic audiovisual services", March 2010
[NPL 2] JCT-VC, "WD3: Working Draft 3 of High-Efficiency Video Coding", JCTVC-E603, March 2011

SUMMARY

Technical Problem

It is still desirable to increase coding efficiency in image encoding and decoding in which inter prediction is used, beyond the above-described conventional technique.

In view of this, one non-limiting and exemplary embodiment provides an image encoding method and an image decoding method with which coding efficiency in image encoding and decoding using inter prediction is increased.

Solution to Problem

In one general aspect, the techniques disclosed here feature an image decoding method for decoding, on a block-by-block basis, image data included in an encoded bitstream. The method includes: dividing a current block that is a unit of decoding into a plurality of sub-blocks each of which is a unit of prediction; deriving, for each of the plurality of sub-blocks, one or more prediction information candidates each of which is a candidate for prediction information indicating a reference picture list, a motion vector, and a reference picture index; obtaining, from the encoded bitstream, an index for selecting a prediction information candidate from among the one or more prediction information candidates; and decoding the current block using the prediction information candidate selected by the index. The deriving includes: determining whether or not a neighboring block neighboring each of the plurality of sub-blocks is included in the current block, and when the neighboring block is not included in the current block, determining the neighboring block to be a reference block available to the sub-block, and when the neighboring block is included in the current block, determining the neighboring block not to be the reference block; and deriving a prediction information candidate of the sub-block from prediction information of the reference block; and when a total number of the prediction information candidates is smaller than a predetermined number, generating one or more new candidates without using the prediction information of the reference block till the total number of the prediction information candidates reaches the predetermined number.

General and specific aspect disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

According to one or more exemplary embodiments or features disclosed herein provide increased coding efficiency in image encoding and decoding using inter prediction.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 5 shows a relationship between the size of a merging block candidate list and bit sequences assigned to merging block candidate indexes.

FIG. 14B shows another exemplary merging block candidate list according to Embodiment 1.

FIG. 14C shows another exemplary merging block candidate list according to Embodiment 1.

FIG. 14D shows another exemplary merging block candidate list according to Embodiment 1.

FIG. 26 shows exemplary syntax in the case where the size of a merging block candidate list is fixed at the maximum value of the total number of merging block candidates.

FIG. 36 shows a structure of TS packets and source packets in the multiplexed data.

FIG. 44 shows an example of a look-up table in which video data standards are associated with driving frequencies.

DESCRIPTION OF EMBODIMENTS

Underlying Knowledge Forming Basis of the Present Disclosure (Underlying Knowledge Forming Basis of the Present Disclosure)

In a moving picture encoding scheme already standardized, which is referred to as H.264, three picture types of I picture, P picture, and B picture are used for reduction of the amount of information by compression.

The I picture is not encoded by inter prediction encoding. Specifically, the I picture is encoded by prediction within the picture (the prediction is hereinafter referred to as intra prediction). The P picture is encoded by inter prediction encoding with reference to one encoded picture preceding or following the current picture in order of display time. The B picture is encoded by inter prediction encoding with reference to two encoded pictures preceding and following the current picture in order of display time.

In inter prediction encoding, a reference picture list for identifying a reference picture is generated. In a reference picture list, reference picture indexes are assigned to encoded reference pictures to be referenced in inter prediction. For example, two reference picture lists (L0, L1) are generated for a B picture because it can be encoded with reference to two pictures.

Figure 1A:
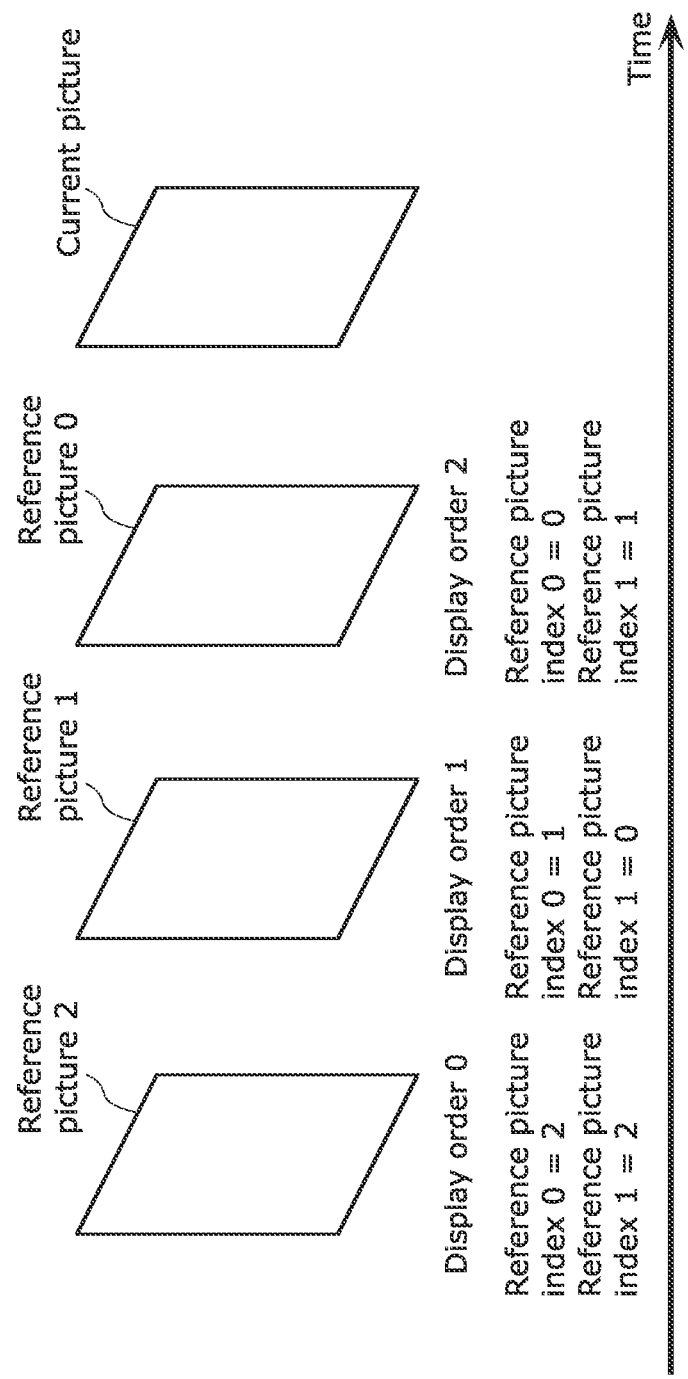
FIG. 1A is a diagram for illustrating an exemplary reference picture list for a B picture.
Figures 1B, 1C, 2:
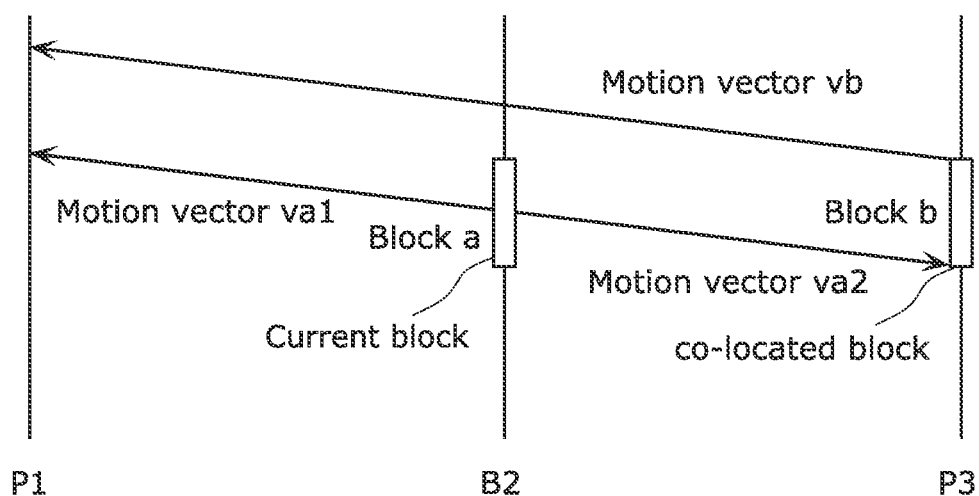
FIG. 1B is a diagram for illustrating an exemplary reference picture list of a prediction direction 0 for a B picture.
FIG. 1C is a diagram for illustrating an exemplary reference picture list of a prediction direction 1 for a B picture.
FIG. 2 is a diagram for illustrating motion vectors for use in the temporal motion vector prediction mode.

FIG. 1A is a diagram for illustrating an exemplary reference picture list for a B picture. FIG. 1B shows an exemplary reference picture list 0 (L0) for a prediction direction 0 in bi-directional prediction. In the reference picture list 0, the reference picture index 0 having a value of 0 is assigned to a reference picture 0 with a display order number 2. The reference picture index 0 having a value of 1 is assigned to a reference picture 1 with a display order number 1. The reference picture index 0 having a value of 2 is assigned to a reference picture 2 with a display order number 0. In other words, the shorter the temporal distance of a reference picture from the current picture, the smaller the reference picture index assigned to the reference picture.

On the other hand, FIG. 1C shows an exemplary reference picture list 1 (L1) for a prediction direction 1 in bi-directional prediction. In the reference picture list 1, the reference picture index 1 having a value of 0 is assigned to a reference picture 1 with a display order number 1. The reference picture index 1 having a value of 1 is assigned to a reference picture 0 with a display order number 2. The reference picture index 2 having a value of 2 is assigned to a reference picture 2 with a display order number 0.

In this manner, it is possible to assign reference picture indexes having values different between prediction directions to a reference picture (the reference pictures 0 and 1 in FIG. 1A) or to assign the reference picture index having the same value for both directions to a reference picture (the reference picture 2 in FIG. 1A).

In a moving picture encoding method referred to as H.264 (see NPL 1), a motion vector estimation mode is available as an encoding mode for inter prediction of each current block in a B picture. In the motion vector estimation mode, a difference value between picture data of a current block and prediction picture data and a motion vector used for generating the prediction picture data are encoded. In addition, in the motion vector estimation mode, bi-directional prediction and uni-directional prediction can be selectively performed. In bi-directional prediction, a prediction picture is generated with reference to two encoded pictures one of which precedes a current picture to be encoded and the other of which follows the current picture. In uni-directional prediction, a prediction picture is generated with reference to one encoded picture preceding or following a current picture to be encoded.

Furthermore, in the moving picture encoding method referred to as H.264, an encoding mode referred to as a temporal motion vector prediction mode can be selected for derivation of a motion vector in encoding of a B picture. The inter prediction encoding method performed in the temporal motion vector prediction mode will be described below using FIG. 2.

FIG. 2 is a diagram for illustrating motion vectors for use in the temporal motion vector prediction mode. Specifically, FIG. 2 shows a case where a block a in a picture B2 is encoded in temporal motion vector prediction mode.

In the encoding, a motion vector vb is used which has been used for encoding of a block b located in the same position in a picture P3, which is a reference picture following the picture B2, as the position of the block a in the picture B2 (in the case, the block b is hereinafter referred to as a co-located block of the block a). The motion vector vb is a motion vector used for encoding the block b with reference to the picture P1.

Two reference blocks for the block a are obtained from a forward reference picture and a backward reference picture, that is, a picture P1 and a picture P3 using motion vectors parallel to the motion vector vb. Then, the block a is encoded by bi-directional prediction based on the two obtained reference blocks. Specifically, in the encoding of the block a, a motion vector va1 is used to reference the picture P1, and a motion vector va2 is used to reference the picture P3.

In addition, a merging mode is discussed as an inter prediction mode for encoding of each current block in a B picture or a P picture (see NPL 2). In the merging mode, a current block is encoded using a prediction direction, a motion vector, and a reference picture index which are duplications of those used for encoding of a neighboring block of the current block. At this time, the duplications of the index and others of the neighboring block are attached to a bitstream so that the motion direction, motion vector, and reference picture index used for the encoding can be selected in decoding. A concrete example for it is given below with reference to FIG. 3.

Figure 3:
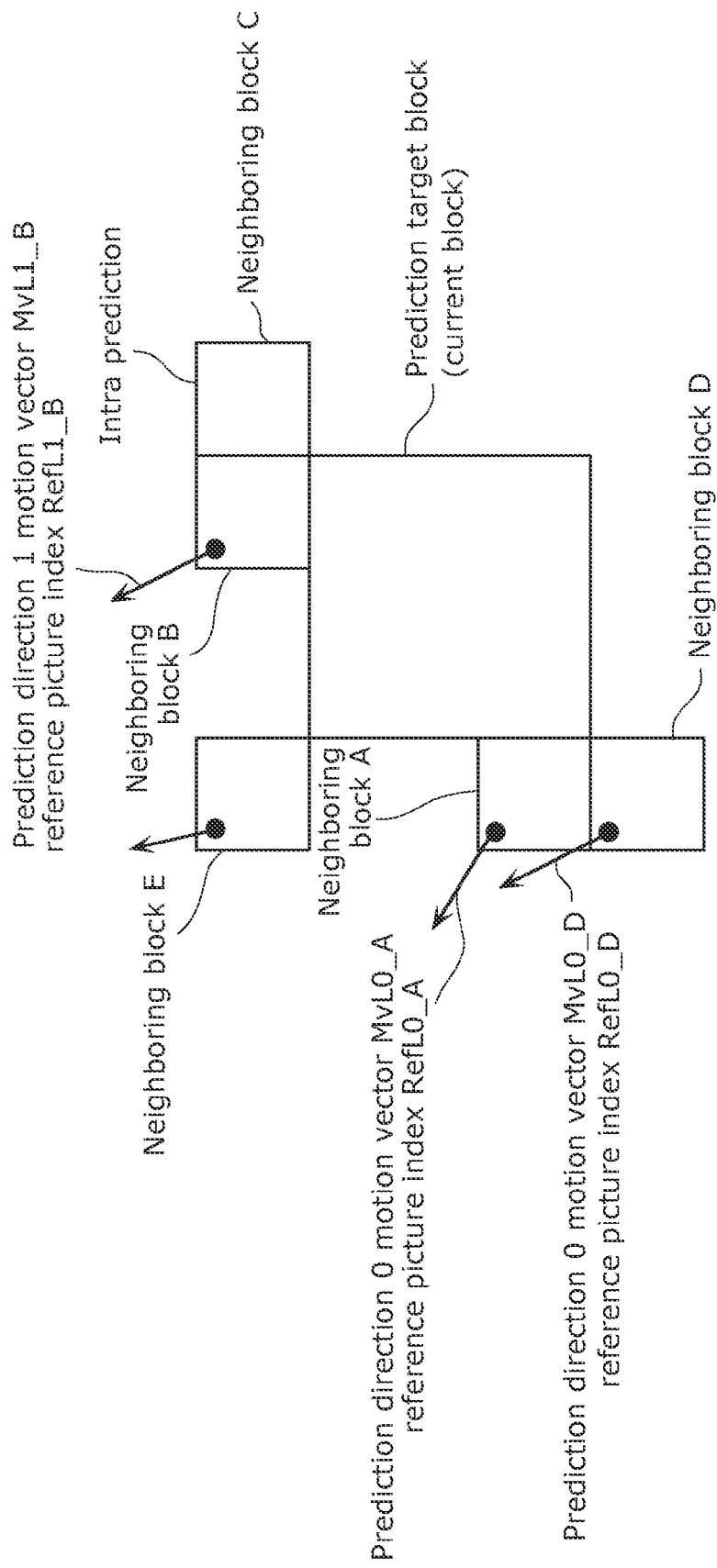
FIG. 3 shows exemplary motion vectors of neighboring blocks for use in the merging mode.

FIG. 3 shows exemplary motion vectors of neighboring blocks for use in the merging mode. In FIG. 3, a neighboring block A is an encoded block located to the immediate left of a current block (prediction target block). The bottom edges of the neighboring block A and the prediction target block are along the same line. A neighboring block B is an encoded block located immediately above the current block. The right edges of the neighboring block B and the prediction target block are along the same line. A neighboring block C is an encoded block located immediately right above the current block. A neighboring block D is an encoded block located immediately left below the current block. A neighboring block E is an encoded block located immediately left above the prediction target block.

Here, a description is given of the case where a current block is encoded using duplications of a prediction direction, a motion vector, and a reference picture index used for encoding one of the neighboring blocks A to D and the co-located block.

The neighboring block A is a block encoded by uni-directional prediction in the prediction direction 0. The neighboring block A has a motion vector MvL0_A having the prediction direction 0 as a motion vector with respect to a reference picture indicated by a reference picture index RefL0_A of the prediction direction 0, Here, MvL0 indicates a motion vector which references a reference picture specified in a reference picture list 0 (L0), MvL1 indicates a motion vector which references a reference picture specified in a reference picture list 1 (L1).

The neighboring block B is a block encoded by uni-directional prediction in the prediction direction 1. The neighboring block B has a motion vector MvL1_B having the prediction direction 1 as a motion vector with respect to a reference picture indicated by a reference picture index RefL1_B of the prediction direction 1.

The neighboring block C is a block encoded by intra prediction.

The neighboring block D is a block encoded by uni-directional prediction in the prediction direction 0. The neighboring block D has a motion vector MvL0_D having the prediction direction 0 as a motion vector with respect to a reference picture indicated by a reference picture index RefL0_D of the prediction direction 0.

In this case, for example, a set of a prediction direction, a motion vector, and a reference picture index with which the current block can be encoded with the highest coding efficiency is selected as a prediction direction, a motion vector, and a reference picture index of the current block from the prediction directions, motion vectors and reference picture indexes of the neighboring blocks A to D, and a prediction direction, a motion vector, and a reference picture index which are calculated using a co-located block in temporal motion vector prediction mode. Then, a merging block candidate index indicating the selected block having the prediction direction, motion vector, and reference picture index is attached to a bitstream.

Figure 4:
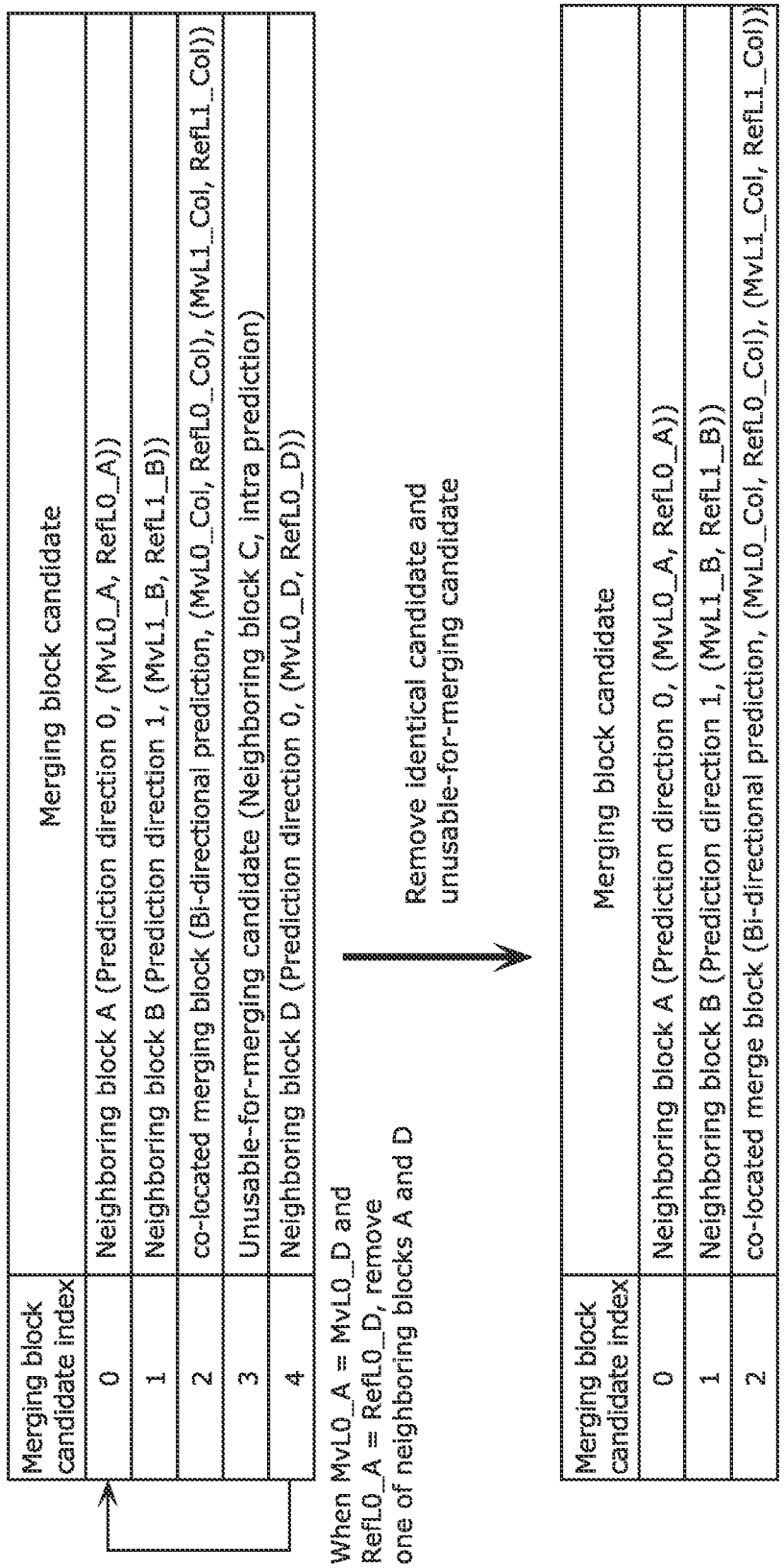
FIG. 4 is a diagram for illustrating an exemplary merging block candidate list.

For example, when the neighboring block A is selected, the current block is encoded using the motion vector MvL0_A having the prediction direction 0 and the reference picture index RefL0_A. Then, only the merging block candidate index having a value of 0 which indicates use of the neighboring block A as shown in FIG. 4 is attached to a bitstream. The amount of information on a prediction direction, a motion vector, and a reference picture index is thereby reduced.

Furthermore, in the merging mode, a candidate which cannot be used for encoding (hereinafter referred to as an unusable-for-merging candidate), and a candidate having a set of a prediction direction, a motion vector, and a reference picture index identical to a set of a prediction direction, a motion vector, and a reference picture index of any other merging block (hereinafter referred to as an identical candidate) are removed from merging block candidates as shown in FIG. 4.

In this manner, the total number of merging block candidates is reduced so that the amount of code assigned to merging block candidate indexes can be reduced. Here, for example, "unusable for merging" means (1) that the merging block candidate has been encoded by intra prediction, (2) that the merging block candidate is outside the boundary of a slice including the current block or the boundary of a picture including the current block, or (3) that the merging block candidate is yet to be encoded.

In the example shown in FIG. 4, the neighboring block C is a block encoded by intra prediction. The merging block candidate having the merging block candidate index 3 is therefore an unusable-for-merging candidate and removed from the merging block candidate list. The neighboring block D is identical in prediction direction, motion vector, and reference picture index to the neighboring block A. The merging block candidate having the merging block candidate index 4 is therefore removed from the merging block candidate list. As a result, the total number of the merging block candidates is finally three, and the size of the merging block candidate list is set at three.

Merging block candidate indexes are encoded by variable-length encoding by assigning bit sequences according to the size of each merging block candidate list as shown in FIG. 5. Thus, in the merging mode, the amount of code is reduced by changing bit sequences assigned to merging mode indexes according to the size of each merging block candidate list.

Figure 6:
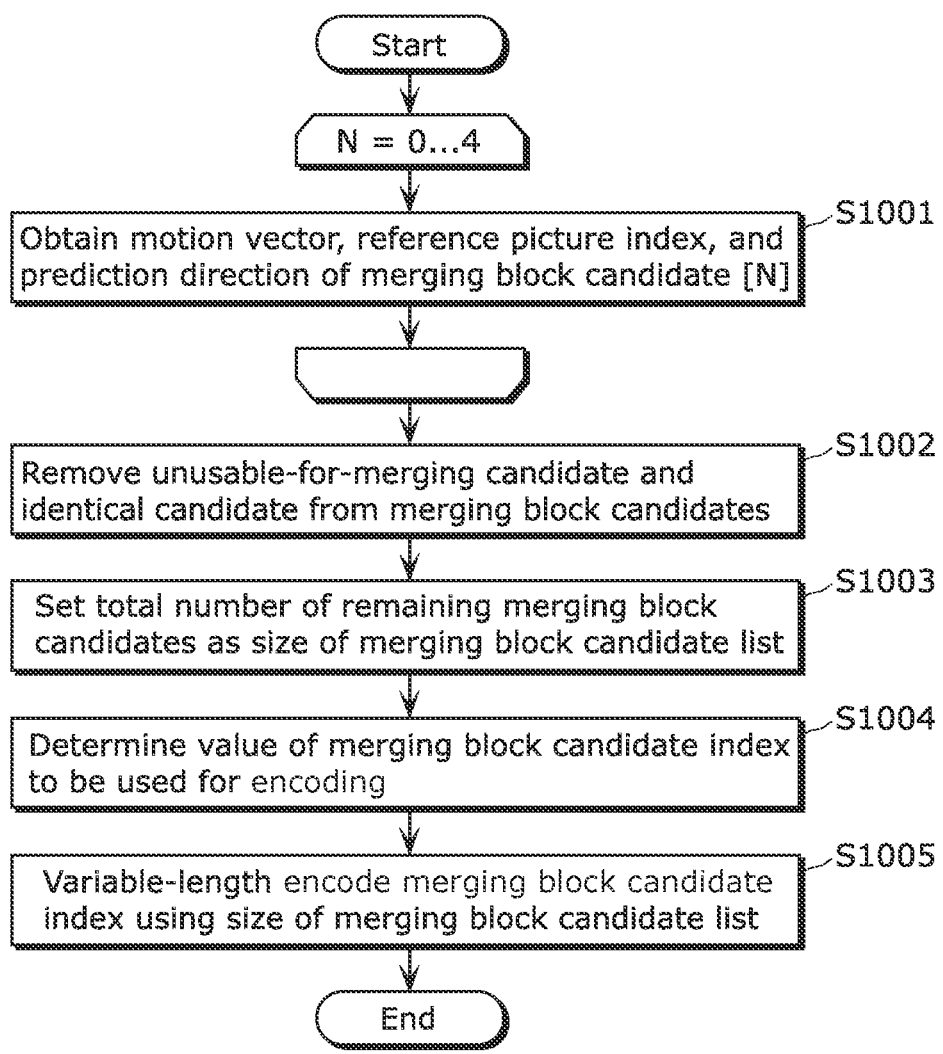
FIG. 6 is a flowchart showing an example of a process for encoding when the merging mode is used.

FIG. 6 is a flowchart showing an example of a process for encoding when the merging mode is used. In Step S1001, motion vectors, reference picture indexes, and prediction directions of merging block candidates are obtained from neighboring blocks and a co-located block. In Step S1002, identical candidates and unusable-for-merging candidates are removed from the merging block candidates. In Step S1003, the total number of the merging block candidates after the removing is set as the size of the merging block candidate list. In Step S1004, the merging block candidate index to be used for encoding of the current block is determined. In Step S1005, the determined merging block candidate index is encoded by performing variable-length encoding in bit sequence according to the size of the merging block candidate list.

Figure 7:
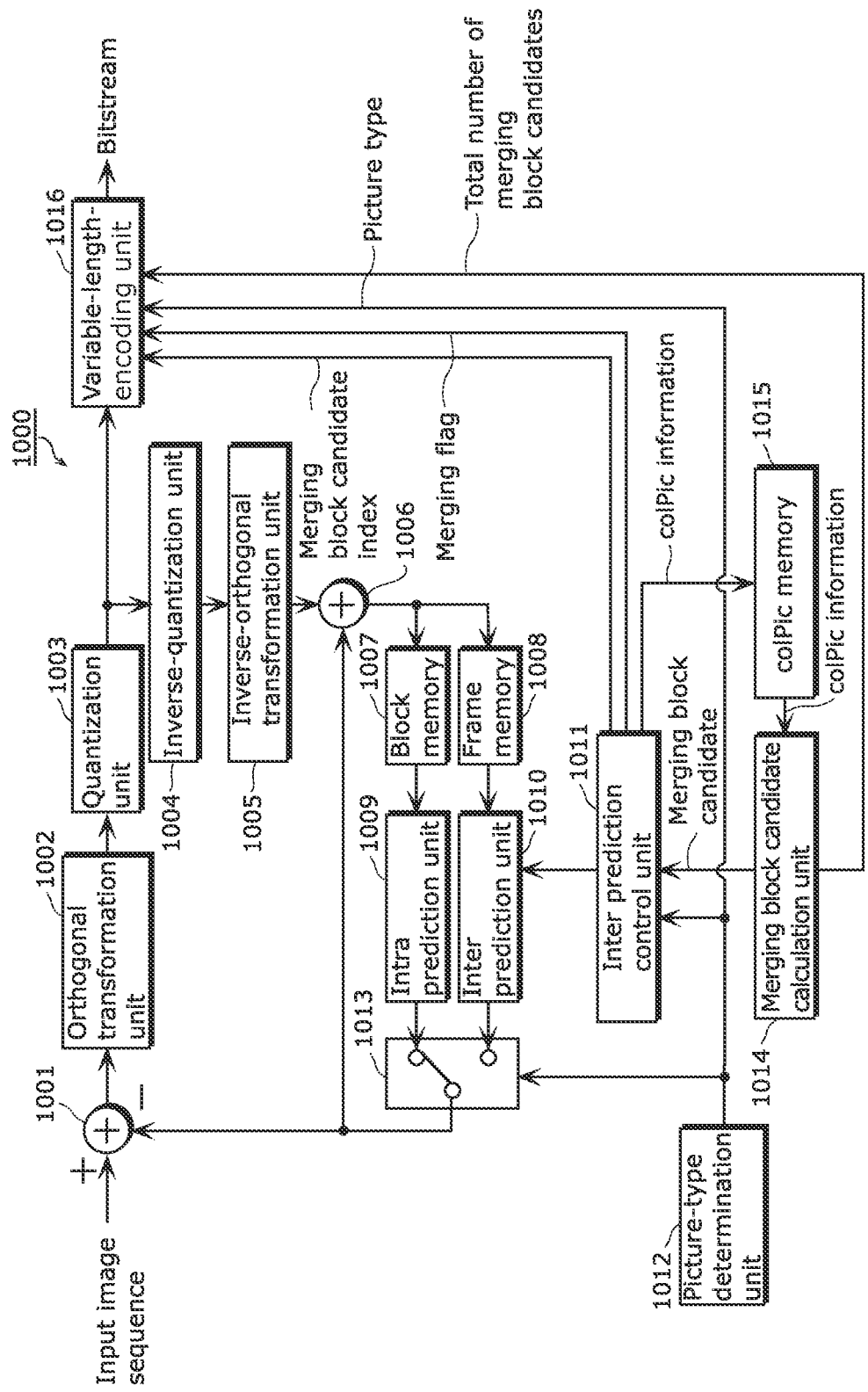
FIG. 7 shows an exemplary configuration of an image encoding apparatus which encodes images using the merging mode.

FIG. 7 shows an exemplary configuration of an image encoding apparatus 1000 which encodes images using the merging mode. The image encoding apparatus 1000 includes a subtractor 1001, an orthogonal transformation unit 1002, a quantization unit 1003, an inverse-quantization unit 1004, an inverse-orthogonal transformation unit 1005, an adder 1006, block memory 1007, frame memory 1008, an intra prediction unit 1009, an inter prediction unit 1010, an inter prediction control unit 1011, a picture-type determination unit 1012, a switch 1013, a merging block candidate calculation unit 1014, colPic memory 1015, and a variable-length-encoding unit 1016.

In FIG. 7, the merging block candidate calculation unit 1014 calculates merging block candidates. Then, the merging block candidate calculation unit 1014 transmits the total number of the calculated merging block candidates to the variable-length-encoding unit 1016. The variable-length-encoding unit 1016 sets the total number of the merging block candidates as the size of the merging block candidate list which is an encoding parameter. Then, the variable-length-encoding unit 1016 performs variable-length encoding on a bit sequence by assigning a bit sequence according to the size of the merging block candidate list to a merging block candidate index to be used for encoding.

Figure 8:
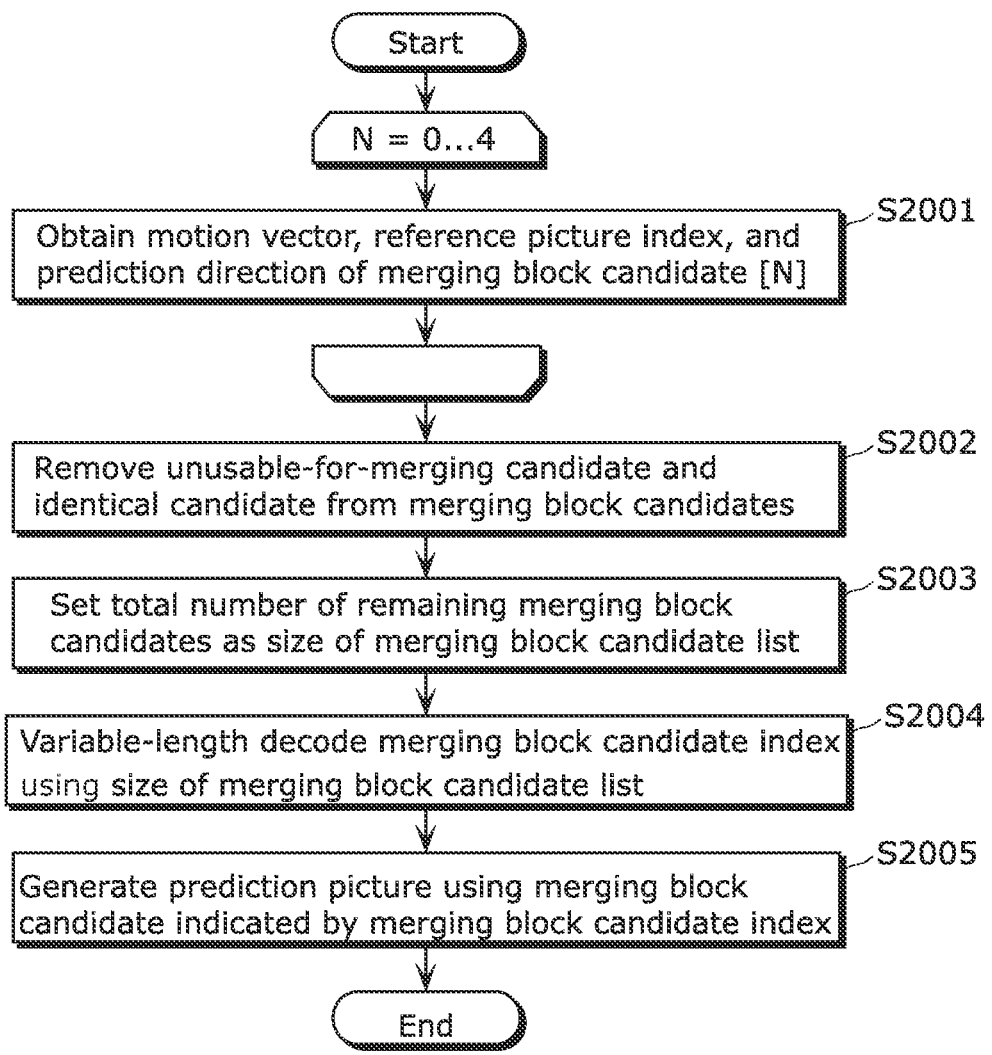
FIG. 8 is a flowchart showing an example of a process for decoding using the merging mode.

FIG. 8 is a flowchart showing an example of a process for decoding using the merging mode. In Step S2001, motion vectors, reference picture indexes, and prediction directions of merging block candidates are obtained from neighboring blocks and a co-located block. In Step S2002, identical candidates and unusable-for-merging candidates are removed from the merging block candidates. In Step S2003, the total number of the merging block candidates after the removing is set as the size of the merging block candidate list. In Step S2004, the merging block candidate index to be used for decoding of a current block is decoded from a bitstream using the size of the merging block candidate list. In Step S2005, decoding of a current block is performed by generating a prediction picture using the merging block candidate indicated by the decoded merging block candidate index.

Figure 9:
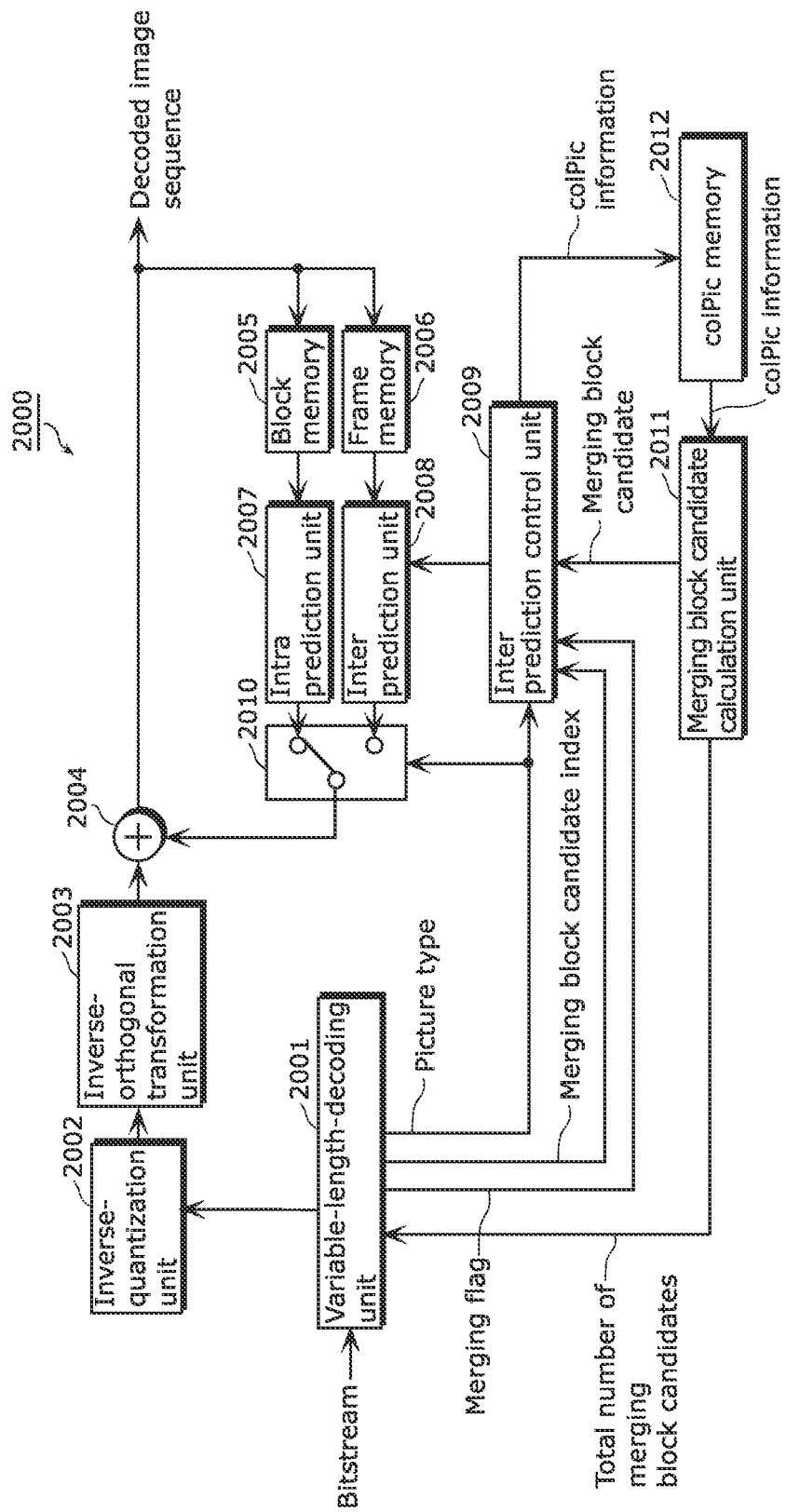
FIG. 9 shows an exemplary configuration of an image decoding apparatus which decodes encoded images using the merging mode.

FIG. 9 shows an exemplary configuration of an image decoding apparatus 2000 which decodes encoded images using the merging mode. The image decoding apparatus 2000 includes a variable-length-decoding unit 2001, an inverse-quantization unit 2002, an inverse-orthogonal-transformation unit 2003, an adder 2004, block memory 2005, frame memory 2006, an intra prediction unit 2007, an inter prediction unit 2008, an inter prediction control unit 2009, a switch 2010, a merging block candidate calculation unit 2011, and colPic memory 2012.

In FIG. 9, the merging block candidate calculation unit 2011 calculates merging block candidates. Then, the merging block candidate calculation unit 2011 transmits the calculated total number of the merging block candidates to the variable-length-decoding unit 2001. The variable-length-decoding unit 2001 sets the total number of the merging block candidates as the size of the merging block candidate list which is a decoding parameter. Then, the variable-length-decoding unit 2001 decodes a merging block candidate index from the bitstream using the size of the merging block candidate list.

Figure 10:
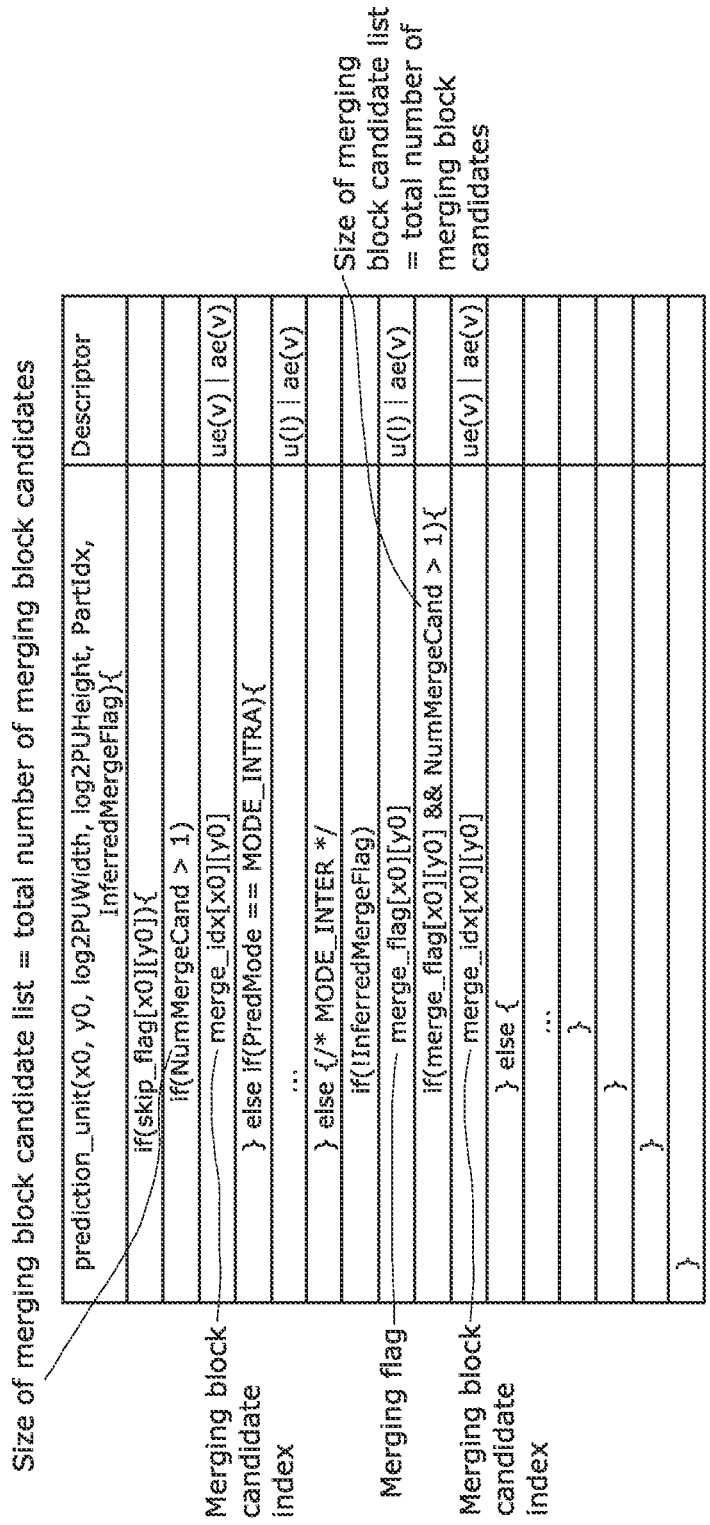
FIG. 10 shows syntax for attachment of merging block candidate indexes to a bitstream.

FIG. 10 shows syntax for attachment of merging block candidate indexes to a bitstream. In FIG. 10, merge_idx represents a merging block candidate index, and merge_flag represents a merging flag. NumMergeCand represents the size of a merging block candidate list, NumMergeCand is set at the total number of merging block candidates after unusable-for-merging candidates and identical candidates are removed from the merging block candidates.

Encoding or decoding of an image is performed using the merging mode in the above-described manner.

In the moving picture coding scheme discussed in the NPL 2, it is assumed that a prediction picture is generated on a per coding block basis (hereinafter, referred to as a coding unit (CU)), that is, a CU has the same size as a prediction block unit (hereinafter, referred to as PU) which is a unit for generating a prediction picture.

However, the prediction picture may be generated on a per PU basis where each PU is obtained by dividing a CU. Generating the prediction picture on a per PU basis allows generation of a higher definition prediction picture.

Figure 11:
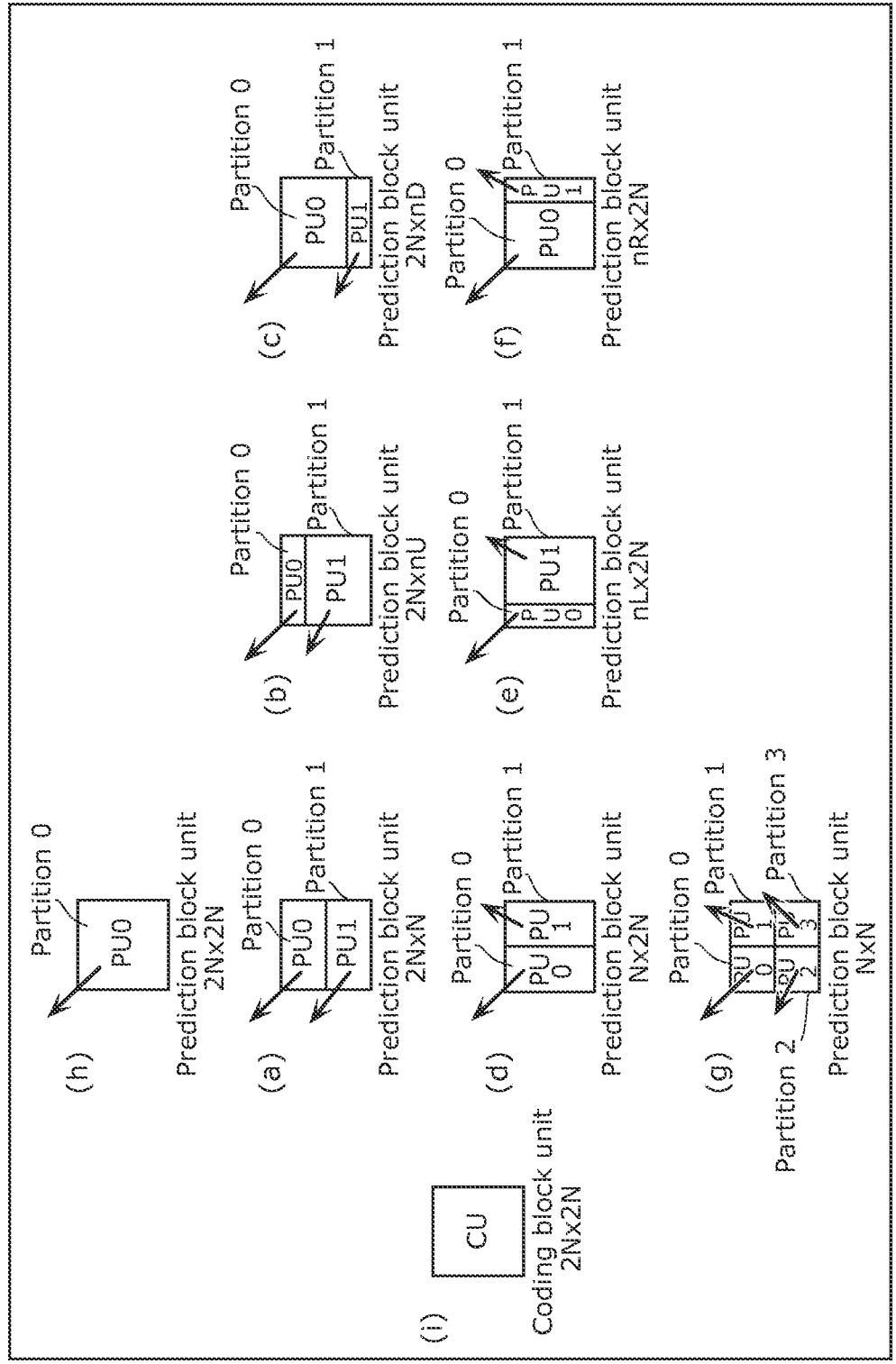
FIG. 11 shows a relationship between a coding block unit and prediction block units (partitions).

FIG. 11 shows exemplary cases where a CU having a size of 2N×2N (N is an integer number) is divided into a plurality of PUs.

More specifically, in FIG. 11, (a) to (c) show cases where a CU is divided into two that are an upper portion and a lower portion. A PU0 located on top is referred to as a partition 0, and a PU1 located at the bottom is referred to as a partition 1. In FIG. 11, (a) shows the case where each PU has a size of 2N×N. In FIG. 11, (b) shows the case where each PU has a size of 2N×nU. In FIG. 11, (c) shows the case where each PU has a size of 2N×nD.

In FIG. 11, (d) to (f) show cases where a CU is divided into two that are a left portion and a right portion. A PU0 located on the left side is referred to as a partition 0, and a PU1 located on the right side is referred to as a partition 1. In FIG. 11, (d) shows the case where each PU has a size of N×2N. In FIG. 11, (e) shows the case where each PU has a size of nL×2N. In FIG. 11, (f) shows the case where each PU has a size of nR×2N.

In FIG. 11, (g) shows the case where each PU has a size of N×N, that is, a CU is divided into four (divided into two that are upper and lower portions and into two that are left and right portions). In (g) of FIG. 11, a top-left PU0 is referred to as a partition 0, a top-right PU1 is referred to as a partition 1, a bottom-left PU2 is referred to as a partition 2, and a bottom-right PU3 is referred to as a partition 3.

In FIG. 11, (h) shows the case where a PU has a size of 2N×2N, that is, the CU has the same size as the PU. In (h) of FIG. 11, a PU0 is referred to as a partition 0.

For example, in encoding on a per PU basis where the PU is obtained by dividing a CU as above, it is set such that respective partitions have different prediction directions, motion vectors, and reference picture indexes which are used for generating a prediction picture. This is because use of the same prediction direction, motion vector, and reference picture index for all partitions leads to the substantially same result as the result obtained by generating a prediction picture on a per CU basis. This reduces advantage obtained by dividing a CU into PUs. In encoding on a per PU basis, when a prediction picture is calculated by generating motion vectors and the like and a prediction residual is obtained, it is possible to efficiently encode moving pictures having complex shapes by selectively using motion vectors and the like used for generating a prediction picture from among a plurality of PUs shown in (a) to (h) in FIG. 11.

However, in the conventional merging mode, in generating a prediction picture by dividing a CU into partitions, merging block candidates are calculated even for neighboring blocks within the same CU. As described above, it is not preferable to apply the same motion vector and the like to the PUs within the same CU. Hence, the merging block candidates obtained from the motion vectors and the like of the neighboring blocks within the same CU are redundant. In such a manner, in the conventional merging mode, merging block candidates are obtained even for neighboring blocks within the same CU. Hence, merging block candidate indexes are assigned to the redundant merging block candidates, too, so that bit quantity is increased.

In view of this, an image encoding method according to an aspect of the present disclosure is an image encoding method for generating a bitstream by encoding an image on a block-by-block basis. The method includes: dividing a current block to be encoded into a plurality of sub-blocks; obtaining, for each of the sub-blocks, one or more merging candidates each of which is a candidate set of a prediction direction, a motion vector, and a reference picture index which are to be referenced in encoding of the current block; selecting a merging candidate to be used in the encoding of the current block, from among the one or more merging candidates obtained in the obtaining; and adding, to the bitstream, an index for identifying the merging candidate selected in the selecting. The obtaining includes: determining (i) for each of neighboring blocks neighboring the sub-block, whether or not the neighboring block is included in the current block, and (ii) the neighboring block which is not included in the current block to be a merging target block; and when one or more of the merging target blocks are determined, deriving a first candidate as part of the one or more merging candidates for each of the one or more of the merging target blocks, using a set of a prediction direction, a motion vector, and a reference picture index which have been used for generating a prediction picture of the merging target block.

With the image encoding method, in generating a prediction picture by dividing a Cu into partitions (PUs), it is determined whether or not a neighboring block for which merging block candidates are calculated is located within the same CU. When it is determined that the neighboring block is located within the same CU, the neighboring block is excluded from calculation of the merging block candidates. With this, redundant merging block candidates are not added to the merging block candidate list in the above image encoding method, so that coding efficiency can be increased.

For example, it may be that the determining further includes: determining whether or not the neighboring block is (i) a block encoded by intra prediction, (ii) outside a boundary of a slice including the current block or a boundary of a picture including the current block, and (iii) a block yet to be encoded; and when it is determined that the neighboring block is (1) not included in the current block, (2) not a block encoded by intra prediction, (3) not a block outside a boundary of a slice including the current block or a boundary of a picture including the current block, and (4) not a block yet to be encoded, determining the neighboring block to be the merging target block.

Furthermore, for example, it may be that the image encoding method further includes determining a maximum number of obtainable merging candidates, wherein the obtaining further includes determining whether or not a total number of the first candidates is smaller than the maximum number, and when it is determined that the total number of the first candidates is smaller than the maximum number, deriving a new candidate having a picture index for a picture referanceable in encoding of the sub-block.

Furthermore, for example, it may be that the image encoding method further includes generating a prediction picture of the sub-block, using the merging candidate selected in the selecting.

Furthermore, an image decoding method according to an aspect of the present disclosure is an image decoding method for decoding, on a block-by-block basis, image data included in an encoded bitstream. The method includes: dividing a current block to be decoded into a plurality of sub-blocks; obtaining, for each of the sub-blocks, one or more merging candidates each of which is a candidate set of a prediction direction, a motion vector, and a reference picture index which are to be referenced in decoding of the current block; obtaining, from the encoded bitstream, an index for identifying a merging candidate to be referenced in the decoding of the current block; and identifying the merging candidate using the obtained index, and decoding the current block using the identified merging candidate, wherein the obtaining of one or more merging candidates includes: determining (i) for each of neighboring blocks neighboring the sub-block, whether or not the neighboring block is included in the current block, and (ii) the neighboring block which is not included in the current block to be a merging target block; and when one or more of the merging target blocks are determined, deriving a first candidate as part of the one or more merging candidates for each of the one or more of the merging target blocks, using a set of a prediction direction, a motion vector, and a reference picture index which have been used for generating a prediction picture of the merging target block.

For example, it may be that the determining further includes: determining whether or not the neighboring block is (i) a block decoded by intra prediction, (ii) a block outside a boundary of a slice including the current block or a boundary of a picture including the current block, and (iii) a block yet to be decoded; and when it is determined that the neighboring block is (1) not included in the current block, (2) not a block decoded by intra prediction, (3) not a block outside a boundary of a slice including the current block or a boundary of a picture including the current block, and (4) not a block yet to be decoded, determining the neighboring block to be the merging target block.

Furthermore, for example, it may be that the image decoding method further includes determining a maximum number of obtainable merging candidates. The obtaining of one or more merging candidates further includes: determining whether or not a total number of the first candidates is smaller than the maximum number; and when it is determined that the total number of the first candidates is smaller than the maximum number, deriving a new candidate having a picture index for a picture referenceable in decoding of the sub-block.

Furthermore, for example, it may be that the image decoding method further includes generating a prediction picture of the sub-block, using the merging candidate selected in the selecting.

Furthermore, an image encoding apparatus according to an aspect of the present disclosure is an image encoding apparatus which generates a bitstream by encoding an image on a block-by-block basis. The apparatus includes: a first division unit which divides a current block to be encoded into a plurality of sub-blocks; a first obtainment unit which obtains, for each of the sub-blocks, one or more merging candidates each of which is a candidate set of a prediction direction, a motion vector, and a reference picture index which are to be referenced in encoding of the current block; a first selection unit which selects a merging candidate to be used in the encoding of the current block, from among the one or more merging candidates obtained in the obtaining; and an encoding unit which adds, to the bitstream, an index for identifying the merging candidate selected by the selection unit. The first obtainment unit determines, for each of neighboring blocks neighboring the sub-block, whether or not the neighboring block is included in the current block, and determine the neighboring block which is not included in the current block to be a merging target block; and when one or more of the merging target blocks are determined, derive a first candidate as part of the one or more merging candidates for each of the one or more of the merging target blocks, using a set of a prediction direction, a motion vector, and a reference picture index which have been used for generating a prediction picture of the merging target block.

Furthermore, an image decoding apparatus according to an aspect of the present disclosure is an image decoding apparatus which decodes, on a block-by-block basis, image data included in an encoded bitstream. The apparatus includes: a second division unit configured to divide a current block to be decoded into a plurality of sub-blocks; a second obtainment unit configured to obtain, for each of the sub-blocks, one or more merging candidates each of which is a candidate set of a prediction direction, a motion vector, and a reference picture index which are to be referenced in decoding of the current block; an index obtainment unit configured to obtain, from the encoded bitstream, an index for identifying a merging candidate to be referenced in the decoding of the current block; and a decoding unit configured to identify the merging candidate using the obtained index, and decode the current block using the identified merging candidate. The second obtainment unit: determines, for each of neighboring blocks neighboring the sub-block, whether or not the neighboring block is included in the current block, and determine the neighboring block which is not included in the current block to be a merging target block; and when one or more of the merging target blocks are determined, derives a first candidate as part of the one or more merging candidates for each of the one or more of the merging target blocks, using a set of a prediction direction, a motion vector, and a reference picture index which have been used for generating a prediction picture of the merging target block.

Furthermore, an image coding apparatus according to an aspect of the present disclosure includes the image encoding apparatus and the image decoding apparatus.

It should be noted that these general or specific aspects can be implemented as a system, a method, an integrated circuit, a computer program, a computer-readable recording medium such as a compact disc read-only memory (CD-ROM), or as any combination of a system, a method, an integrated circuit, a computer program, and a computer-readable recording medium.

An image encoding apparatus and an image decoding apparatus according to an aspect of the present disclosure will be described specifically below with reference to the drawings.

Each of the exemplary embodiments described below shows a specific example of the present disclosure. The numerical values, shapes, materials, constituent elements, the arrangement and connection of the constituent elements, steps, the processing order of the steps etc, shown in the following exemplary embodiments are mere examples, and therefore do not limit the inventive concept in the present disclosure. Therefore, among the constituent elements in the following exemplary embodiments, the constituent elements not recited in any one of the independent claims defining the most generic part of the inventive concept are described as arbitrary constituent elements.

Embodiment 1

Referring to FIG. 12 to FIG. 20, a description will be given of an image encoding apparatus which executes an image encoding method according to Embodiment 1. In Embodiment 1, a description is given of a case where a prediction picture is generated by deriving merging block candidates on a per prediction block (PU) basis (on a per prediction target block basis) where the PU is obtained by dividing a coding block unit (CU) (hereinafter, the coding block is also referred to as a current block).

[1-1 Configuration of Image Encoding Apparatus]

Figure 12:
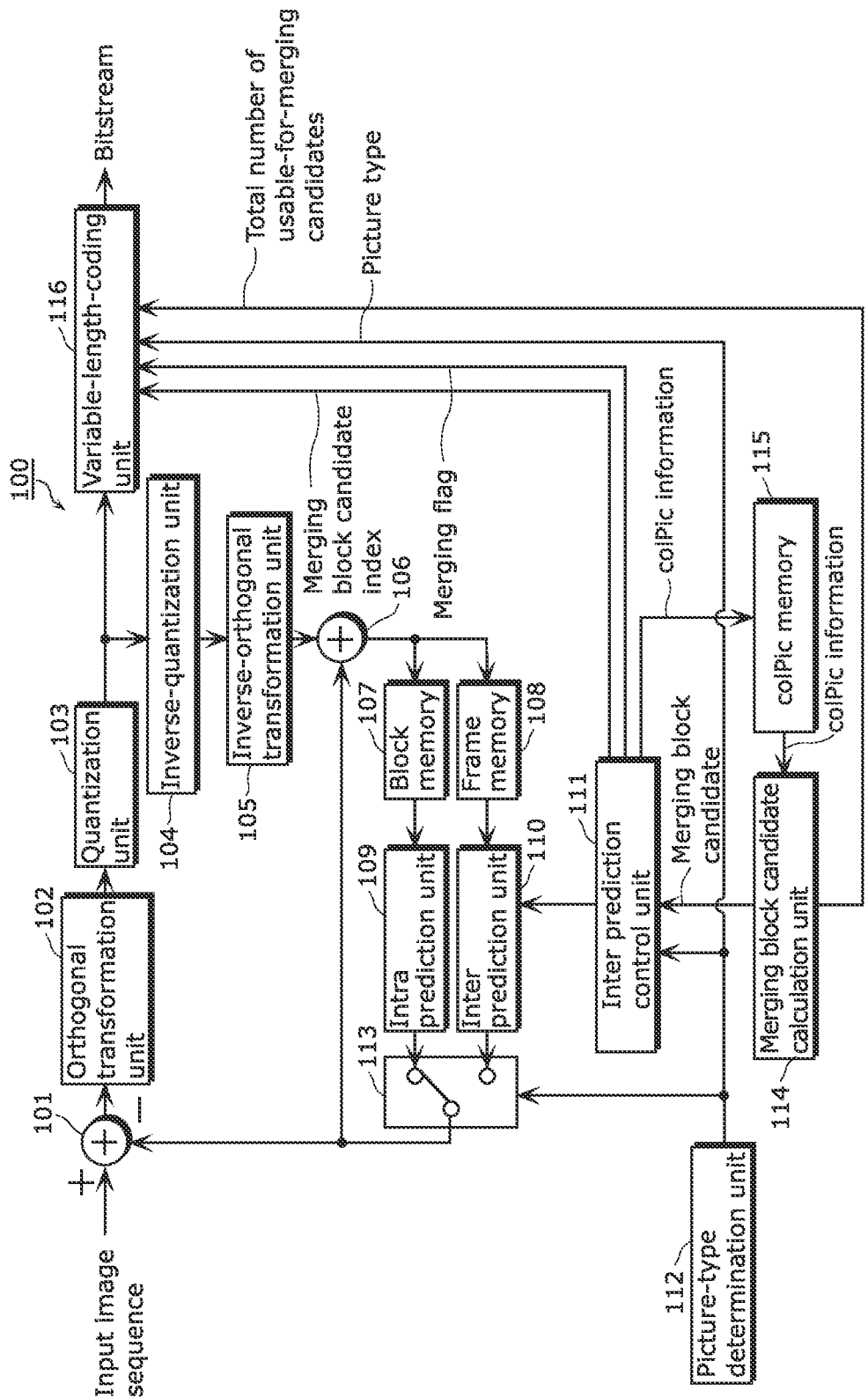
FIG. 12 is a block diagram showing a configuration of an image encoding apparatus according to Embodiment 1.

First, referring to FIG. 12, a description is given of a configuration of an image encoding apparatus.

FIG. 12 is a block diagram showing a configuration of an image encoding apparatus 100 according to Embodiment 1.

The image encoding apparatus 100 encodes images on a block-by-block basis to generate a bitstream.

As shown in FIG. 12, the image encoding apparatus 100 includes a subtractor 101, an orthogonal transformation unit 102, a quantization unit 103, an inverse-quantization unit 104, an inverse-orthogonal-transformation unit 105, an adder 106, block memory 107, frame memory 108, an intra prediction unit 109, an inter prediction unit 110, an inter prediction control unit 111, a picture-type determination unit 112, a switch 113, a merging block candidate calculation unit 114, colPic memory 115, and a variable-length-encoding unit 116.

The subtractor 101 subtracts, on a block-by-block basis (on a PU-by-PU basis), prediction picture data from input image data included in an input image sequence to generate prediction error data.

The orthogonal transformation unit 102 transforms the generated prediction error data from a picture domain into a frequency domain.

The quantization unit 103 quantizes the prediction error data transformed into a frequency domain.

The inverse-quantization unit 104 inverse-quantizes the prediction error data quantized by the quantization unit 103.

The inverse-orthogonal-transformation unit 105 transforms the inverse-quantized prediction error data from a frequency domain into a picture domain.

The adder 106 adds, on a block-by-block basis (on a PU-by-PU basis), prediction picture data and the prediction error data inverse-quantized by the inverse-orthogonal-transformation unit 105 to generate reconstructed image data.

The block memory 107 stores the reconstructed image data in units of a block.

The frame memory 108 stores the reconstructed image data in units of a frame.

The picture-type determination unit 112 determines in which of the picture types of I picture, B picture, and P picture the input image data is to be encoded. Then, the picture-type determination unit 112 generates picture-type information indicating the determined picture type.

The intra prediction unit 109 generates intra prediction picture data of a prediction target block by performing intra prediction using reconstructed image data stored in the block memory 107 in units of a block.

The inter prediction unit 110 generates inter prediction picture data of a prediction target block by performing inter prediction using reconstructed image data stored in the frame memory 108 in units of a frame and a motion vector derived by a process including motion estimation.

When a prediction target block is encoded by intra prediction encoding, the switch 113 outputs intra prediction picture data generated by the intra prediction unit 109 as prediction picture data of the prediction target block to the subtractor 101 and the adder 106. On the other hand, when a prediction target block is encoded by inter prediction encoding, the switch 113 outputs inter prediction picture data generated by the inter prediction unit 110 as prediction picture data of the prediction target block to the subtractor 101 and the adder 106.

The merging block candidate calculation unit 114 derives merging block candidates in units of a PU shown in (a) to (f) of FIG. 11 in Embodiment 1. It is to be noted that in Embodiment 1, a description is given of a case where the PUs shown in (g) and (h) in FIG. 11 are not selected. The merging block candidate calculation unit 114 derives merging block candidates for merging mode using motion vectors and others of neighboring blocks of the prediction target block and a motion vector and others of the co-located block (colPic information) stored in the colPic memory 115. Then, the merging block candidate calculation unit 114 calculates the total number of usable-for-merging candidates using a method described later.

Furthermore, the merging block candidate calculation unit 114 assigns merging block candidate indexes each having a different value to the derived merging block candidates. Then, the merging block candidate calculation unit 114 transmits the merging block candidates and merging block candidate indexes to the inter prediction control unit 111. Furthermore, the merging block candidate calculation unit 114 transmits the calculated number of usable-for-merging candidates to the variable-length-encoding unit 116.

The inter prediction control unit 111 selects a prediction mode using which prediction error is the smaller from a prediction mode in which a motion vector derived by motion estimation is used (motion estimation mode) and a prediction mode in which a motion vector derived from a merging block candidate is used (merging mode). The inter prediction control unit 111 also transmits a merging flag indicating whether or not the selected prediction mode is the merging mode to the variable-length-coding unit 116. Furthermore, the inter prediction control unit 111 transmits a merging block candidate index corresponding to the determined merging block candidates to the variable-length-coding unit 116 when the selected prediction mode is the merging mode. Furthermore, the inter prediction control unit 111 transfers the colPic information including the motion vector and others of the prediction target block to the colPic memory 115.

The variable-length-encoding unit 116 generates a bitstream by performing variable-length encoding on the quantized prediction error data, the merging flag, and the picture-type information. The variable-length-encoding unit 116 also sets the total number of usable-for-merging candidates as the size of the merging block candidate list. Furthermore, the variable-length-encoding unit 116 performs variable-length encoding on a merging block candidate index to be used for encoding, by assigning, according to the size of the merging block candidate list, a bit sequence to the merging block candidate index.

[1-2 Execution of Image Encoding Method by Image Encoding Apparatus]

Next, referring to FIG. 13 to FIG. 20, a description is given of processing operations of the image encoding apparatus 100 (execution of the image encoding method).

Figure 13:
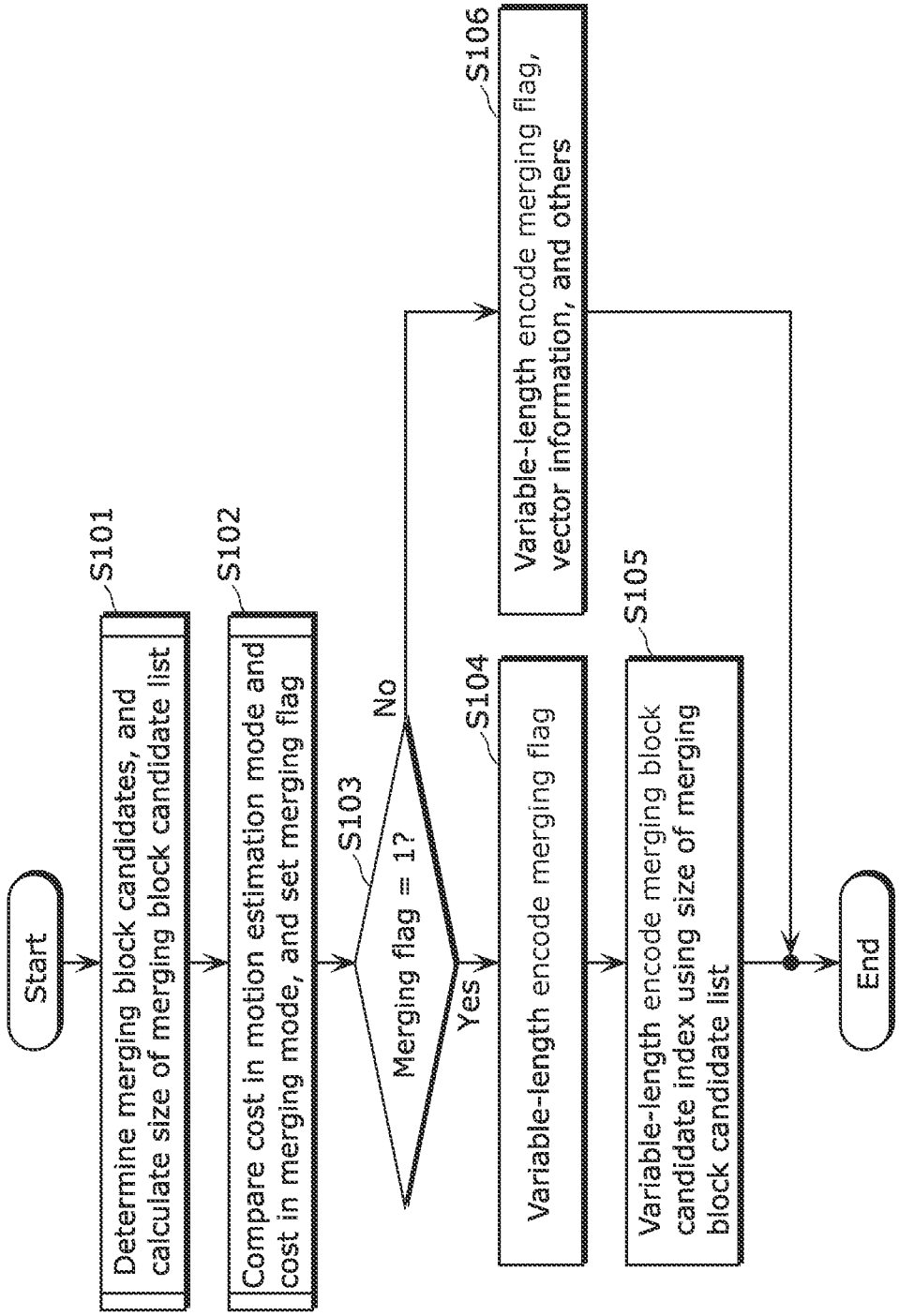
FIG. 13 is a flowchart showing processing operations of the image encoding apparatus according to Embodiment 1.

FIG. 13 is a flowchart showing processing operations of the image encoding apparatus 100 according to Embodiment 1.

The image encoding apparatus 100 first divides a current block to be encoded into a plurality of sub-blocks, and determines one of the sub-blocks to be a prediction target block.

In Step S101, the merging block candidate calculation unit 114 obtains merging candidates each of which is a candidate set of a prediction direction, a motion vector, and a reference picture index which are to be referenced in prediction of the prediction target block. Specifically, the merging block candidate calculation unit 114 derives, for example, merging block candidates from neighboring blocks and a co-located block of the prediction target block. Furthermore, in Embodiment 1, the merging block candidate calculation unit 114 calculates the size of a merging block candidate list using a method described later.

In derivation of the merging block candidates, the merging block candidate calculation unit 114 first generates merging block candidates from neighboring blocks A to D and a co-located block of the prediction target block using a method described later. Furthermore, for example, the merging block candidate calculation unit 114 assigns merging block candidate indexes to the respective merging block candidates as shown in (a) in FIG. 14A.

Shorter codes are assigned to merging block candidate indexes of smaller values. In other words, the smaller the value of a merging block candidate index, the smaller the amount of information necessary for indicating the merging block candidate index.

On the other hand, the larger the value of a merging block candidate index, the larger the amount of information necessary for the merging block candidate index. Therefore, coding efficiency will be increased when merging block candidate indexes of smaller values are assigned to merging block candidates which are more likely to have motion vectors of higher accuracy and reference picture indexes of higher accuracy.

Therefore, a possible case is that the merging block candidate calculation unit 114 counts the total number of times of selection of each merging block candidate as a merging block, and assigns merging block candidate indexes of smaller values to blocks with a larger total number of the times. Specifically, this can be achieved by specifying a merging block selected from neighboring blocks and assigning a merging block candidate index of a smaller value to the specified merging block when a current block is encoded.

The merging block candidate calculation unit 114 then removes unusable-for-merging candidates and identical candidates using a method described later. Here, the merging block candidate calculation unit 114 may add new candidates. The new candidates need not necessarily be added.

In Embodiment 1, a merging block candidate unusable for generating a prediction picture is referred to as an unusable-for-merging candidate. A block corresponding to the unusable-for-merging candidate is referred to as a non-merging target block. Examples of the non-merging target block include a neighboring block included in the same current block. In Embodiment 1, examples of the non-merging target block further include (1) a block having no information such as a motion vector (a block encoded by intra prediction), (2) a block outside the boundary of a slice including the current block or the boundary of a picture including the current block), and (3) a block yet to be encoded.

A merging block candidate usable for generating a prediction picture is referred to as a usable-for-merging candidate. A block corresponding to the usable-for-merging candidate is referred to as a merging target block.

In addition, among a plurality of merging block candidates, a merging block candidate identical in motion vector, reference picture index, and prediction direction to any other merging block candidate is referred to as an identical candidate.

Figure 14A:
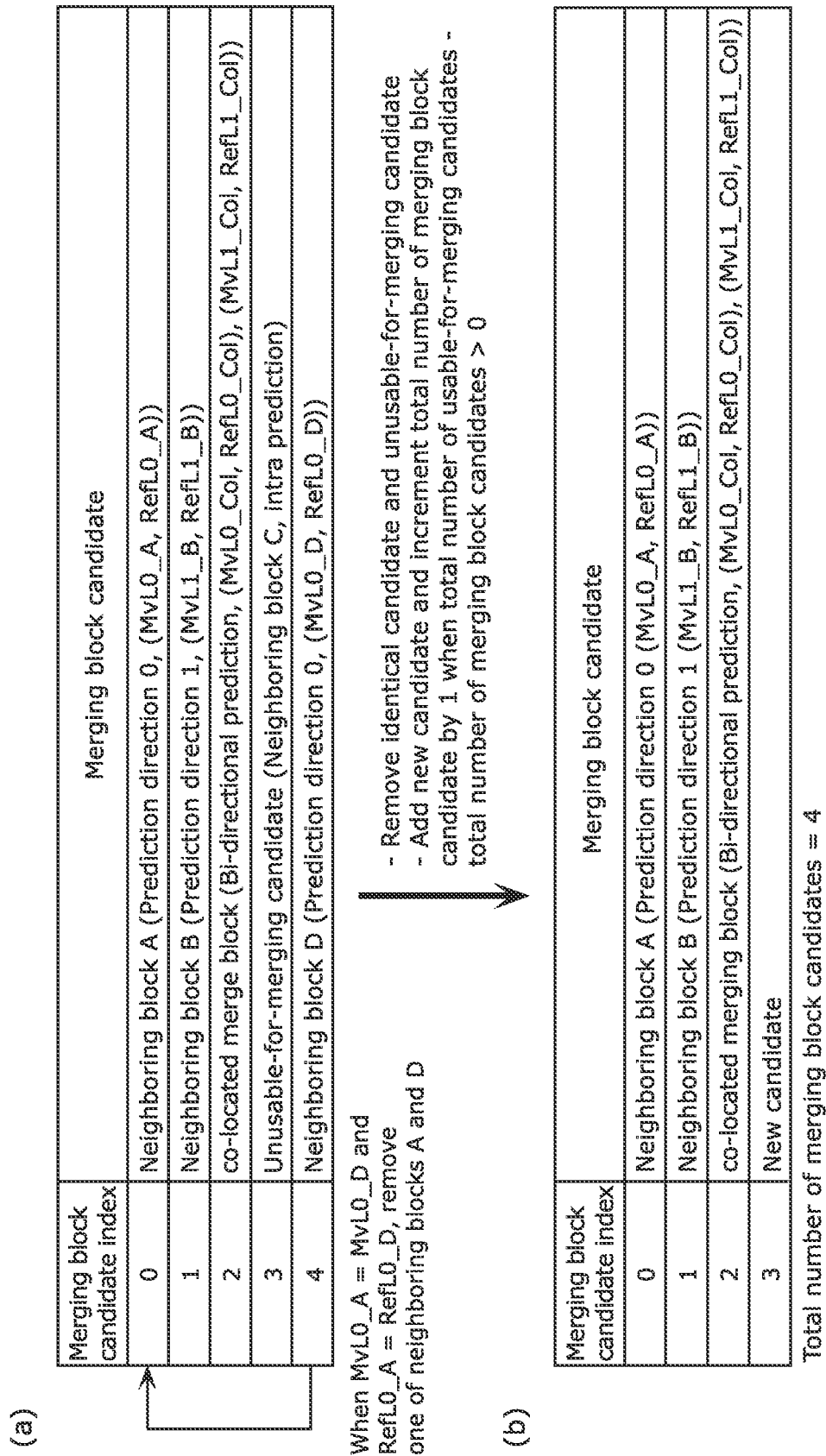
FIG. 14A shows an exemplary merging block candidate list according to Embodiment 1.

In the case shown in (a) of FIG. 14A, the neighboring block C is an unusable-for-merging candidate because it is a block encoded by intra prediction. The neighboring block D is an identical candidate because it is identical in motion vector, reference picture index, and prediction direction to the neighboring block A.

In FIG. 14A, (b) shows an example of a merging block candidate list calculated in the case where the same current block includes no neighboring block (non-merging target block). FIG. 14B shows a merging block candidate list calculated in the case where the neighboring block A is a non-merging target block included in the same current block. FIG. 14C shows a merging block candidate list calculated in the case where the neighboring block B is a non-merging target block included in the same current block. FIG. 14D shows a merging block candidate list calculated in the case where the neighboring blocks A and B are non-merging target blocks included in the same current block. A description is given later of determination of a non-merging target block.

In Step S102, the inter prediction control unit 111 selects a prediction mode (selects a merging candidate used for encoding the current block) based on comparison, using a method described later, between prediction error of a prediction picture generated using a motion vector derived by motion estimation and prediction error of a prediction picture generated using a motion vector obtained from a merging block candidate. When the selected prediction mode is the merging mode, the inter prediction control unit 111 sets the merging flag to 1, and when not, the inter prediction control unit 111 sets the merging flag to 0.

The variable-length-encoding unit 116 adds, to a bitstream, an index for identifying the selected merging candidate by executing Steps S103 to S105.

More specifically, in Step S103, whether or not the merging flag is 1 (that is, whether or not the selected prediction mode is the merging mode) is determined.

When the result of the determination in Step S103 is true (Yes, S103), the variable-length-encoding unit 116 attaches the merging flag to a bitstream in Step S104. Subsequently, in Step S105, the variable-length-encoding unit 116 assigns bit sequences according to the size of the merging block candidate list as shown in FIG. 5 to the merging block candidate indexes of merging block candidates to be used for encoding. Then, the variable-length-encoding unit 116 performs variable-length encoding on the assigned bit sequence.

On the other hand, when the result of the determination in Step S103 is false (S103, No), the variable-length-encoding unit 116 attaches information on a merging flag and a motion estimation vector mode to a bitstream in Step S106.

In Embodiment 1, a merging block candidate index having a value of "0" is assigned to the neighboring block A as shown in (a) in FIG. 14A. A merging block candidate index having a value of "1" is assigned to the neighboring block B. A merging block candidate index having a value of "2" is assigned to the co-located merging block. A merging block candidate index having a value of "3" is assigned to the neighboring block C. A merging block candidate index having a value of "4" is assigned to the neighboring block D.

It should be noted that the merging block candidate indexes having such values may be assigned otherwise. For example, the variable-length-encoding unit 116 may assign a merging block candidate index having a value larger than that of a neighboring block to a co-located merging block. Furthermore, for example, when a new candidate is added using a method described later, the variable-length-encoding unit 116 may assign smaller values to preexistent merging block candidates and a larger value to the new candidate. In other words, the variable-length-encoding unit 116 may assign a merging block candidate index of a smaller value to a preexistent merging block candidate in priority to a new candidate.

Furthermore, neighboring blocks for obtaining merging block candidates are not limited to the neighboring blocks A to D and a co-located block. For example, merging block candidates may be obtained from the neighboring block E shown in FIG. 3. Furthermore, it is not necessary to use all of the neighboring blocks A to D and all of the neighboring blocks of a co-located block as merging block candidates. For example, it is also possible to use only the neighboring blocks A and B as merging block candidates.

Furthermore, although the variable-length-encoding unit 116 attaches a merging block candidate index to a bitstream in Step S105 in FIG. 13 in Embodiment 1, attaching such a merging block candidate index to a bitstream is not always necessary. For example, the variable-length-encoding unit 116 need not attach a merging block candidate index to a bitstream when the size of the merging block candidate list is "1". The amount of information on the merging block candidate index is thereby reduced.

Figure 15:
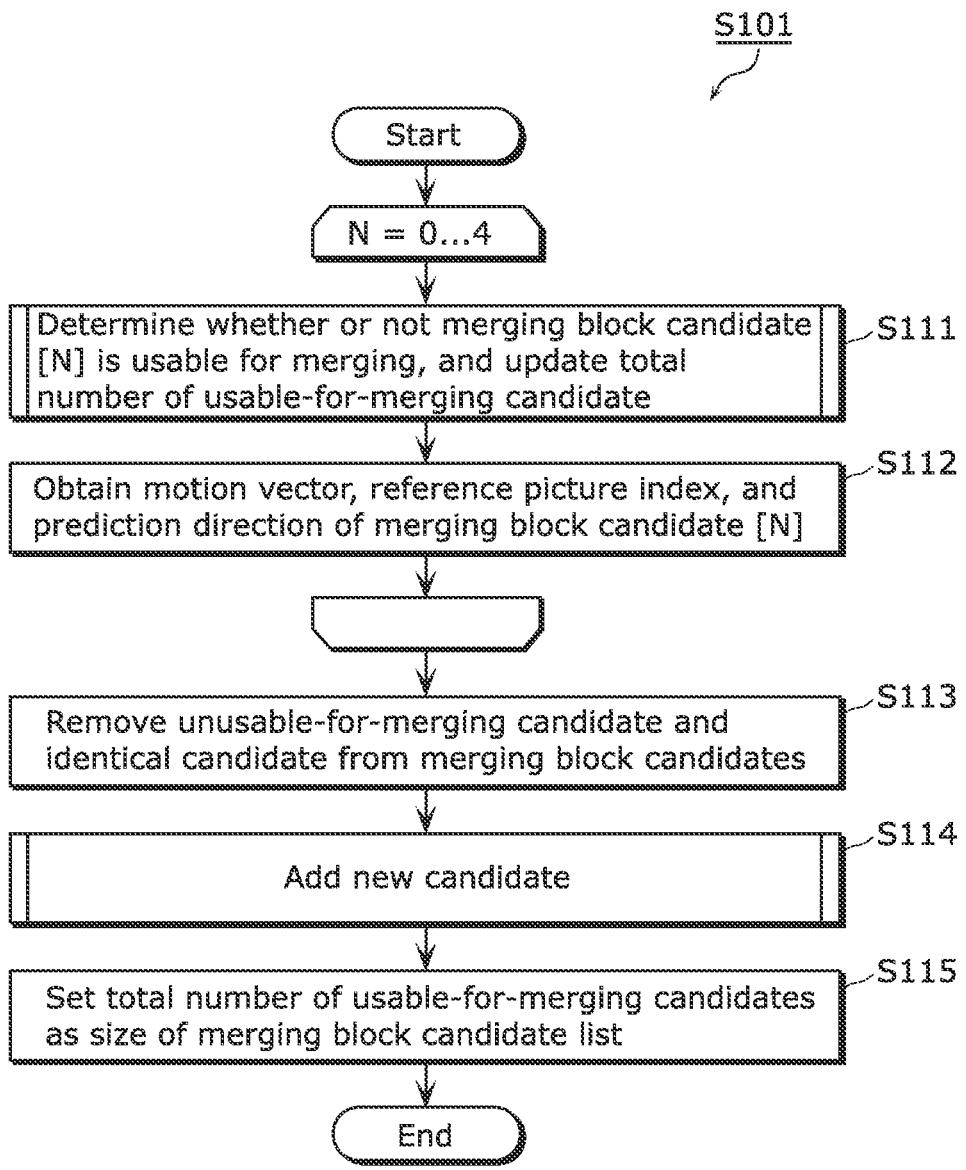
FIG. 15 is a flowchart illustrating a process for calculating merging block candidates and the size of a merging block candidate list according to Embodiment 1.

FIG. 15 is a flowchart showing details of the process in Step S101 in FIG. 13. Specifically, FIG. 15 illustrates a method of calculating merging block candidates and the size of a merging block candidate list. FIG. 15 will be described below.

In Step S111, the merging block candidate calculation unit 114 determines whether or not a merging block candidate [N] is a usable-for-merging candidate using a method described later (part of first derivation processing). Then, the merging block candidate calculation unit 114 updates the total number of usable-for-merging candidates according to the result of the determination.

Here, N denotes an index value for identifying each merging block candidate. In Embodiment 1, N takes values from 0 to 4. Specifically, the neighboring block A in FIG. 3 is assigned to a merging block candidate [0]. The neighboring block B in FIG. 3 is assigned to a merging block candidate [1]. The co-located merging block is assigned to a merging block candidate [2]. The neighboring block C in FIG. 3 is assigned to a merging block candidate [3]. The neighboring block D in FIG. 3 is assigned to a merging block candidate [4].

In Step S112, the merging block candidate calculation unit 114 obtains the motion vector, reference picture index, and prediction direction of the merging block candidate [N] and adds them to a merging block candidate list (part of the first derivation processing).

In Step S113, the merging block candidate calculation unit 114 searches the merging block candidate list for an unusable-for-merging candidate and an identical candidate, and removes the unusable-for-merging candidate and the identical candidate from the merging block candidate list as shown in FIG. 14A to FIG. 14C.

In Step S114, the merging block candidate calculation unit 114 adds a new candidate to the merging block candidate list using a method described later. Here, when a new candidate is added, the merging block candidate calculation unit 114 may reassign merging block candidate indexes so that the merging block candidate indexes of smaller values are assigned to preexistent merging block candidates in priority to the new candidate. In other words, the merging block candidate calculation unit 114 may reassign the merging block candidate indexes so that a merging block candidate index of a larger value is assigned to the new candidate. The amount of code of merging block candidate indexes is thereby reduced.

In Step S115, the merging block candidate calculation unit 114 sets the total number of usable-for-merging candidates calculated in Step S111 as the size of the merging block candidate list. For example, in the example shown in FIG. 14A, the calculated number of usable-for-merging candidates is "4", and the size of the merging block candidate list is set at 4.

The new candidate in Step S114 is a candidate newly added to merging block candidates using a method described later when the total number of merging block candidates is smaller than the total number of usable-for-merging candidates. Examples of such a new candidate include the left-top neighboring block E in FIG. 3, a block corresponding to any of neighboring blocks A, B, C, and D of a co-located block. Furthermore, examples of such a new candidate further include a block having a motion vector, a reference picture index, a prediction direction, and the like which are statistically obtained for the whole or a certain region of a reference picture. Thus, when the total number of merging block candidates is smaller than the total number of usable-for-merging candidates, the merging block candidate calculation unit 114 adds a new candidate having a new motion vector, a new reference picture index, and a new prediction direction so that coding efficiency can be increased.

Figure 16:
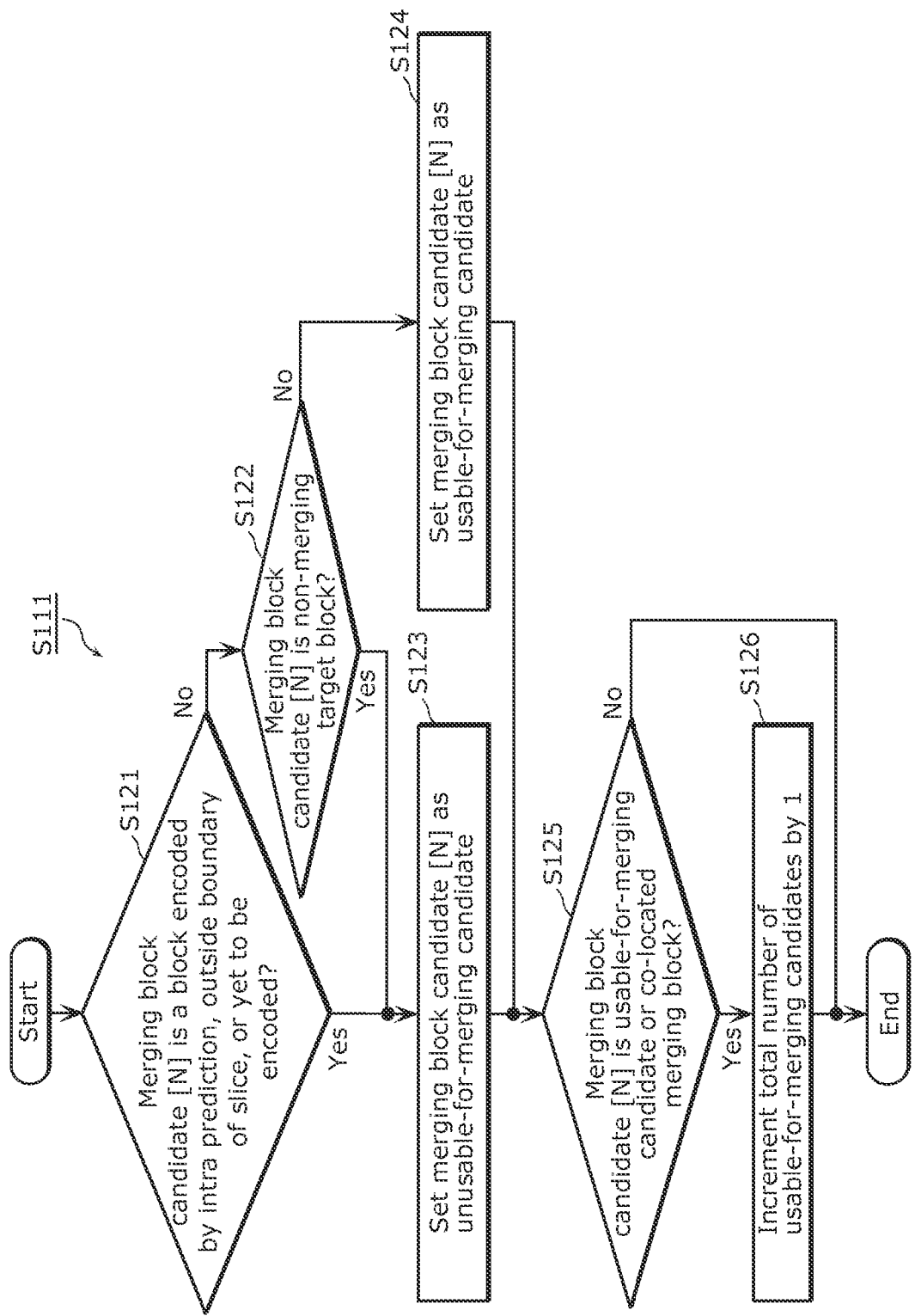
FIG. 16 is a flowchart illustrating an operation for calculating a total number of usable-for-merging candidates according to Embodiment 1.

FIG. 16 is a flowchart showing details of the process in Step S111 in FIG. 15. Specifically, FIG. 16 illustrates a method of determining whether or not a merging block candidate [N] is a usable-for-merging candidate and updating the total number of usable-for-merging candidates. FIG. 16 will be described below.

In Step S121, the merging block candidate calculation unit 114 determines whether it is true or false that (1) a merging block candidate [N] has been encoded by intra prediction, (2) the merging block candidate [N] is a block outside the boundary of a slice including the current block or the boundary of a picture including the current block, or (3) the merging block candidate [N] is yet to be encoded.

When the result of the determination in Step S121 is true (S121, Yes), the merging block candidate calculation unit 114 determines a block corresponding to the merging block candidate [N] to be a non-merging target block. Furthermore, in Step S123, the merging block candidate calculation unit 114 sets the merging block candidate [N] as an unusable-for-merging candidate.

On the other hand, when the result of the determination in Step S121 is false (S121, No), the merging block candidate calculation unit 114 determines, using a method described later, whether or not the merging block candidate [N] is a non-merging target block (first determination processing) in Step S122.

When the result of the determination in Step S122 is true (S122, Yes), the merging block candidate calculation unit 114 determines the merging block candidate [N] to be an unusable-for-merging candidate in Step S123.

On the other hand, when the result of the determination in Step S122 is false (S121, No), the merging block candidate calculation unit 114 determines the merging block candidate [N] to be a usable-for-merging candidate in Step S124.

In Step S125, the merging block candidate calculation unit 114 determines whether it is true or false that the merging block candidate [N] is either a usable-for-merging candidate or a co-located merging block candidate.

When the result of the determination in Step S125 is true (S125, Yes), the merging block candidate calculation unit 114 updates the total number of merging block candidates by incrementing it by one in Step S126. On the other hand, when the result of the determination in Step S125 is false (S125, No), the merging block candidate calculation unit 114 does not update the total number of usable-for-merging candidates.

Thus, when a merging block candidate is a co-located merging block, the merging block candidate calculation unit 114 increments the total number of usable-for-merging candidate by one, regardless of whether the co-located block is a usable-for-merging candidate or an unusable-for-merging candidate. This prevents discrepancy of the numbers of usable-for-merging candidates between the image encoding apparatus and the image decoding apparatus even when information on a co-located merging block is lost due to an incident such as packet loss.

The total number of usable-for-merging candidates is set as the size of the merging block candidate list in Step S115 shown in FIG. 15. Furthermore, the size of the merging block candidate list is used in variable-length encoding of merging block candidate indexes in Step S105 shown in FIG. 13. This makes it possible for the image encoding apparatus 100 to generate a bitstream which can be normally decoded so that merging block candidate indexes can be obtained even when information on reference picture including a co-located block is lost.

It is to be noted that the example described in Embodiment 1 in which Step S121 is performed before Step S122 in FIG. 16 is not limiting. For example, Step 122 may be performed before Step S121. In addition, for example, Step S121 and Step S122 may be performed in a single step. Furthermore, Step S121 need not be necessarily performed.

The main structural element in Embodiment 1 is Step S122.

Figure 17:
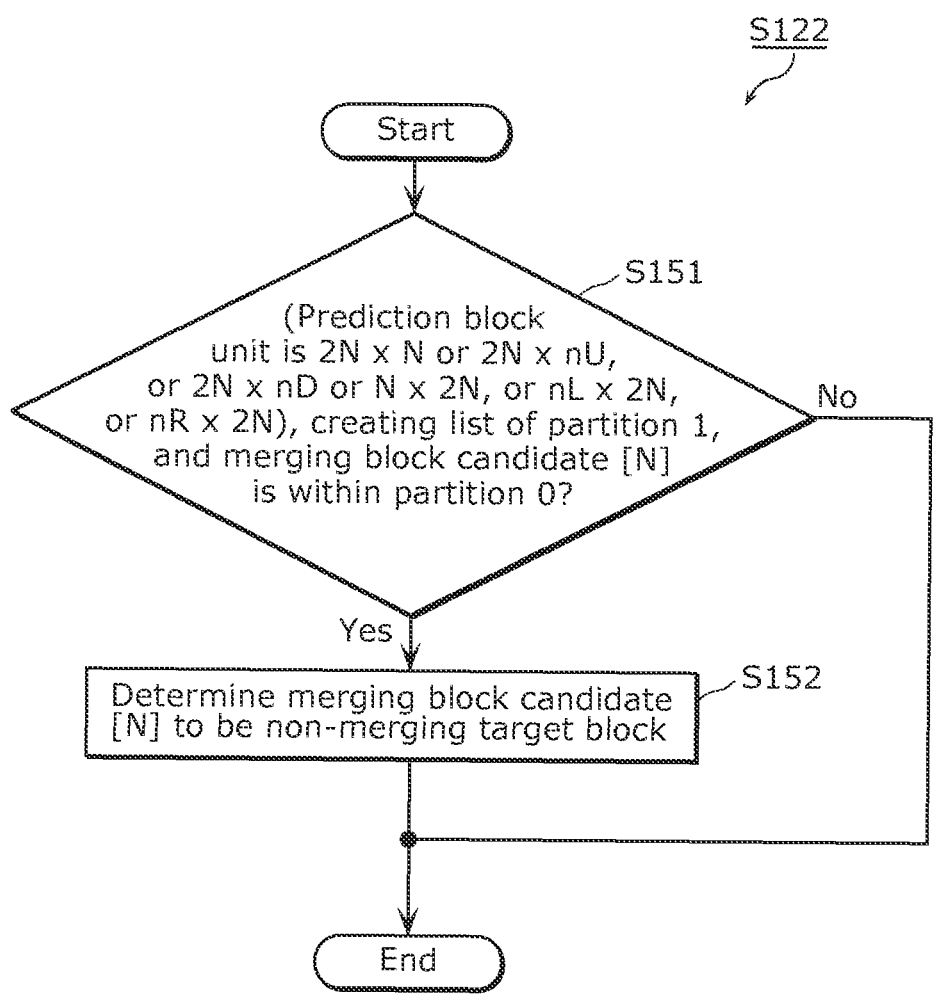
FIG. 17 is a flowchart illustrating an operation for determining a non-merging target block according to Embodiment 1.

FIG. 17 is a flowchart showing details of the process in Step S122 in FIG. 16. Specifically, FIG. 17 illustrates a method of determining whether or not a block corresponding to a merging block candidate [N] is a non-merging target block. FIG. 17 will be described below.

In Step S122, when the block on which determination is to be made (determination target block) is included in a current block which includes a prediction target block, the determination target block is determined to be a non-merging target block.

In Step S151, the merging block candidate calculation unit 114 determines whether it is true that (i) the PU of a prediction target block is one of 2N×N, 2N×nU, 2N×nD, N×2N, nL×2N, or nR×2N, (ii) merging block candidates are being calculated for the partition 1 of the PU1, and (iii) a prediction target block corresponding to the merging block candidate [N] is located within the same CU.

When the result of the determination in Step S151 is true (S151, Yes), the merging block candidate calculation unit 114 determines a prediction target block corresponding to the merging block candidate [N] to be a non-merging target block.

In such a manner, when the prediction target block corresponding to the merging block candidate [N] is a non-merging target block, the merging block candidate [N] is an unusable-for-merging candidate and is removed from the merging block candidate list.

In Embodiment 1, when the result of the determination in Step S151 is true (S151, Yes), the merging block candidate calculation unit 114 determines a prediction target block corresponding to the merging block candidate [N] to be a non-merging target block; however, the determination is not limited to this example. When the result of the determination in Step S151 is false (S151, No), the merging block candidate calculation unit 114 may determine a prediction target block corresponding to the merging block candidate [N] to be a merging target block. Even in this case, the same results can be obtained as the case where the merging block candidate calculation unit 114 determines a prediction target block corresponding to the merging block candidate [N] to be a non-merging target block when the result of the determination in S151 is true.

In this case, the merging block candidate calculation unit 114 determines whether or not the merging block candidate [N] is a merging target block in Step S122 in FIG. 16. The merging block candidate calculation unit 114 proceeds to Step S124 when the result of the determination in S122 is a merging target block. The merging block candidate calculation unit 114 proceeds to Step S123 when the result of the determination in S122 is not a merging target block.

Figure 18:
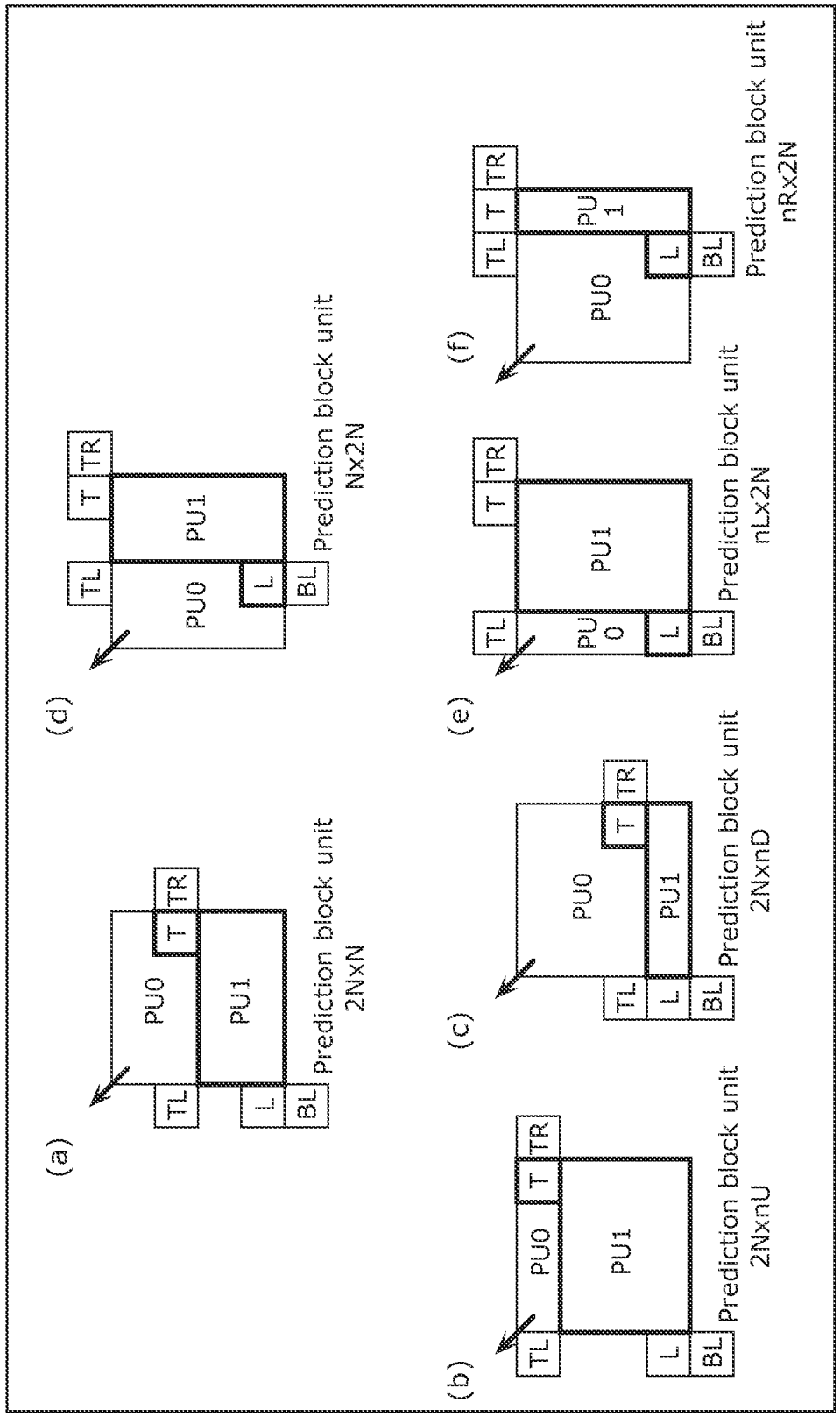
FIG. 18 shows a relationship between a coding block unit and prediction block units according to Embodiment 1.

FIG. 18 is a block diagram illustrating blocks to be non-merging target blocks in each prediction block unit corresponding to (a) to (f) in FIG. 11. In FIG. 18, prediction target blocks (partition 1) and non-merging target blocks corresponding to the prediction target blocks are enclosed by thick lines. In other words, among neighboring blocks, neighboring blocks enclosed by normal lines but not thick lines are merging target blocks.

A block L corresponds to the neighboring block A in FIG. 3. A block T corresponds to the neighboring block B in FIG. 3. A block TR corresponds to the neighboring block C in FIG. 3. A block BL corresponds to the neighboring block D in FIG. 3. A block TL corresponds to the neighboring block E in FIG. 3.

As shown in (a) to (c) in FIG. 18, in the case where a PU is 2N×N, 2N×nU, or 2N×nD and a merging block candidate list of the partition 1 is calculated, the block T located on top of the PU is included in the same CU. Hence, the block T is a non-merging target block. Accordingly, in this case, since the block T (neighboring block B) is a non-merging target block, the neighboring block B is removed from the merging block candidates in deriving the merging block candidates as shown in FIG. 14C.

Furthermore, as shown in (d) to (f) in FIG. 18, in the case where a PU is N×2N, nL×2N, or nR×2N and a merging block candidate list of the partition 1 is calculated, the block L located to the left of the PU is included in the same CU. Hence, the block L is a non-merging target block. Accordingly, in this case, since the block L (neighboring block A) is a non-merging target block, the neighboring block A is removed from the merging block candidates in deriving the merging block candidates as shown in FIG. 14B.

A prediction picture, which is generated in the case where the partitions 0 and 1 have the same prediction direction, the same motion vector, and the same reference picture index, is the same as the prediction picture generated in units of a PU of 2N×2N ((h) in FIG. 11) which does not involve divisions of the CU. Hence, adding the merging block candidates obtained from a block included in the partition 0 to the merging block candidate list of the partition 1 results in assigning merging block candidate indexes to redundant merging block candidates. In Embodiment 1, in generating a prediction picture on a per PU basis (where PU is obtained by dividing a CU into partitions), it is determined whether or not a neighboring block for which merging block candidates are calculated is located within the same CU. When the neighboring block is within the same CU, the merging block candidates obtained from the neighboring block are not added to the merging block candidate list. This eliminates the need for assigning merging block candidate indexes to redundant merging block candidates, so that coding efficiency is increased. Furthermore, removal of redundant merging block candidates from the merging block candidate list allows addition of a new candidate which is a candidate for increasing coding efficiency and which is calculated using a method described later. It is possible to increase coding efficiency by removing redundant merging block candidates and adding a new candidate.

It is to be noted that the example shown in Embodiment 1 where unusable-for-merging candidates are added to the merging block candidate list and then are removed from the merging block candidate list is not limiting. For example, it may be that unusable-for-merging candidates are not added to the merging block candidate list.

Figure 19:
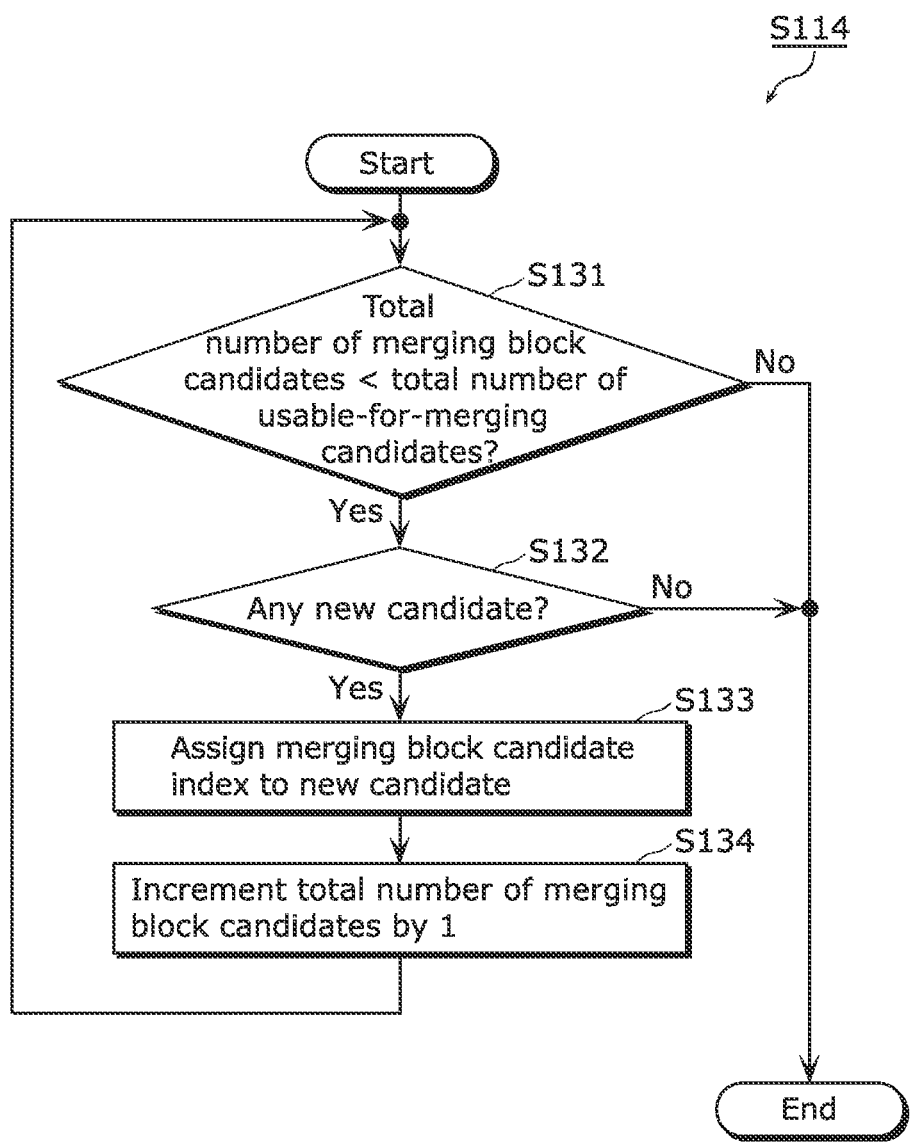
FIG. 19 is a flowchart illustrating a process for adding a new candidate according to Embodiment 1.

FIG. 19 is a flowchart showing details of the process in Step S114 in FIG. 15. Specifically, FIG. 19 illustrates a method of adding a new candidate. FIG. 19 will be described below.

In Step S131, the merging block candidate calculation unit 114 determines whether or not the total number of merging block candidates is smaller than the total number of usable-for-merging candidates, in other words, the merging block candidate calculation unit 114 determines whether or not the total number of merging block candidates is still below the total number of usable-for-merging candidates.

Here, when the result of the determination in Step S131 is true (Step S131, Yes), in Step S132, the merging block candidate calculation unit 114 determines whether or not there is a new candidate which can be added as a merging block candidate to the merging block candidate list. Here, when the result of the determination in Step S132 is true (Step S132, Yes), the merging block candidate calculation unit 114 assigns a merging block candidate index having a value to the new candidate and adds the new candidate to the merging block candidate list in Step S133. Furthermore, in Step S134, the merging block candidate calculation unit 114 increments the total number of merging block candidates by one.

On the other hand, when the result of the determination in Step S131 or in Step S132 is false (Step S131 or Step S132, No), the process for adding a new candidate ends. In other words, the process for adding a new candidate ends when the total number of merging block candidates numbers the total number of usable-for-merging candidates or when there is no new candidate.

Figure 20:
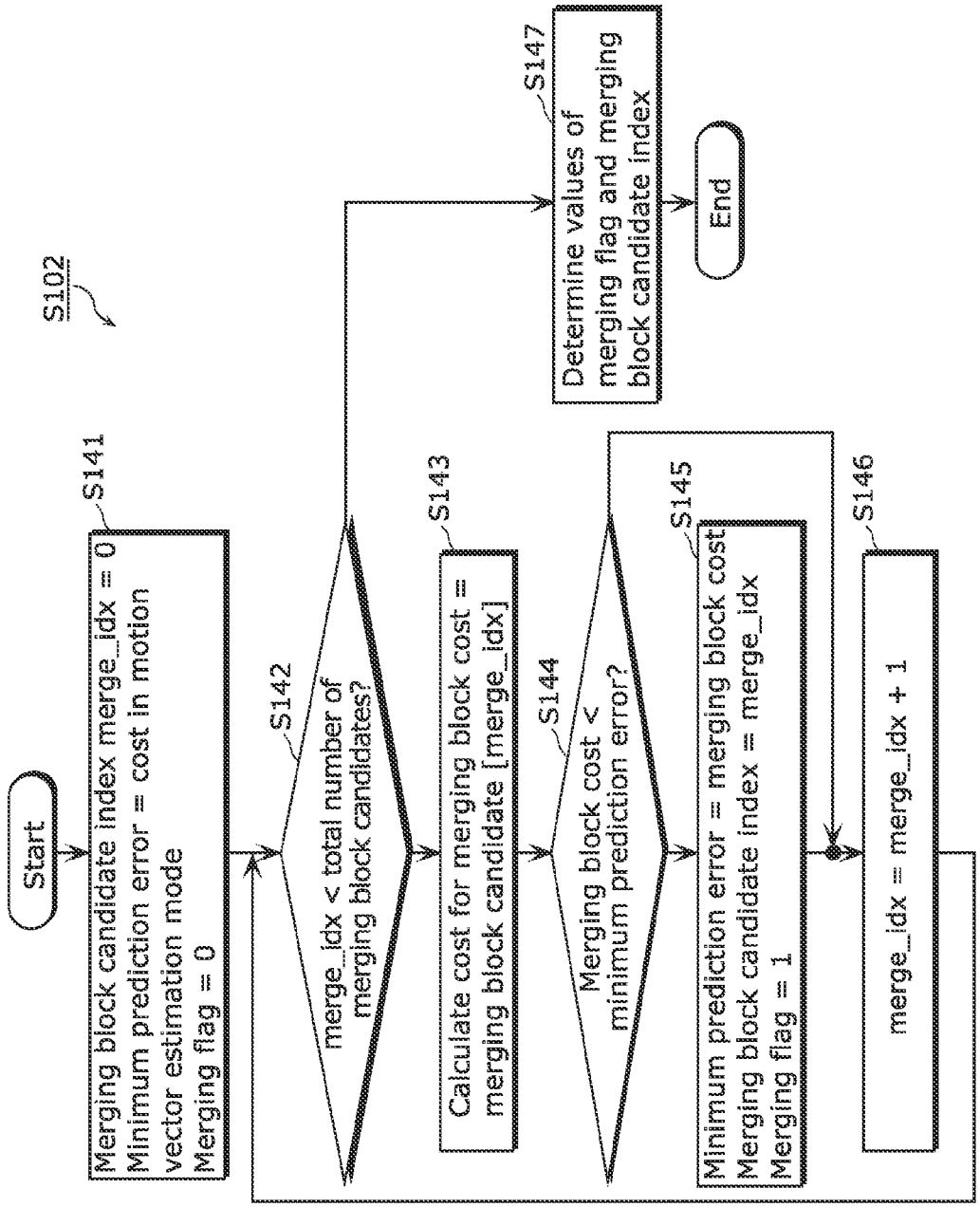
FIG. 20 is a flowchart illustrating a process for selecting a merging block candidate according to Embodiment 1.

FIG. 20 is a flowchart showing details of the process in Step S102 in FIG. 13. Specifically, FIG. 20 illustrates a process for selecting a merging block candidate. FIG. 20 will be described below.

In Step S141, the inter prediction control unit 111 sets a merging block candidate index at 0, the minimum prediction error at the prediction error (cost) in the motion vector estimation mode, and a merging flag at 0. Here, the cost is calculated using the following formula for an R-D optimization model, for example.

$$\text{Cost}=D+\lambda R \quad \text{(Equation 1)}$$

In Equation 1, D denotes coding distortion. For example, D is the sum of absolute differences between original pixel values of a current block to be encoded and pixel values obtained by encoding and decoding of the current block using a prediction picture generated using a motion vector. R denotes the amount of generated codes. For example, R is the amount of code necessary for coding a motion vector used for generation of a prediction picture. $\lambda$ denotes an undetermined Lagrange multiplier.

In Step S142, the inter prediction control unit 111 determines whether or not the value of a merging block candidate index is smaller than the total number of merging block candidates of a prediction target block. In other words, the inter prediction control unit 111 determines whether or not there is still a merging block candidate on which the process from Step S143 to Step S145 has not been performed yet.

When the result of the determination in Step S142 is true (S142, Yes), in Step S143, the inter prediction control unit 111 calculates the cost for a merging block candidate to which a merging block candidate index is assigned. Then, in Step S144, the inter prediction control unit 111 determines whether or not the calculated cost for a merging block candidate is smaller than the minimum prediction error.

Here, when the result of the determination in Step S144 is true, (S144, Yes), the inter prediction control unit 111 updates the minimum prediction error, the merging block candidate index, and the value of the merging flag in Step S145. On the other hand, when the result of the determination in Step S144 is false (S144, No), the inter prediction control unit 111 does not update the minimum prediction error, the merging block candidate index, and the value of the merging flag.

In Step S146, the inter prediction control unit 111 increments the merging block candidate index by one, and repeats from Step S142 to Step S146.

On the other hand, when the result of Step S142 is false (S142, No), that is, there is no more unprocessed merging block candidate, the inter prediction control unit 111 fixes the final values of the merging flag and merging block candidate index in Step S147.

[1-3 Effects, Variations and so on]

As described above, in generating a prediction picture by dividing a CU into PUs (partitions), and when a neighboring block is located within the same CU, the image encoding apparatus 100 according to Embodiment 1 does not add merging block candidates obtained from the neighboring block to the merging block candidate list. This eliminates the need for assigning merging block candidate indexes to redundant merging block candidates, so that the image encoding apparatus 100 according to Embodiment 1 can have a higher coding efficiency. Furthermore, removal of redundant merging block candidates from the merging block candidate list allows addition of a larger number of new candidates, which leads to an increase in coding efficiency.

It is to be noted that the example shown in Embodiment 1 where a CU is divided into PUs (partitions) of 2N×N, 2N×nU, 2N×nD, N×2N, nL×2N, or nR×2N is not limiting. For example, Embodiment 1 may be applied to the case where a PU is N×N as shown in (g) in FIG. 11. In this case, too, when a neighboring block is located within the same CU, the image encoding apparatus 100 does not add the neighboring block to the merging block candidate list, so that a merging block candidate index need not be assigned to the redundant merging block candidate. This allows an increase in coding efficiency.

The image encoding apparatus 100 according to Embodiment 1 is capable of calculating the size of a merging block candidate list for use in encoding or decoding of a merging block candidate index, using a method independent of information on reference pictures including a co-located block. The image encoding apparatus 100 thereby achieves enhanced error resistance.

More specifically, regardless of whether or not a co-located merging block is a usable-for-merging candidate, the image encoding apparatus 100 according to Embodiment 1 increments the total number of usable-for-merging candidates by one each time a merging block candidate is determined as a co-located merging block. Then, the image encoding apparatus 100 determines a bit sequence to be assigned to a merging block candidate index, using the total number of usable-for-merging candidates calculated in this manner. The image encoding apparatus 100 is thus capable of generating a bitstream from which the merging block candidate index can be decoded normally even when information on reference pictures including a co-located block is lost.

Furthermore, when the total number of merging block candidates is smaller than the total number of usable-for-merging candidates, the image encoding apparatus 100 according to Embodiment 1 adds, as a merging block candidate, a new candidate having a new motion vector, a new reference picture index, and a new prediction direction so that coding efficiency can be increased.

It should be noted that the example described in Embodiment 1 in which regardless of whether a co-located merging block is a usable-for-merging candidate or an unusable-for-merging candidate, the image encoding apparatus 100 increments the total number of merging block candidates by one as shown in Step S125 in FIG. 16 is not limiting. Relative to other blocks, the image encoding apparatus 100 may also increment the total number of merging block candidates by one each time regardless of whether the blocks are usable-for-merging candidates or unusable-for-merging candidates.

In this case, for example, the image encoding apparatus 100 may always fix the total number of usable-for-merging candidates at a maximum value Max of the total number of merging block candidates. In other words, it may be that the image encoding apparatus 100 considers the merging block candidates in all neighboring blocks as usable-for-merging candidates, fixes the size of the merging block candidate list at the maximum value Max of the total number of merging block candidates, and encode the merging block candidate indexes. For example, in Embodiment 1, the maximum value Max of the total number of merging block candidates is 5 (the neighboring block A, the neighboring block B, the co-located merging block, the neighboring block C, and the neighboring block D). Hence, the image encoding apparatus 100 may always set 5 as the size of the merging block candidate list, and encode the merging block candidate indexes.

Furthermore, for example, in the case where the maximum value Max of the total number of merging block candidates is 4 (the neighboring block A, the neighboring block B, the neighboring block C, and the neighboring block D) such as a picture which is encoded with no reference to a co-located merging block (B picture or P picture encoded with reference to I picture), the image encoding apparatus 100 may always set the value of "4" as the size of the merging block candidate list and encode the merging block candidate indexes.

In this manner, it may be that the size of the merging block candidate list is determined according to the maximum value Max of the total number of merging block candidates. In this case, the image encoding apparatus 100 performs variable-length encoding using the maximum value Max as the size of the merging block candidate list in Step S105 in FIG. 13.

With this, it is possible to generate a bitstream having a merging block candidate index that can be decoded by the variable-length-decoding unit in the image decoding apparatus without reference to information on a neighboring block or a co-located block, so that computational complexity for the variable-length-decoding unit can be reduced. Furthermore, the maximum value Max of the total number of merging block candidates may be embedded in, for example, a sequence parameter set (SPS), a picture parameter set (PPS), or a slice header. This makes it possible to change the maximum value Max of the total number of merging block candidates depending on a current picture to be encoded, so that computational complexity can be reduced and coding efficiency can be increased.

It should be noted that the example described in Embodiment 1 in which a merging flag is always attached to a bitstream in merging mode is not limiting. For example, the merging mode may be forcibly selected based on the shape of a block for use in inter prediction of a current block. In this case, the amount of information can be reduced by attaching no merging flag to a bitstream.

It should be noted that the example described in Embodiment 1 where the merging mode is used in which a current block is encoded using a prediction direction, a motion vector, and a reference picture index copied from a neighboring block of the current block is not limiting. For example, a skip merging mode may be used. In the skip merging mode, a current block is encoded with reference to a merging block candidate list created as shown in (b) in FIG. 14A, using a prediction direction, a motion vector, and a reference picture index copied from a neighboring block of the current block in the same manner as in the merging mode. When all resultant prediction errors are zero for the current block, a skip flag is set at 1 and the skip flag and a merging block candidate index are attached to a bitstream. When any of the resultant prediction errors is non-zero, a skip flag is set at 0 and the skip flag, a merging flag, a merging block candidate index, and data of the prediction errors are attached to a bitstream.

It should be noted that the example described in Embodiment 1 where the merging mode is used in which a current block is encoded using a prediction direction, a motion vector, and a reference picture index copied from a neighboring block of the current block is not limiting. For example, a motion vector in the motion vector estimation mode may be encoded using a merging block candidate list created as shown in (b) in FIG. 14A. Specifically, a difference is calculated by subtracting a motion vector of a merging block candidate indicated by a merging block candidate index from a motion vector in the motion vector estimation mode. Furthermore, the calculated difference and the merging block candidate index may be attached to a bitstream.

Optionally, a difference may be calculated by scaling a motion vector MV_Merge of a merging block candidate using a reference picture index RefIdx_ME in the motion estimation mode and a reference picture index RefIdx_Merge of the merging block candidate and subtracting a motion vector scaledMV_Merge of the merging block candidate after the scaling from the motion vector in the motion estimation mode. Furthermore, the calculated difference and the merging block candidate index may be attached to a bitstream. The following is an exemplary formula for the scaling.

$$\text{scaledMV\_Merge} = \text{MV\_Merge} \times (POC(\text{RefIdx\_ME}) - curPOC)/(POC(\text{RefIdx\_Merge}) - curPOC) \quad \text{(Equation 2)}$$

Here, POC (RefIdx_ME) denotes the display order of a reference picture indicated by a reference picture index RefIdx_ME. POC (RefIdx_Merge) denotes the display order of a reference picture indicated by a reference picture index RefIdx_Merge. curPOC denotes the display order of a current picture to be encoded.

Embodiment 2

An image decoding apparatus which executes an image decoding method according to Embodiment 2 will be described with reference to FIG. 21 to FIG. 24. In Embodiment 2, a description is given of a case where a prediction picture is generated by deriving merging block candidates on a per PU basis (on a per prediction target block basis) where PU is obtained by dividing a CU (current block to be decoded).

[2-1 Configuration of Image Decoding Apparatus]

Figure 21:
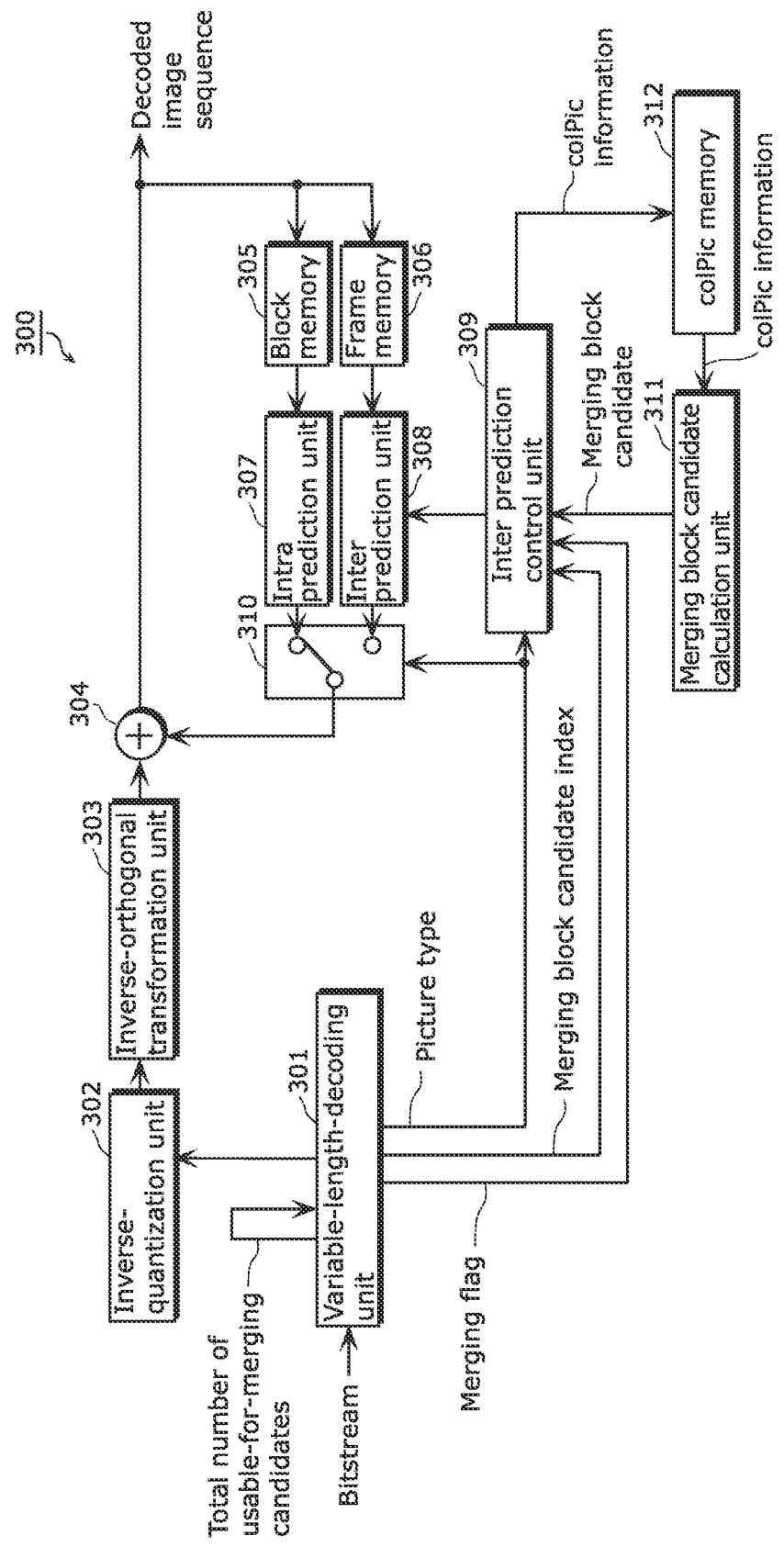
FIG. 21 is a block diagram showing a configuration of an image decoding apparatus according to Embodiment 2.

FIG. 21 is a block diagram showing a configuration of an image decoding apparatus according to Embodiment 2. An image decoding apparatus 300 is an apparatus corresponding to an image encoding apparatus 100 according to Embodiment 1. Specifically, for example, the image decoding apparatus 300 decodes, on a block-by-block basis, encoded images included in a bitstream generated by the image encoding apparatus 100 according to Embodiment 1.

As shown in FIG. 21, the image decoding apparatus 300 includes a variable-length-decoding unit 301, an inverse-quantization unit 302, an inverse-orthogonal-transformation unit 303, an adder 304, block memory 305, frame memory 306, an intra prediction unit 307, an inter prediction unit 308, an inter prediction control unit 309, a switch 310, a merging block candidate calculation unit 311, and colPic memory 312.

The variable-length-decoding unit 301 generates picture-type information, a merging flag, and a quantized coefficient by performing variable-length decoding on an input bitstream. Furthermore, the variable-length-decoding unit 301 performs variable-length decoding on a merging block candidate index using the total number of usable-for-merging candidates described later.

The inverse-quantization unit 302 inverse-quantizes the quantized coefficient obtained by the variable-length decoding.

The inverse-orthogonal-transformation unit 303 generates prediction error data by transforming an orthogonal transformation coefficient obtained by the inverse quantization from a frequency domain to a picture domain.

The block memory 305 stores, in units of a block, decoded image data generated by adding the prediction error data and prediction picture data.

The frame memory 306 stores decoded image data in units of a frame.

The intra prediction unit 307 generates prediction picture data of a current block to be decoded, by performing intra prediction using the decoded image data stored in the block memory 305 in units of a block.

The inter prediction unit 308 generates prediction picture data of a current block to be decoded, by performing inter prediction using the decoded image data stored in the frame memory 306 in units of a frame.

When a current block is decoded by intra prediction decoding, the switch 310 outputs intra prediction picture data generated by the intra prediction unit 307 as prediction picture data of the current block to the adder 304. On the other hand, when a current block is decoded by inter prediction decoding, the switch 310 outputs inter prediction picture data generated by the inter prediction unit 308 as prediction picture data of the current block to the adder 304.

In Embodiment 2, the merging block candidate calculation unit 311 derives merging block candidates on a per PU basis shown in (a) to (f) in FIG. 11. The image decoding apparatus 300 according to Embodiment 2 is an apparatus corresponding to the image encoding apparatus 100 according to Embodiment 1; and thus, in Embodiment 2, a description is given of a case where the PUs shown in (g) and (h) in FIG. 11 are not selected. The merging block candidate calculation unit 311 derives merging block candidates for merging mode using motion vectors and others of neighboring blocks of the prediction target block and a motion vector and others of the co-located block (colPic information) stored in the colPic memory 312, using a method described later. Furthermore, the merging block candidate calculation unit 311 assigns merging block candidate indexes each having a different value to the derived merging block candidates. Then, the merging block candidate calculation unit 311 transmits the merging block candidates and merging block candidate indexes to the inter prediction control unit 309.

The inter prediction control unit 309 causes the inter prediction unit 308 to generate an inter prediction picture using information on motion vector estimation mode when the merging flag decoded is "0". On the other hand, when the merging flag is "1", the inter prediction control unit 309 determines, based on a decoded merging block candidate index, a motion vector, a reference picture index, and a prediction direction for use in inter prediction from a plurality of merging block candidates. Then, the inter prediction control unit 309 causes the inter prediction unit 308 to generate an inter prediction picture using the determined motion vector, reference picture index, and prediction direction. Furthermore, the inter prediction control unit 309 transfers colPic information including the motion vector of the current block to the colPic memory 312.

Finally, the adder 304 generates decoded image data by adding the prediction picture data and the prediction error data.

[2-2 Execution of Image Decoding Method by Image Decoding Apparatus]

Figure 22:
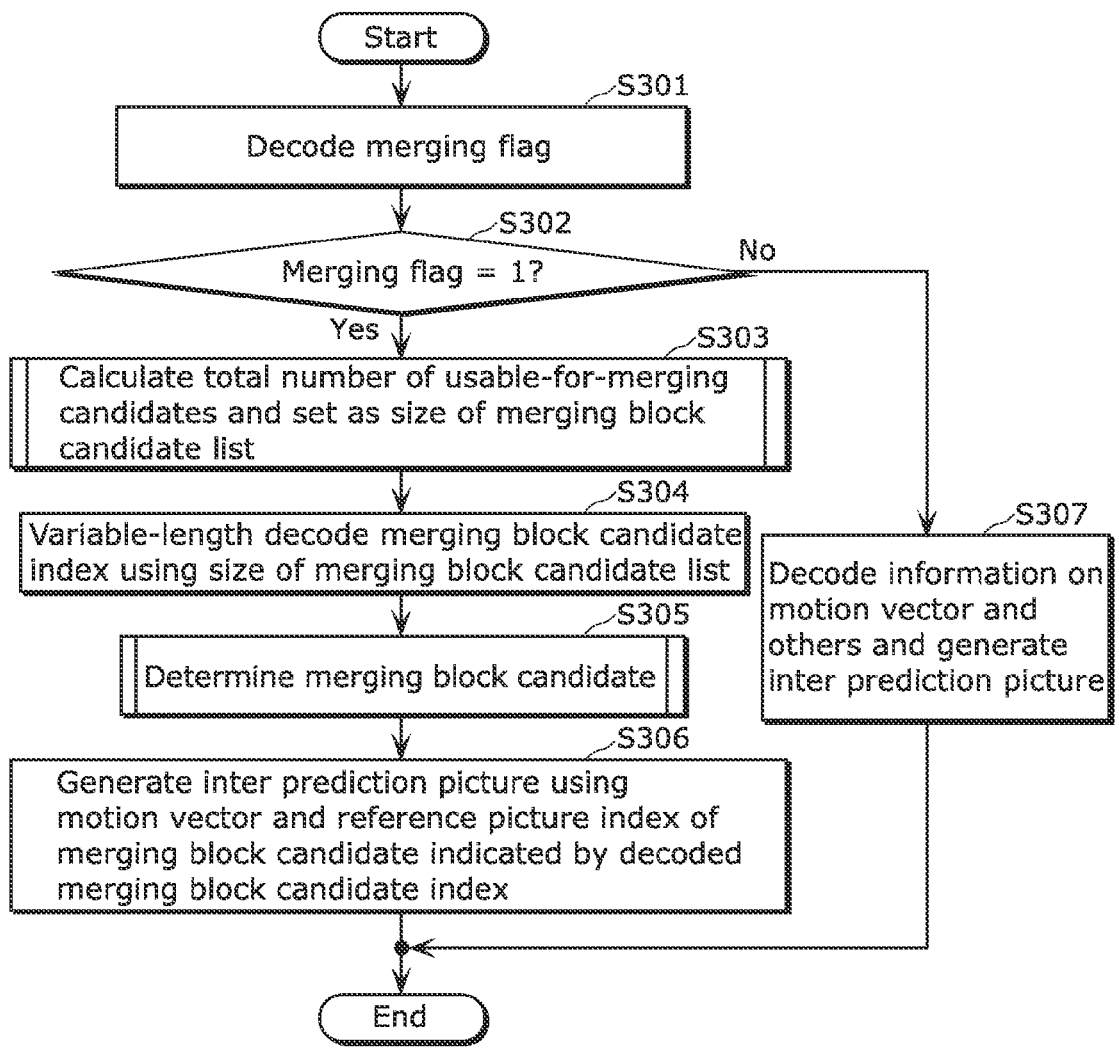
FIG. 22 is a flowchart showing processing operations of the image decoding apparatus according to Embodiment 2.
Figure 23:
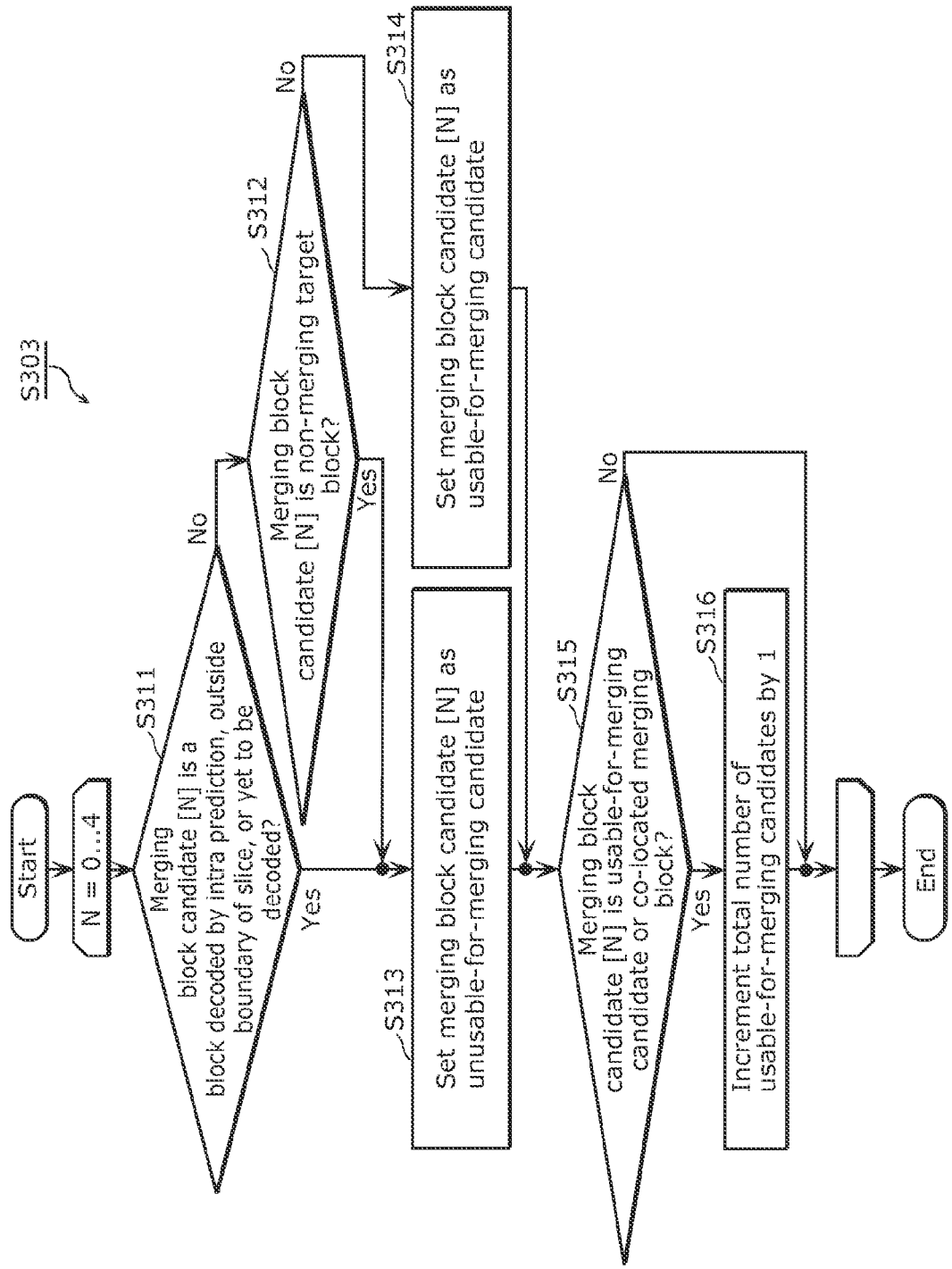
FIG. 23 is a flowchart illustrating a process for setting the size of a merging block candidate list according to Embodiment 2.
Figure 24:
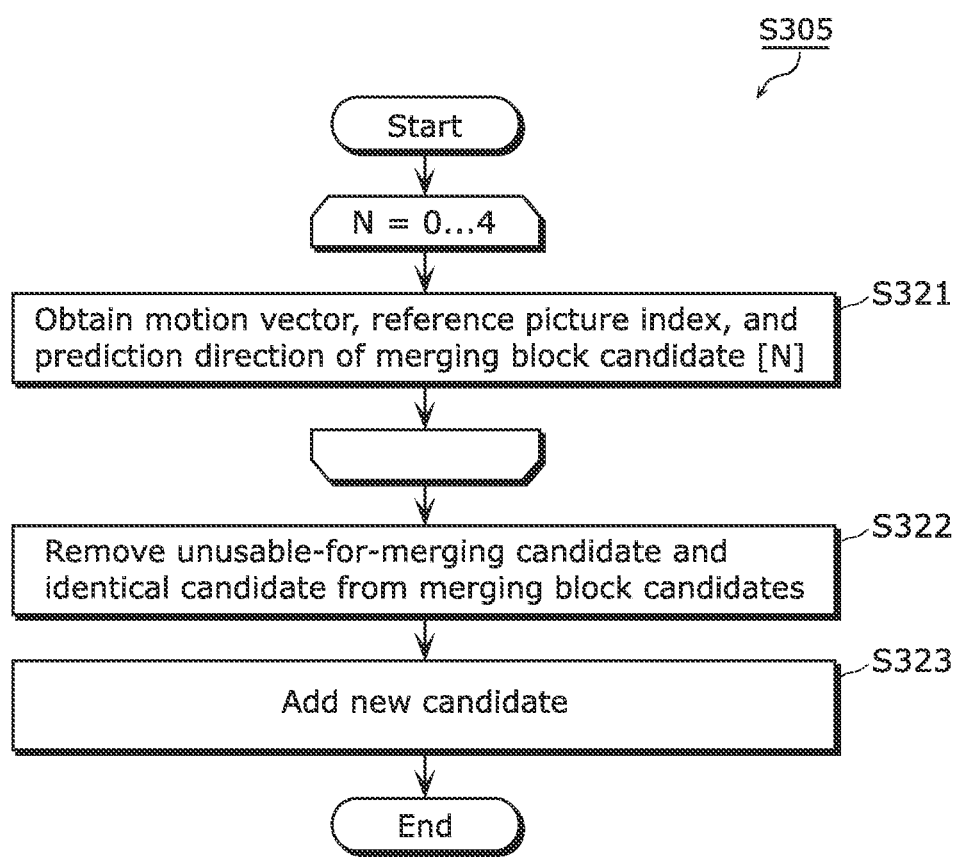
FIG. 24 is a flowchart illustrating a process for calculating a merging block candidate according to Embodiment 2.

Next, referring to FIG. 22 to FIG. 24, a description is given of processing operations of the image decoding apparatus 300 (execution of image decoding method).

FIG. 22 is a flowchart showing processing operations of the image decoding apparatus 300 according to Embodiment 2.

The image decoding apparatus 300 first divides a current block into a plurality of sub-blocks, and determines one of the sub-blocks to be a prediction target block.

In Step S301, the variable-length-decoding unit 301 decodes a merging flag.

In Step S302, when the merging flag is "1" (S302, Yes), in Step S303, the merging block candidate calculation unit 311 calculates the total number of usable-for-merging candidates using a method described later. Then, the merging block candidate calculation unit 311 sets the calculated number of usable-for-merging candidates as the size of a merging block candidate list.

In Step S304, the variable-length-decoding unit 301 performs variable-length decoding on a merging block candidate index from a bitstream using the size of the merging block candidate list.

In Step S305, the merging block candidate calculation unit 311 generates merging block candidates from neighboring blocks and a co-located block of a prediction target block using a method described later.

In Step S306, the inter prediction control unit 309 causes the inter prediction unit 308 to generate an inter prediction picture using the motion vector, reference picture index, and prediction direction of the merging block candidate indicated by the decoded merging block candidate index.

When the merging flag is "0" in Step S302 (S302, No), in Step S307, the inter prediction unit 308 generates an inter prediction picture using information on motion vector estimation mode decoded by the variable-length-decoding unit 301.

Optionally, when the size of a merging block candidate list calculated in Step S303 is "1", a merging block candidate index may be estimated to be "0" without being decoded.

FIG. 23 is a flowchart showing details of the process in Step S303 shown in FIG. 22. Specifically, FIG. 23 illustrates a method of determining whether or not a merging block candidate [N] is a usable-for-merging candidate and calculating the total number of usable-for-merging candidates. FIG. 23 will be described below.

In Step S311, the merging block candidate calculation unit 311 determines whether it is true or false that (1) a merging block candidate [N] has been decoded by intra prediction, (2) the merging block candidate [N] is a block outside the boundary of a slice including the current block or the boundary of a picture including the current block, or (3) the merging block candidate [N] is yet to be decoded.

When the result of the determination in Step S311 is true (S311, Yes), the merging block candidate calculation unit 311 determines a block corresponding to the merging block candidate [N] to be a non-merging target block. Furthermore, in Step S313, the merging block candidate calculation unit 311 sets the merging block candidate [N] as an unusable-for-merging candidate.

On the other hand, when the result of the determination in Step S311 is false (S311, No), in Step 312, the merging block candidate calculation unit 311 determines whether or not a block corresponding to the merging block candidate [N] is a non-merging target block (first determination processing).

When the result of the determination in Step S312 is true (S312, Yes), the merging block candidate calculation unit 311 determines the merging block candidate [N] to be an unusable-for-merging candidate in Step S313.

In this manner, in decoding by dividing a CU into partitions and when a neighboring block is located within the same CU, it is possible to properly decode a bitstream generated by the image encoding apparatus 100, by not adding the neighboring block to the merging block candidate list.

On the other hand, when the result of the determination in Step S312 is false (S312, No), the merging block candidate calculation unit 311 determines the merging block candidate [N] to be a usable-for-merging candidate in Step S314.

In Step S315, the merging block candidate calculation unit 311 determines whether it is true or false that the merging block candidate [N] is either a usable-for-merging candidate or a co-located merging block candidate.

When the result of the determination in Step S315 is true (S315, Yes), the merging block candidate calculation unit 311 updates the total number of merging block candidates by incrementing it by one in Step S316.

On the other hand, when the result of the determination in Step S315 is false (S315, No), the merging block candidate calculation unit 311 does not update the total number of usable-for-merging candidates.

Thus, when a merging block candidate is a co-located merging block, the merging block candidate calculation unit 311 increments the total number of usable-for-merging candidates by one regardless of whether the co-located block is a usable-for-merging candidate or an unusable-for-merging candidate. This prevents discrepancy of the numbers of usable-for-merging candidates between the image encoding apparatus and the image decoding apparatus even when information on a co-located merging block is lost due to an incident such as packet loss.

The total number of usable-for-merging candidates is set as the size of a merging block candidate list in Step S303 shown in FIG. 22. Furthermore, the size of the merging block candidate list is used in variable-length decoding of merging block candidate indexes in Step S304 shown in FIG. 22. This makes it possible for the image decoding apparatus 300 to decode merging block candidate indexes normally even when information on reference picture including a co-located block is lost.

It is to be noted that the example shown in Embodiment 2 where Step S311 is performed before Step S312 in FIG. 23 is not limiting. For example, Step S312 may be performed before Step S311. In addition, for example, Step S311 and Step S312 may be performed in a single step. Furthermore, Step S311 need not be necessarily performed.

Furthermore, in Embodiment 2, the merging block candidate calculation unit 311 determines in Step S312 that the merging block candidates [N] is a non-merging target block when the merging block candidate [N] is included in the current block; however, the process may be different. When the merging block candidate [N] is not included in the current block, the merging block candidate calculation unit 311 may determine that the merging block candidate [N] to be a merging target block. In this case, the merging block candidate calculation unit 311 proceeds to Step S314 when the result of the determination in S312 in FIG. 23 is a merging target block. The merging block candidate calculation unit 311 proceeds to Step S313 when the result of the determination in S312 is not a merging target block.

The main structural element in Embodiment 2 is Step S312.

FIG. 24 is a flowchart showing details of the process in Step S305 shown in FIG. 22. Specifically, FIG. 24 illustrates a method of calculating a merging block candidate. FIG. 24 will be described below.

In Step S321, the merging block candidate calculation unit 311 obtains the motion vector, reference picture index, and prediction direction of a merging block candidate [N], and adds them to a merging block candidate list (part of first derivation processing).

In Step S322, the merging block candidate calculation unit 311 searches the merging block candidate list for an unusable-for-merging candidate and an identical candidate, and removes the unusable-for-merging candidate and the identical candidate from the merging block candidate list as shown in FIG. 14A to FIG. 14D (part of the first derivation processing).

In Step S323, the merging block candidate calculation unit 311 adds a new candidate to the merging block candidate list using the method as illustrated in FIG. 19.

Figure 25:
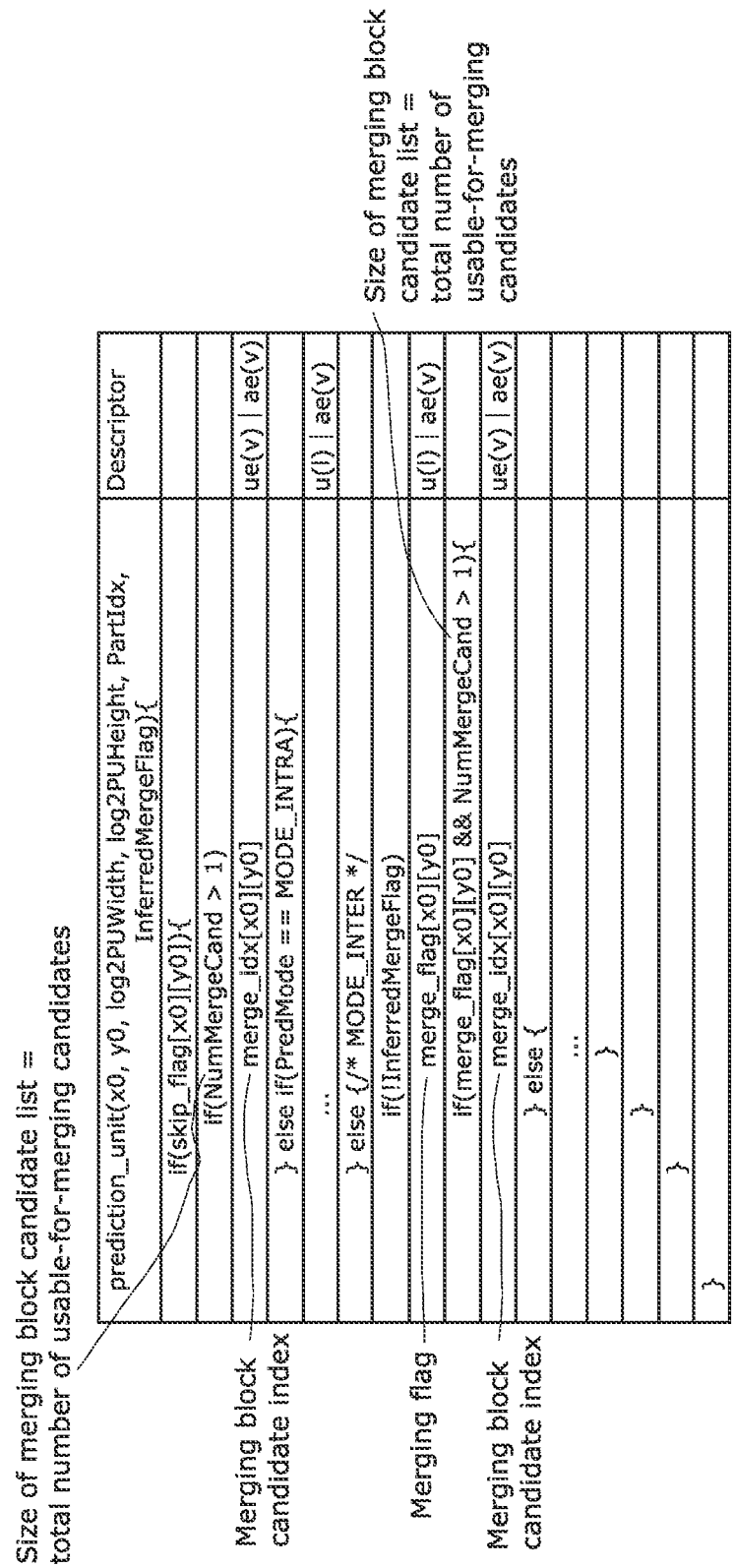
FIG. 25 shows exemplary syntax for attachment of merging block candidate indexes to a bitstream.

FIG. 25 shows exemplary syntax for attachment of merging block candidate indexes to a bitstream. In FIG. 25, merge_idx represents a merging block candidate index, and merge_idx represents a merging flag, NumMergeCand represents the size of a merging block candidate list. In Embodiment 2, NumMergeCand is set at the total number of usable-for-merging candidates calculated in the process flow shown in FIG. 23.

[2-3 Effects, Variations, and Others]

As described, in the case where a CU is divided into partitions for decoding and when a neighboring block is located within the same CU, the image decoding apparatus 300 according to Embodiment 2 does not add the neighboring block as a merging block candidate, so that a merging block candidate index need not be assigned to the redundant merging block candidate. This is because use of the same prediction direction, motion vector, and reference picture index for all partitions leads to the substantially same result as the results obtained by generating a prediction picture on a per CU basis. This reduces advantages obtained by dividing a CU into PUs. As a result, the image decoding apparatus 300 is capable of appropriately decoding a bitstream encoded with coding efficiency increased. Furthermore, removal of a larger number of redundant merging block candidates from the merging block candidate list allows a larger number of new candidates to be added. As a result, the image decoding apparatus 300 is capable of appropriately decoding a bitstream encoded with coding efficiency increased.

Thus, the image decoding apparatus 300 according to Embodiment 2 is capable of calculating the size of a merging block candidate list for use in encoding or decoding of a merging block candidate index, using a method independent of information on reference pictures including a co-located block. The image decoding apparatus 300 therefore can appropriately decode a bitstream having enhanced error resistance.

More specifically, regardless of whether or not a co-located merging block is a usable-for-merging candidate, the image decoding apparatus 300 according to Embodiment 2 increments the total number of usable-for-merging candidates by one each time a merging block candidate is determined as a co-located merging block. Then, the image decoding apparatus 300 determines a bit sequence assigned to a merging block candidate index using the total number of usable-for-merging candidates calculated in this manner. This makes it possible for the image decoding apparatus 300 to decode merging block candidate indexes normally even when information on reference picture including a co-located block is lost.

Furthermore, when the total number of the merging block candidates is smaller than the total number of the usable-for-merging candidates, it is possible for the image decoding apparatus 300 according to Embodiment 2 to appropriately decode a bitstream encoded with coding efficiency increased by adding a new candidate having a new motion vector, a new reference picture index, and a new prediction direction as a merging block candidate.

The example in Embodiment 2 where a Cu is divided into PUs (Partitions), such as 2N×N, 2N×nU, 2N×nD, N×2N, nL×2N, and nR×2N is not limiting. For example, Embodiment 2 may be applied to the case where the prediction block unit is N×N as shown in (g) in FIG. 11. In this case, too, when a neighboring block is located within the same CU, the image decoding apparatus 300 does not add the neighboring block to the merging block candidate list, so that a merging block candidate index need not be assigned to the redundant merging block candidate. This allows a bitstream coded with coding efficiency increased to be appropriately decoded.

It should be noted that the example described in Embodiment 2 in which regardless of whether a co-located merging block is a usable-for-merging candidate or an unusable-for-merging candidate, the image decoding apparatus 300 increments the total number of merging block candidates by one as shown in Step S315 in FIG. 23 is not limiting. Relative to other blocks, the image decoding apparatus 300 may always increment the total number of merging block candidates by one regardless of whether the blocks are usable-for-merging candidates or unusable-for-merging candidates. In this case, for example, the image decoding apparatus 300 may always fix the total number of usable-for-merging candidates at a maximum value Max of the total number of merging block candidates. In other words, it may be that the image decoding apparatus 300 considers all the merging block candidates as usable-for-merging candidates, fixes the size of the merging block candidate list at the maximum value N of the total number of merging block candidates, and decode the merging block candidate index.

For example, in Embodiment 2, the maximum value Max of the total number of merging block candidates is 5 (the neighboring block A, the neighboring block B, the co-located merging block, the neighboring block C, and the neighboring block D). Hence, the image decoding apparatus 300 may always set 5 as the size of the merging block candidate list, and decode the merging block candidate index. Furthermore, in the case of a picture coded with no reference to a co-located merging block (B picture or P picture coded with reference to I picture), the image decoding apparatus 300 may set the value of "4" (the neighboring block A, the neighboring block B, the neighboring block C, and the neighboring block D) as the maximum value Max of the total number of merging block candidates. It is therefore possible for the variable-length-decoding unit of the image decoding apparatus to decode a merging block candidate index from a bitstream without referencing information on a neighboring block or on a co-located block. As a result, for example, Step S314 and Step S315 shown in FIG. 23 can be skipped so that the computational complexity for the variable-length-decoding unit can be reduced.

FIG. 26 shows exemplary syntax in the case where the size of a merging block candidate list is fixed at the maximum value of the total number of merging block candidates. As can be seen from FIG. 26, NumMergeCand can be omitted from the syntax when the size of a merging block candidate list is fixed at the maximum value of the total number of merging block candidates.

Optionally, as the maximum value Max of the total number of merging block candidates, a value may be used which is embedded in a SPS, a PPS, a slice header, or the like. This makes it possible to change the maximum value Max of the total number of merging block candidates for each current picture, which allows reduction in the computational complexity and a bitstream encoded with coding efficiency increased to be appropriately decoded.

Variations of Embodiment 1 and Embodiment 2

In Embodiment 1 and Embodiment 2, descriptions are given of the case where merging block candidates are generated from spatially neighboring blocks (for example, the neighboring blocks A to E) of a target block (a current block to be encoded or decoded) and a temporally neighboring block (for example, a co-located block), in accordance with the process shown in FIG. 15 or FIG. 24, and merging block candidates shown in FIG. 14A to FIG. 14D are generated.

Here, in Embodiment 1 and Embodiment 2, when the size of a merging block candidate list is a fixed value and the merging block candidate list has an empty entry, the empty entry of the merging block candidate list may be filled with a predetermined merging block candidate for enhancement of error resistance (second candidate) so that error resistance can be enhanced.

For example, when a current picture (to be encoded or to be decoded) is a B-picture, the second candidate to be added may be a bi-predictive merging block candidate including a set of a reference picture index 0 for a prediction direction 0 and a motion vector (0, 0) and a set of a reference picture index 0 for a prediction direction 1 and a motion vector (0, 0). For example, when a current picture is a P-picture, the second candidate to be added may be a uni-predictive merging block candidate including a reference picture index 0 for a prediction direction 0 and a motion vector (0, 0). Since second candidates are added for the purpose of enhancement of error resistance, the second candidates may be set to have identical values. Since new candidates are added for the purpose of increasing coding efficiency, the new candidates added are different from each other. It should be noted that a new candidate may be identical to a first candidate or a second candidate as a result.

For example, in the example shown in (a) in FIG. 14A, the maximum value of the total number of merging block candidates is 5. As shown in (b) in FIG. 14A, the total number of merging block candidates (the number of first candidates) is 4. Hence, in the example shown in FIG. 14A, no merging block candidate is assigned to the merging block candidate index 4. It may be that a second candidate, for example, a bi-predictive merging block candidate including a set of a reference picture index 0 for a prediction direction 0 and a motion vector (0, 0) and a set of a reference picture index 0 for a prediction direction 1 and a motion vector (0, 0) may be assigned to the merging block candidate index 4.

By doing so, for example, the image decoding apparatus 300 can avoid having a decoded merging block candidate index to which no merging block candidate is assigned, even when an error occurs in removing of an identical candidate from merging block candidates.

It should be noted that the present variation in which a merging block candidate having a reference picture 0 and a motion vector (0, 0) is assigned to a merging block candidate index to which no merging block candidate is assigned is not limiting. Examples of second candidates include a copy of a merging block candidate assigned to another merging block candidate index. Furthermore, a second candidate may be generated from merging block candidates assigned to other merging block candidates, such as generated by averaging candidates assigned to other merging block candidate indexes.

Furthermore, the image decoding apparatus 300 may determine in Step S306 in FIG. 22 whether or not a merging block candidate has been assigned to a decoded merging block candidate index, and use a second candidate when the merging block candidate has not been assigned.

For example, the image decoding apparatus 300 may determine in Step S306 in FIG. 22 whether or not the value of decoded merging block candidate index is larger than or equal to the total number of merging block candidates calculated in Step S305, and use a second candidate when the value of the merging block candidate index is larger than or equal to the total number of merging block candidates.

Furthermore, for example, the image decoding apparatus 300 may determine in Step S306 in FIG. 22 whether or not the value of decoded merging block candidate index is larger than or equal to the total number of merging block candidates calculated in Step S305, and, when the value of decoded merging block candidate index is larger than or equal to the total number of merging block candidates, the value of the merging block candidate index may be clipped so that the value of decoded merging block candidate index is smaller than the total number of merging block candidates. By doing so, for example, it is possible to avoid having a decoded merging block candidate index to which no merging block candidate is assigned, even when an error occurs in removing of an identical candidate from merging block candidates.

Embodiment 3

The processing described in each of embodiments can be simply implemented in an independent computer system, by recording, in a recording medium, one or more programs for implementing the configurations of the moving picture encoding method (image encoding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture encoding method (image encoding method) and the moving picture decoding method (image decoding method) described in each of embodiments and systems using thereof will be described. The system has a feature of having an image coding apparatus that includes an image encoding apparatus using the image encoding method and an image decoding apparatus using the image decoding method. Other configurations in the system can be changed as appropriate depending on the cases.

Figure 27:
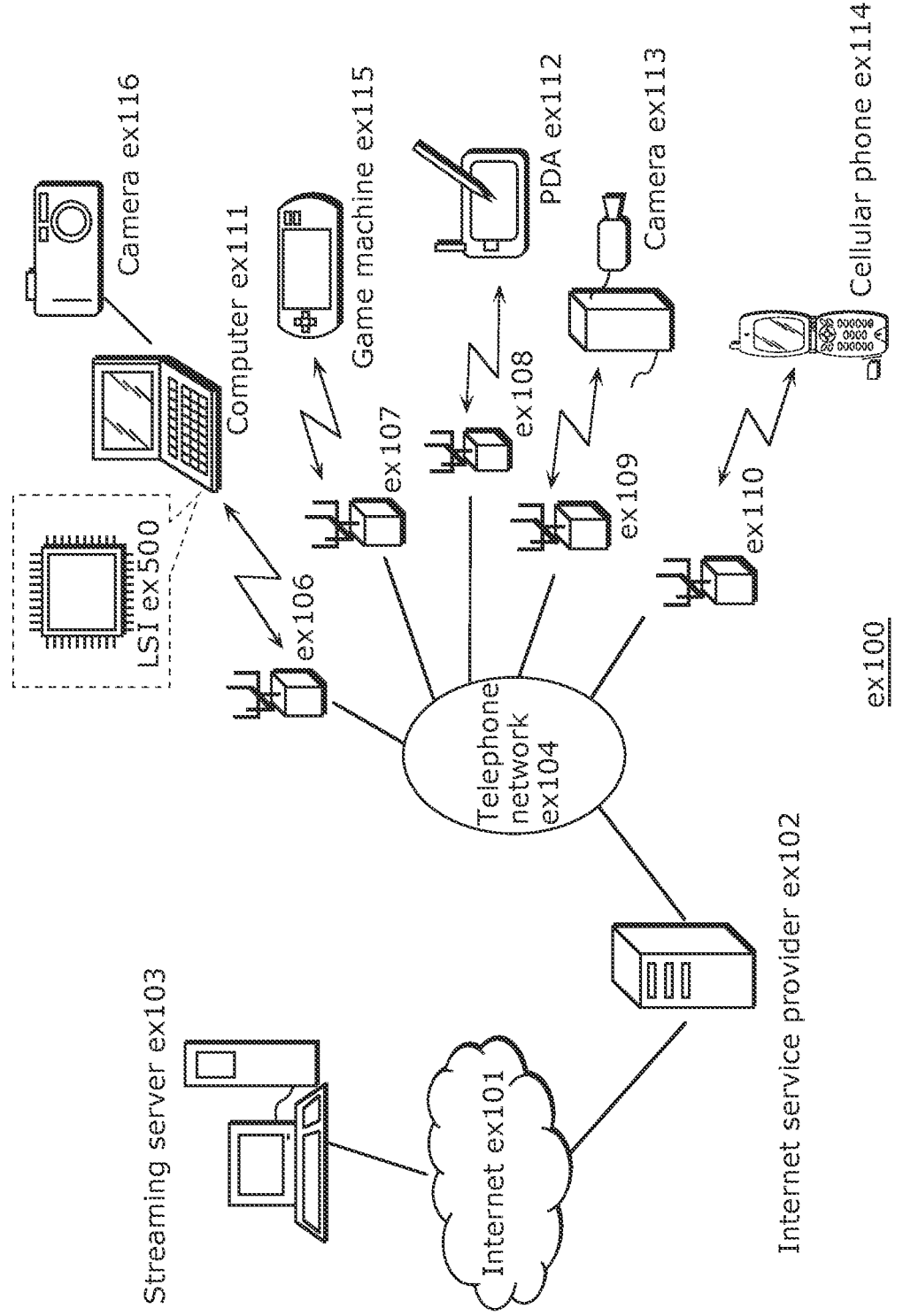
FIG. 27 shows an overall configuration of a content providing system for implementing content distribution services.

FIG. 27 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 27, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is encoded as described above in each of embodiments (i.e., the camera functions as the image encoding apparatus according to an aspect of the present disclosure), and the encoded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned encoded data. Each of the devices that have received the distributed data decodes and reproduces the encoded data (i.e., functions as the image decoding apparatus according to an aspect of the present disclosure).

The captured data may be encoded by the camera ex113 or the streaming server ex103 that transmits the data, or the encoding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The encoding processes may be performed by the camera ex116, the computer ex111, or the streaming server ex103, or shared among them.

Furthermore, the coding processes may be performed by an LSI ex500 generally included in each of the computer ex111 and the devices. The LSI ex500 may be configured of a single chip or a plurality of chips. Software for coding video may be integrated into some type of a recording medium (such as a CD-ROM, a flexible disk, and a hard disk) that is readable by the computer ex111 and others, and the coding processes may be performed using the software. Furthermore, when the cellular phone ex114 is equipped with a camera, the video data obtained by the camera may be transmitted. The video data is data encoded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the encoded data in the content providing system ex100. In other words, the clients can receive and decode information transmitted by the user, and reproduce the decoded data in real time in the content providing system ex100, so that the user who does not have any particular right and equipment can implement personal broadcasting.

Figure 28:
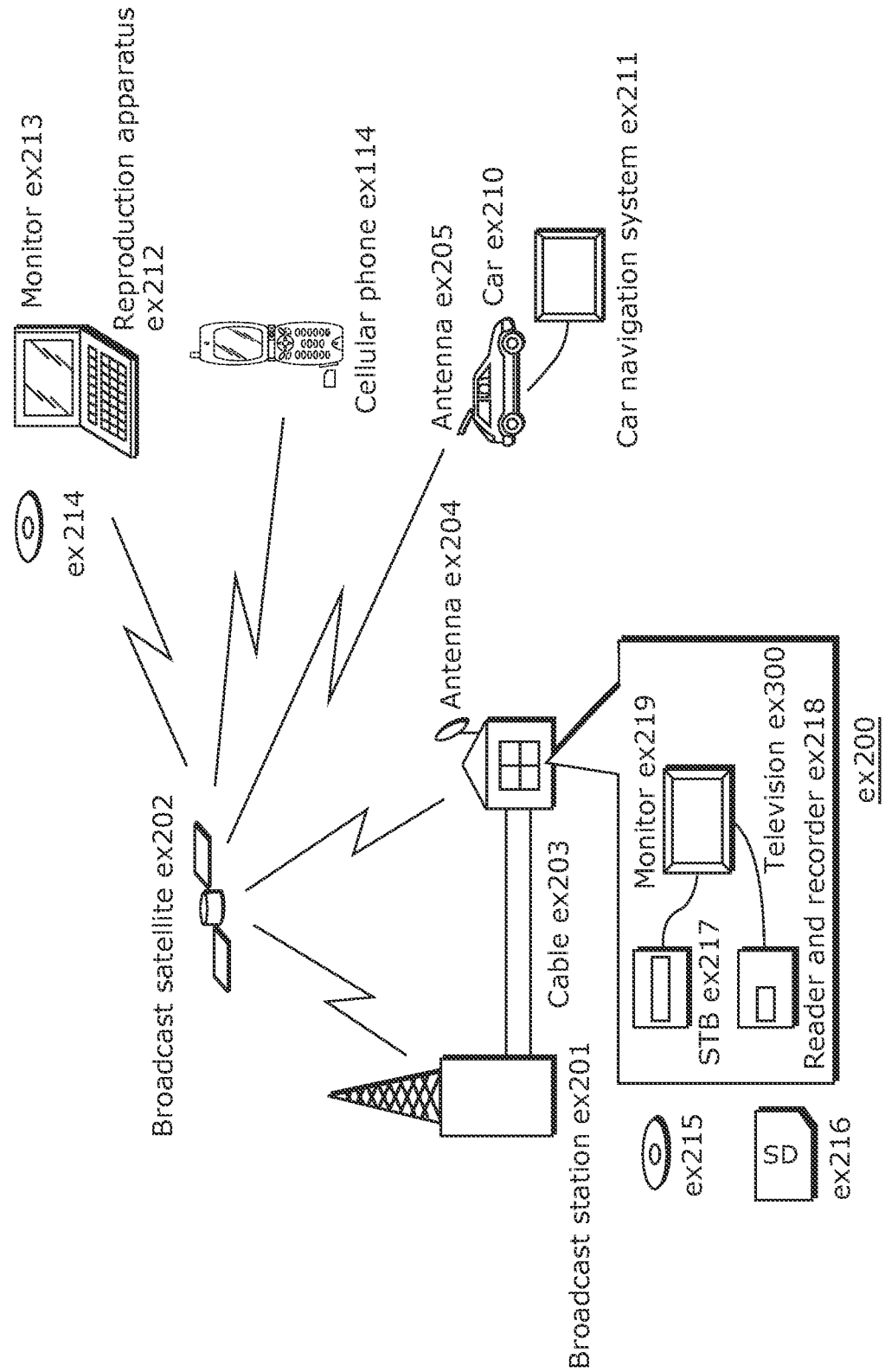
FIG. 28 shows an overall configuration of a digital broadcasting system.

Aside from the example of the content providing system ex100, at least one of the moving picture coding apparatus (image coding apparatus) described in each of embodiments may be implemented in a digital broadcasting system ex200 illustrated in FIG. 28. More specifically, a broadcast station ex201 communicates or transmits, via radio waves to a broadcast satellite ex202, multiplexed data obtained by multiplexing audio data and others onto video data. The video data is data encoded by the moving picture encoding method described in each of embodiments (i.e., data encoded by the image encoding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) encodes video signals in the recording medium ex215, and in some cases, writes data obtained by multiplexing an audio signal on the encoded data. The reader/recorder ex218 can include the moving picture decoding apparatus or the moving picture encoding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 29:
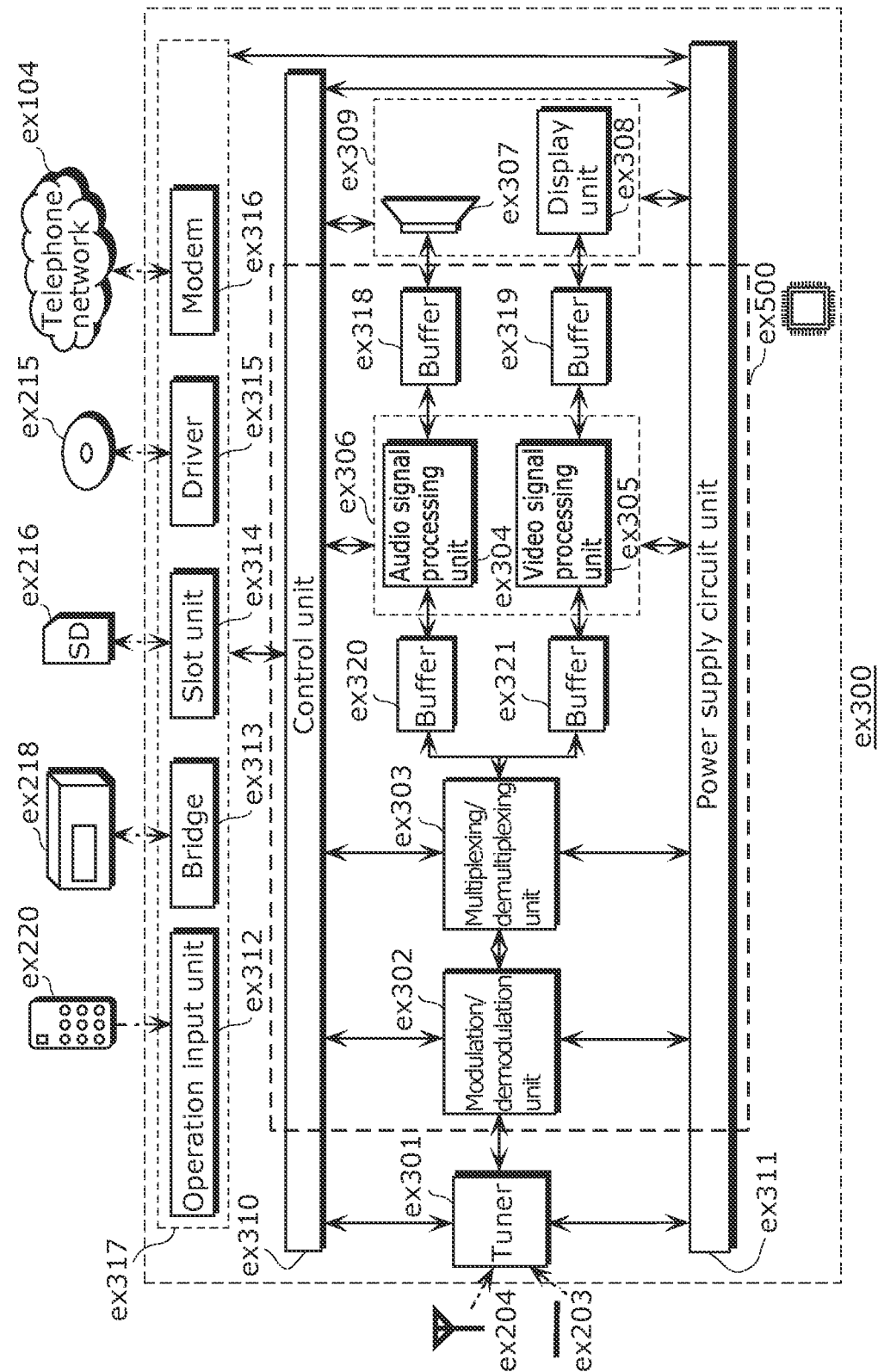
FIG. 29 shows a block diagram illustrating an example of a configuration of a television.

FIG. 29 illustrates the television (receiver) ex300 that uses the moving picture encoding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data encoded by a signal processing unit ex306 into data.

The television ex300 further includes: a signal processing unit ex306 including an audio signal processing unit ex304 and a video signal processing unit ex305 that code each of audio data and video data, (which function as the image coding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card, Next, a configuration in which the television ex300 encodes an audio signal and a video signal, and transmits the data outside or writes the data on a recording medium will be described. In the television ex300, upon a user operation through the remote controller ex220 and others, the audio signal processing unit ex304 encodes an audio signal, and the video signal processing unit ex305 encodes a video signal, under control of the control unit ex310 using the encoding method described in each of embodiments. The multiplexing/demultiplexing unit ex303 multiplexes the encoded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may encode the obtained data. Although the television ex300 can encode, multiplex, and provide outside data in the description, it may be capable of only receiving, decoding, and providing outside data but not the encoding, multiplexing, and providing outside data.

Furthermore, when the reader/recorder ex218 reads or writes multiplexed data from or on a recording medium, one of the television ex300 and the reader/recorder ex218 may code the multiplexed data, and the television ex300 and the reader/recorder ex218 may share the coding partly.

Figure 30:
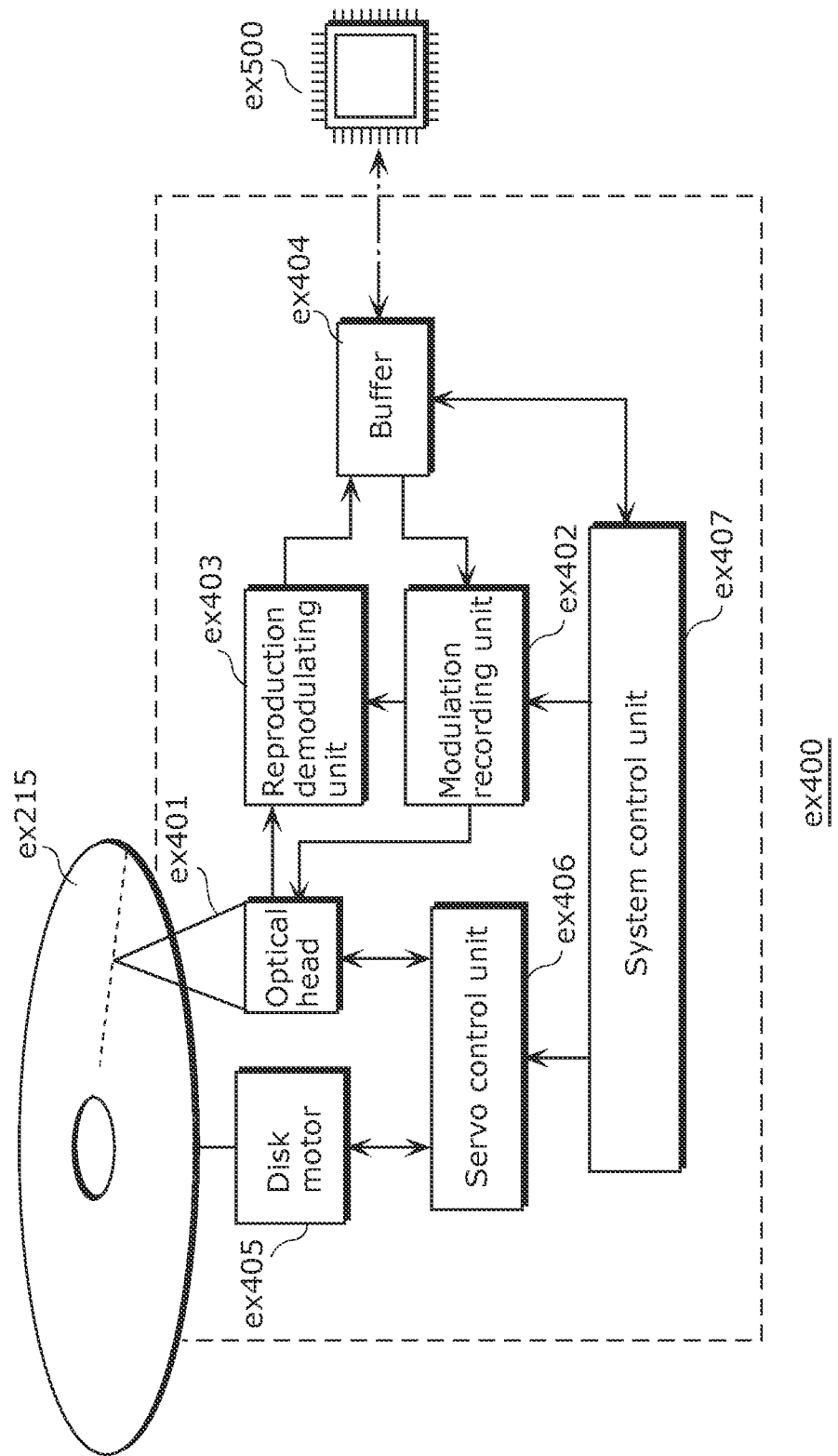
FIG. 30 shows a block diagram illustrating an example of a configuration of an information reproducing/recording unit that reads and writes information from and on a recording medium that is an optical disk.

As an example, FIG. 30 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 31:
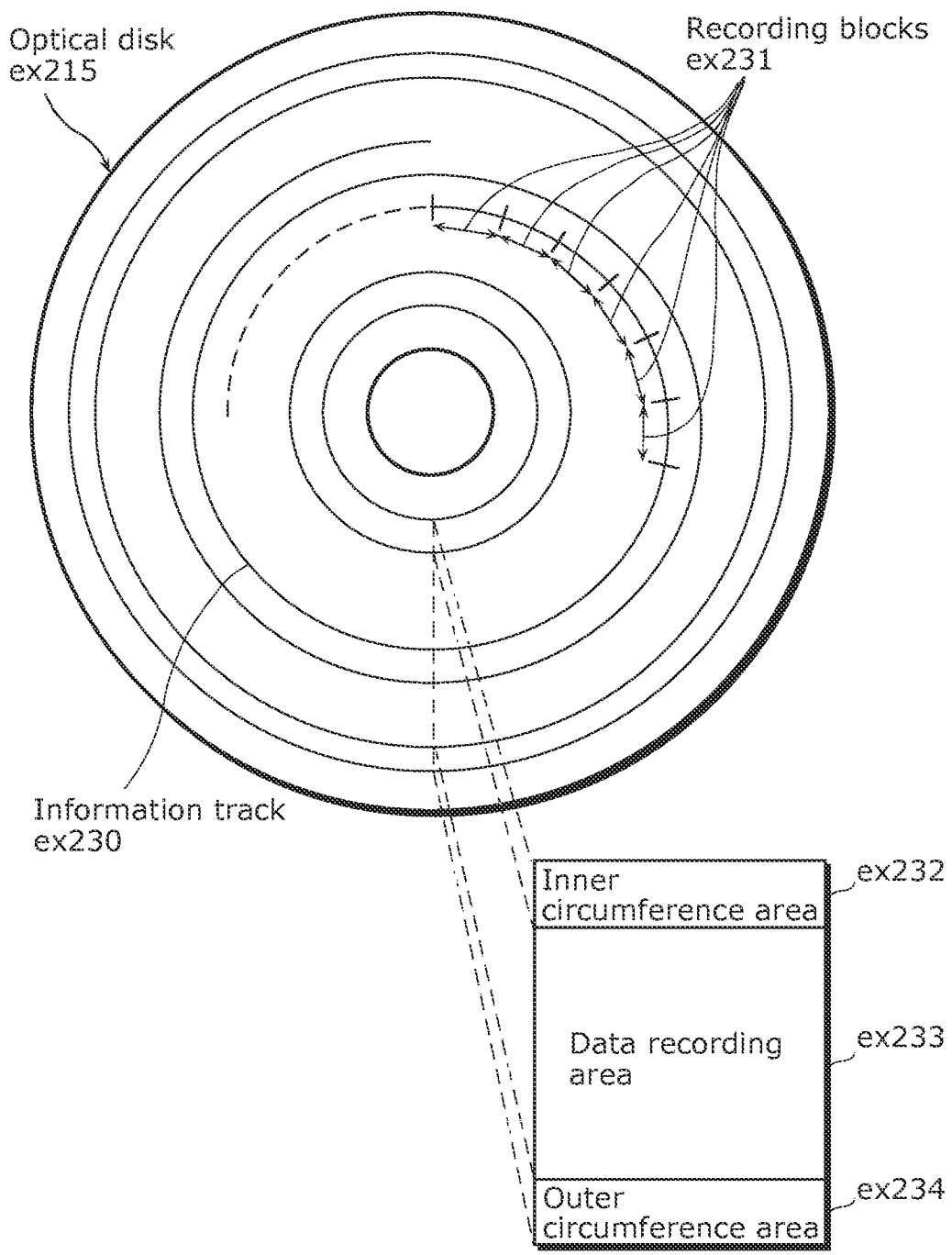
FIG. 31 shows an example of a configuration of a recording medium that is an optical disk.

FIG. 31 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes encoded audio, encoded video data, or multiplexed data obtained by multiplexing the encoded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 29. The same will be true for the configuration of the computer ex111, the cellular phone ex114, and others.

Figure 32A:
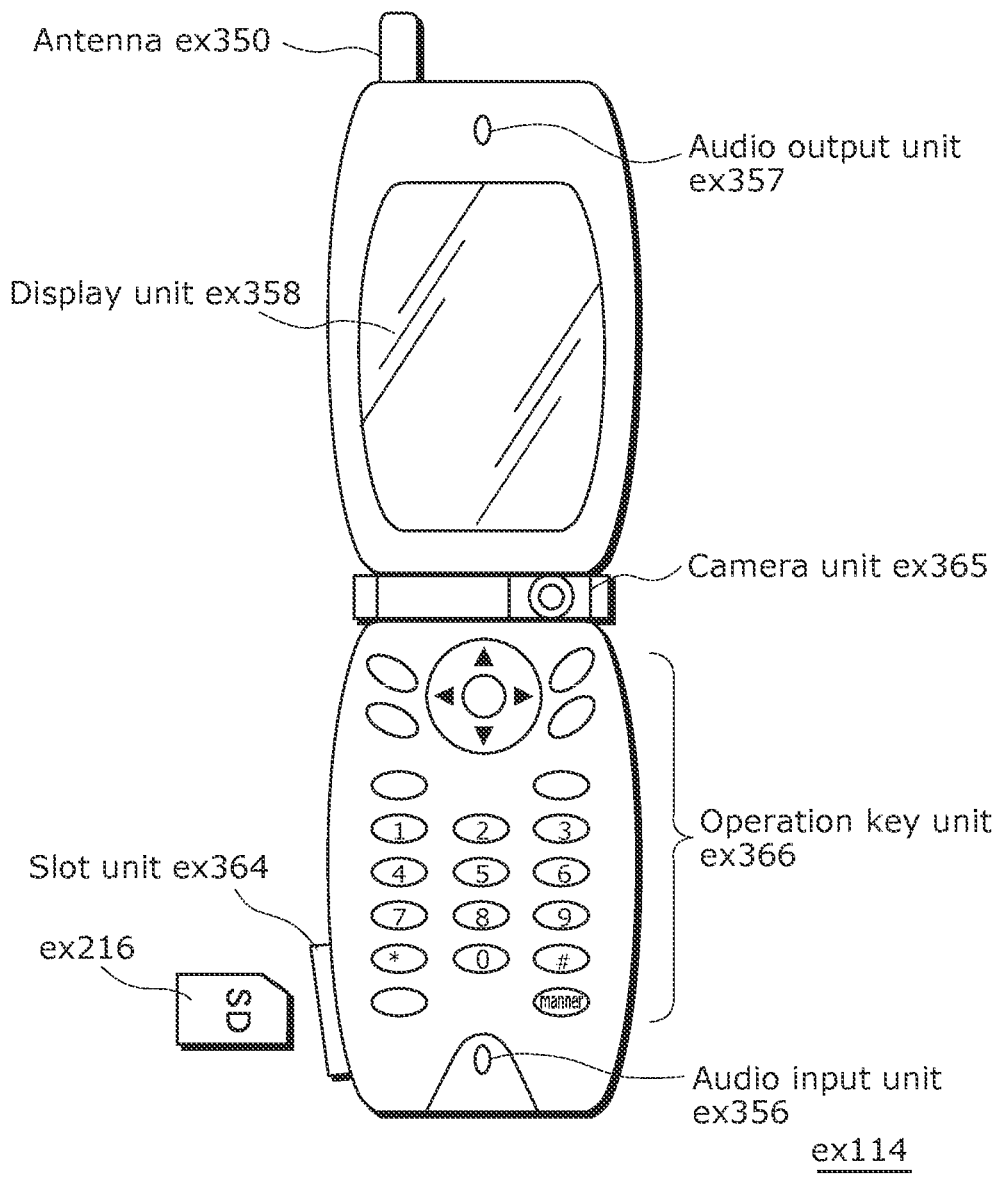
FIG. 32A shows an example of a cellular phone.

FIG. 32A illustrates the cellular phone ex114 that uses the moving picture coding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded data of the received video, the still pictures, e-mails, or others; and a slot unit ex364 that is an interface unit for a recording medium that stores data in the same manner as the memory unit ex367.

Figure 32B:
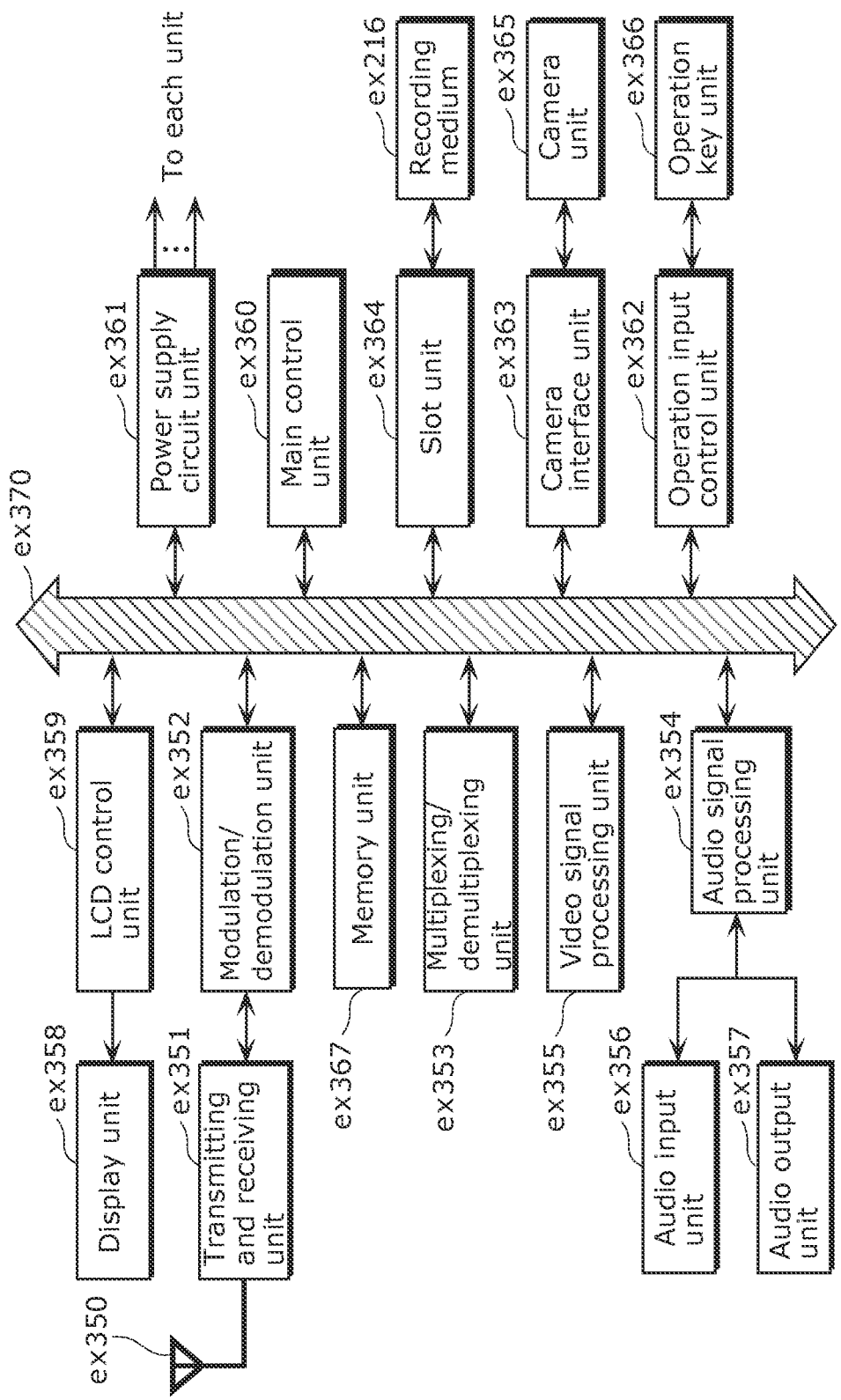
FIG. 32B is a block diagram showing an example of a configuration of a cellular phone.

Next, an example of a configuration of the cellular phone ex114 will be described with reference to FIG. 32B. in the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and encodes video signals supplied from the camera unit ex365 using the moving picture encoding method shown in each of embodiments (i.e., functions as the image encoding apparatus according to the aspect of the present disclosure), and transmits the encoded video data to the multiplexing/demultiplexing unit ex353. In contrast, during when the camera unit ex365 captures video, still images, and others, the audio signal processing unit ex354 encodes audio signals collected by the audio input unit ex356, and transmits the encoded audio data to the multiplexing/demultiplexing unit ex353.

The multiplexing/demultiplexing unit ex353 multiplexes the encoded video data supplied from the video signal processing unit ex355 and the encoded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the encoded video data and the audio signal processing unit ex354 with the encoded audio data, through the synchronous bus ex370. The video signal processing unit ex355 decodes the video signal using a moving picture decoding method corresponding to the moving picture encoding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both an encoding apparatus and a decoding apparatus, but also (ii) a transmitting terminal including only an encoding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method in each of embodiments can be used in any of the devices and systems described. Thus, the advantages described in each of embodiments can be obtained.

Furthermore, the present disclosure is not limited to embodiments, and various modifications and revisions are possible without departing from the scope of the present disclosure.

Embodiment 4

Video data can be generated by switching, as necessary, between (i) the moving picture encoding method or the moving picture encoding apparatus shown in each of embodiments and (ii) a moving picture encoding method or a moving picture encoding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture encoding method and by the moving picture encoding apparatus shown in each of embodiments will be hereinafter described. The multiplexed data is a digital stream in the MPEG-2 Transport Stream format.

Figure 33:
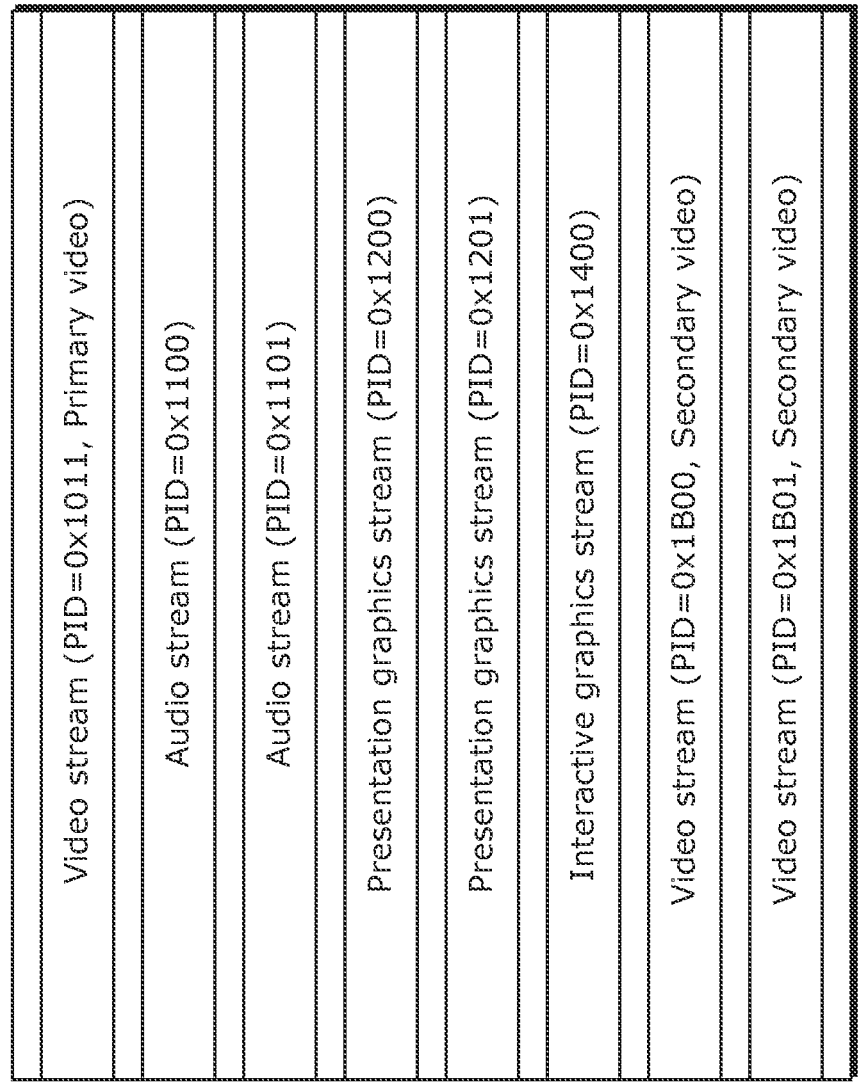
FIG. 33 illustrates a structure of multiplexed data.

FIG. 33 illustrates a structure of the multiplexed data. As illustrated in FIG. 33, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is encoded in the moving picture encoding method or by the moving picture encoding apparatus shown in each of embodiments, or in a moving picture encoding method or by a moving picture encoding apparatus in conformity with a conventional standard, such as MPEG-2, MPEG-4 AVC, and VC-1. The audio stream is encoded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 34:
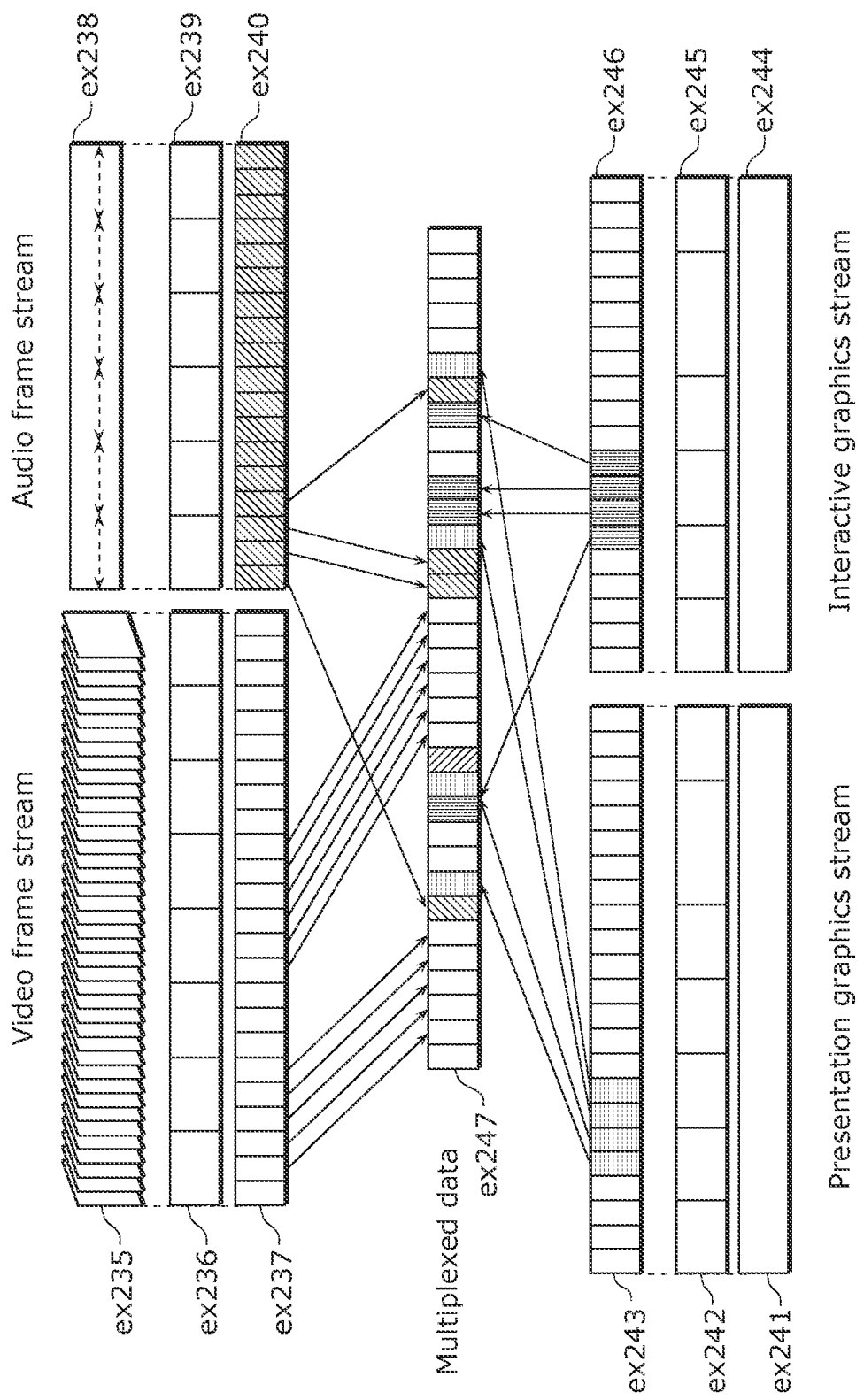
FIG. 34 schematically shows how each stream is multiplexed in multiplexed data.

FIG. 34 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 35:
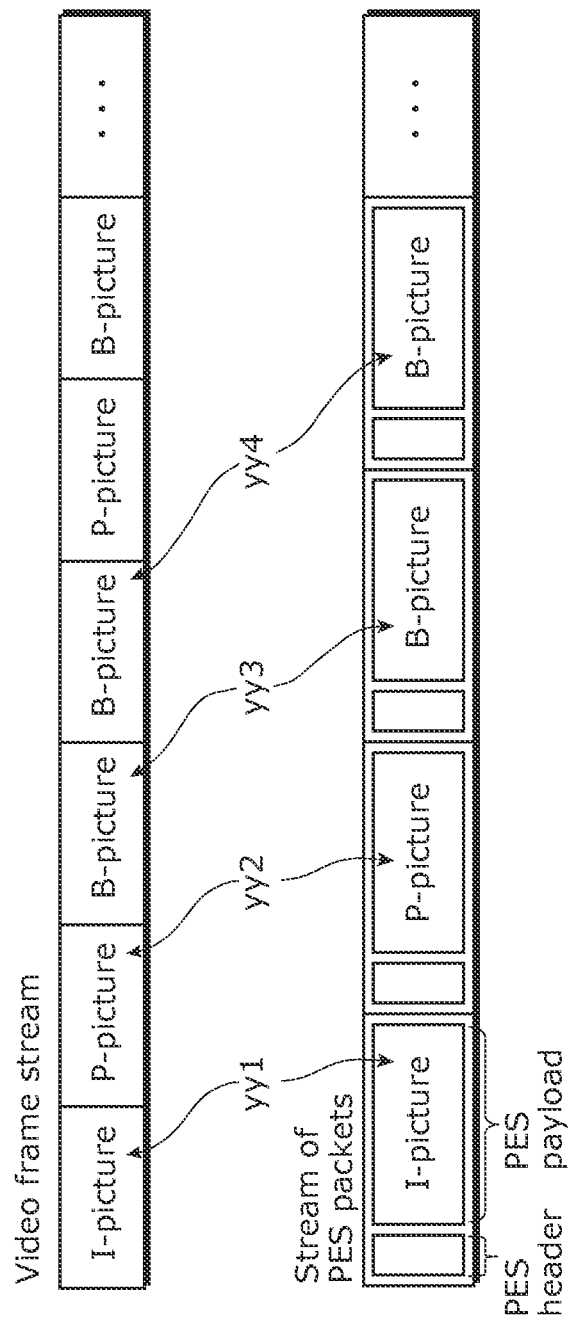
FIG. 35 shows how a video stream is stored in a stream of PES packets in more detail.

FIG. 35 illustrates how a video stream is stored in a stream of PES packets in more detail. The first bar in FIG. 35 shows a video frame stream in a video stream. The second bar shows the stream of PES packets. As indicated by arrows denoted as yy1, yy2, yy3, and yy4 in FIG. 35, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 36 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 36. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a ND in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 37:
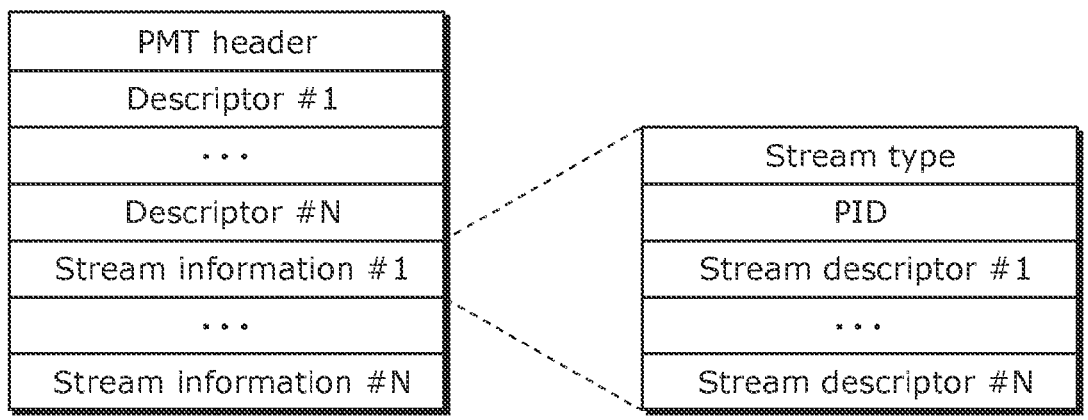
FIG. 37 shows a data structure of a PMT.

FIG. 37 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 38:
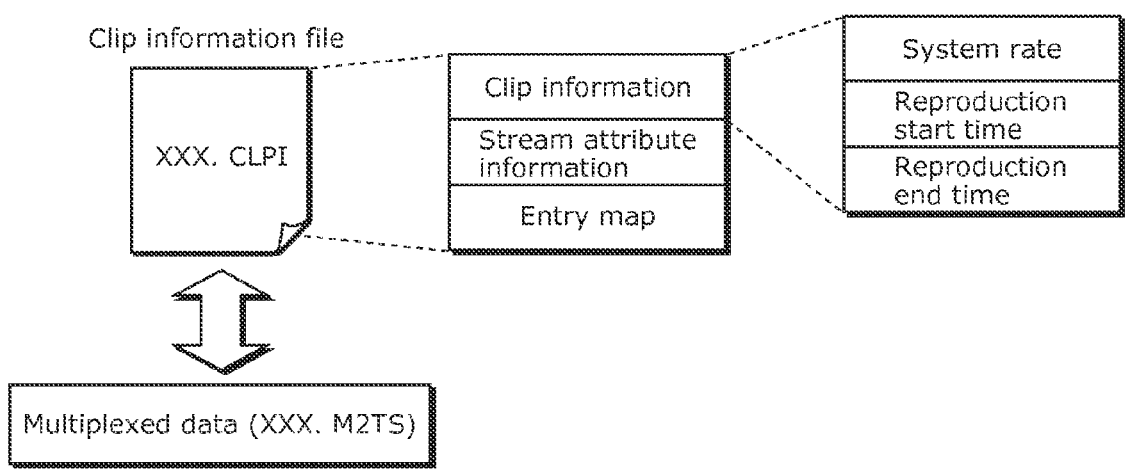
FIG. 38 shows an internal structure of multiplexed data information.

Each of the multiplexed data information files is management information of the multiplexed data as shown in FIG. 38. The multiplexed data information files are in one to one correspondence with the multiplexed data, and each of the files includes multiplexed data information, stream attribute information, and an entry map.

As illustrated in FIG. 38, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 39:
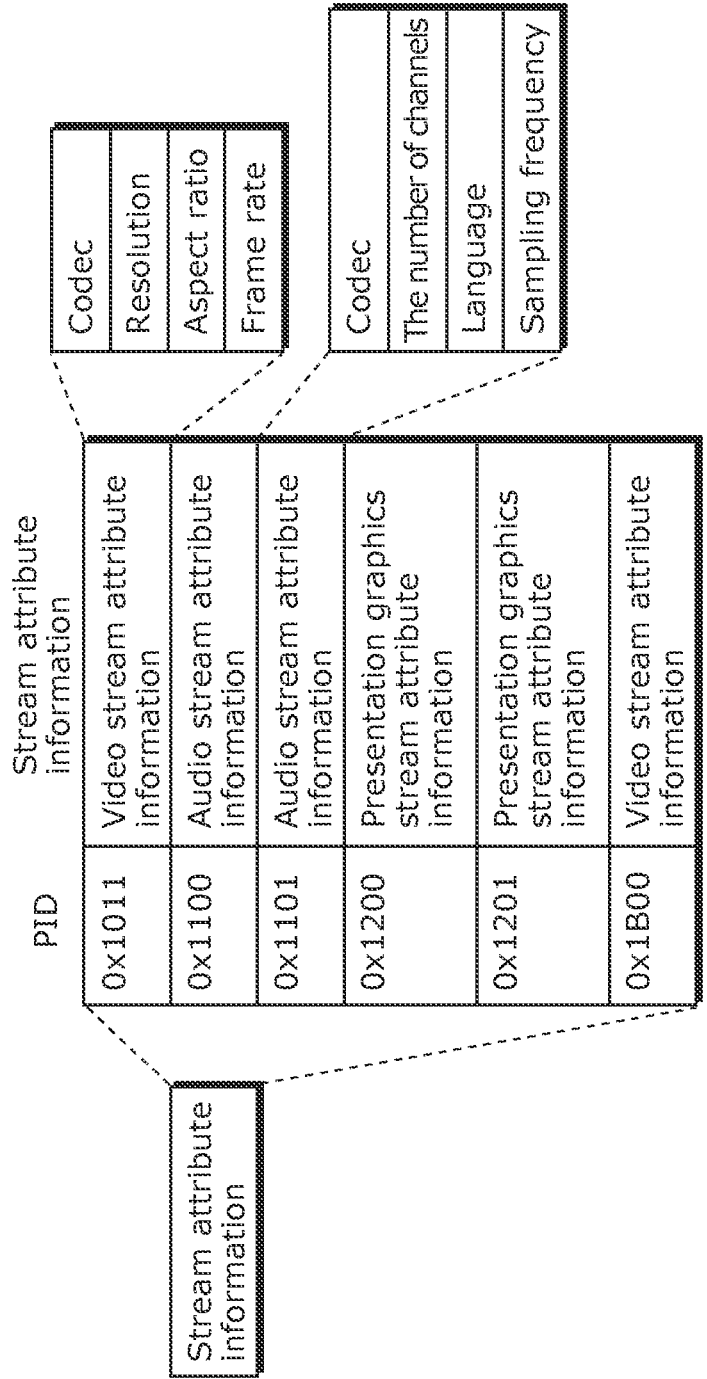
FIG. 39 shows an internal structure of stream attribute information.
Figure 40:
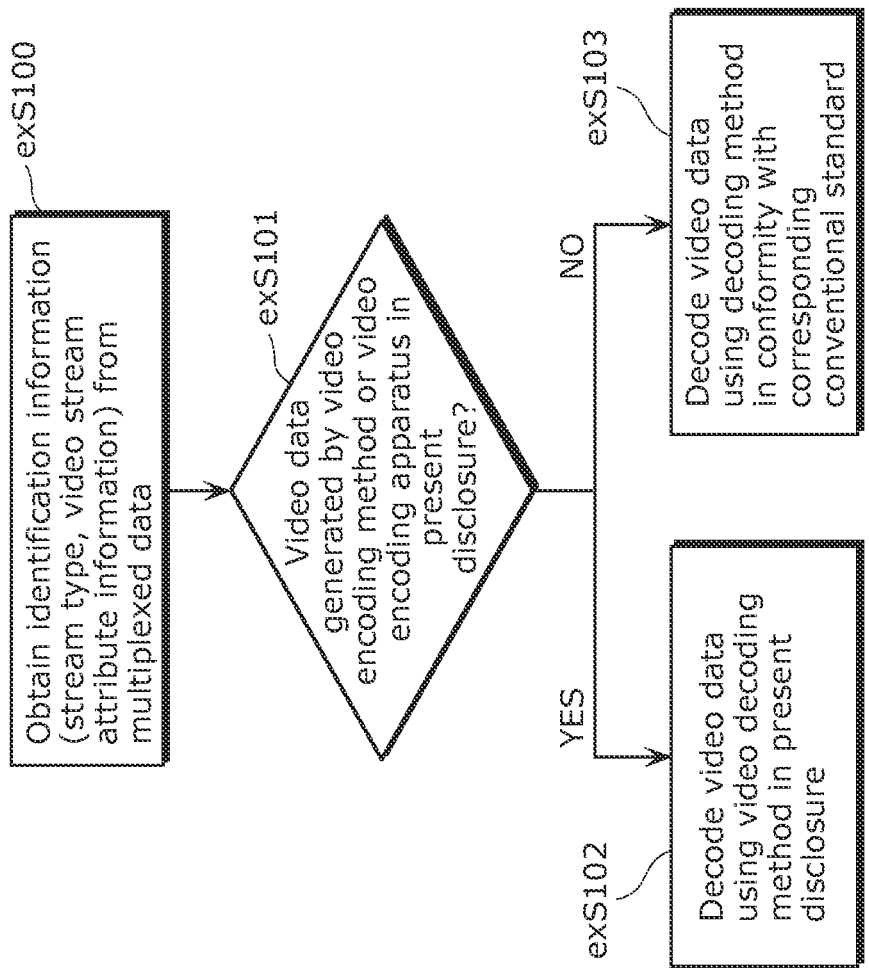
FIG. 40 shows steps for identifying video data.

As shown in FIG. 39, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture encoding method or the moving picture encoding apparatus described in each of embodiments includes a step or a unit for allocating unique information indicating video data generated by the moving picture encoding method or the moving picture encoding apparatus in each of embodiments, to the stream type included in the PMT or the video stream attribute information. With the configuration, the video data generated by the moving picture encoding method or the moving picture encoding apparatus described in each of embodiments can be distinguished from video data that conforms to another standard.

Furthermore, FIG. 123 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture encoding method or the moving picture encoding apparatus in each of embodiments. When it is determined that the stream type or the video stream attribute information indicates that the multiplexed data is generated by the moving picture encoding method or the moving picture encoding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture encoding method or apparatus, or the moving picture decoding method or apparatus in the present embodiment can be used in the devices and systems described above.

Embodiment 5

Figure 41:
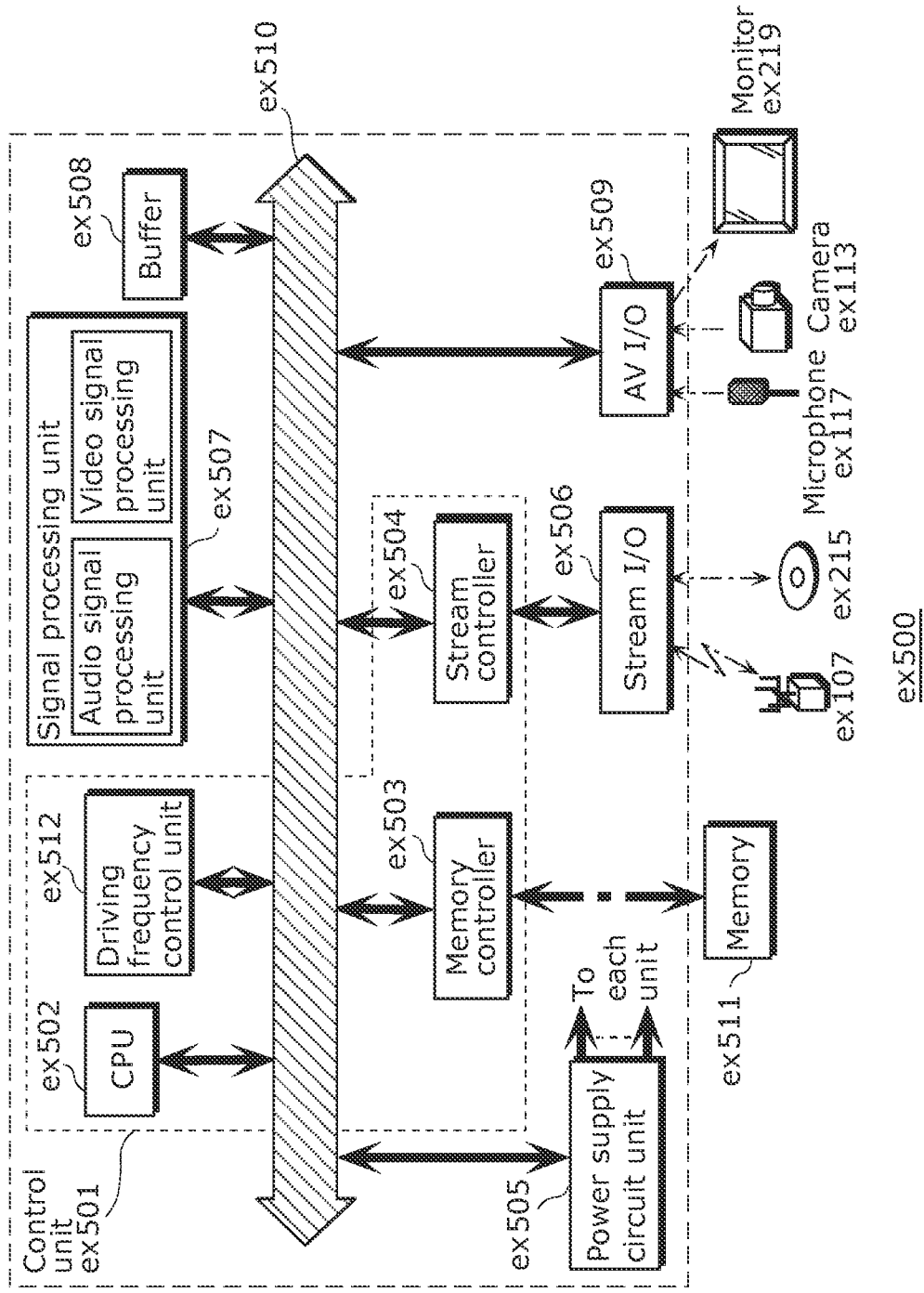
FIG. 41 shows an example of a configuration of an integrated circuit for implementing the moving picture coding method according to each of embodiments.

Each of the moving picture coding method and the moving picture coding apparatus in each of embodiments is typically achieved in the form of an integrated circuit or a Large Scale Integrated (LSI) circuit. As an example of the LSI, FIG. 41 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when encoding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 encodes an audio signal and/or a video signal. Here, the encoding of the video signal is the encoding described in each of embodiments. Furthermore, the signal processing unit ex507 sometimes multiplexes the encoded audio data and the encoded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 6

When video data generated in the moving picture encoding method or by the moving picture encoding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. There is a problem that the power consumption increases.

Figure 42:
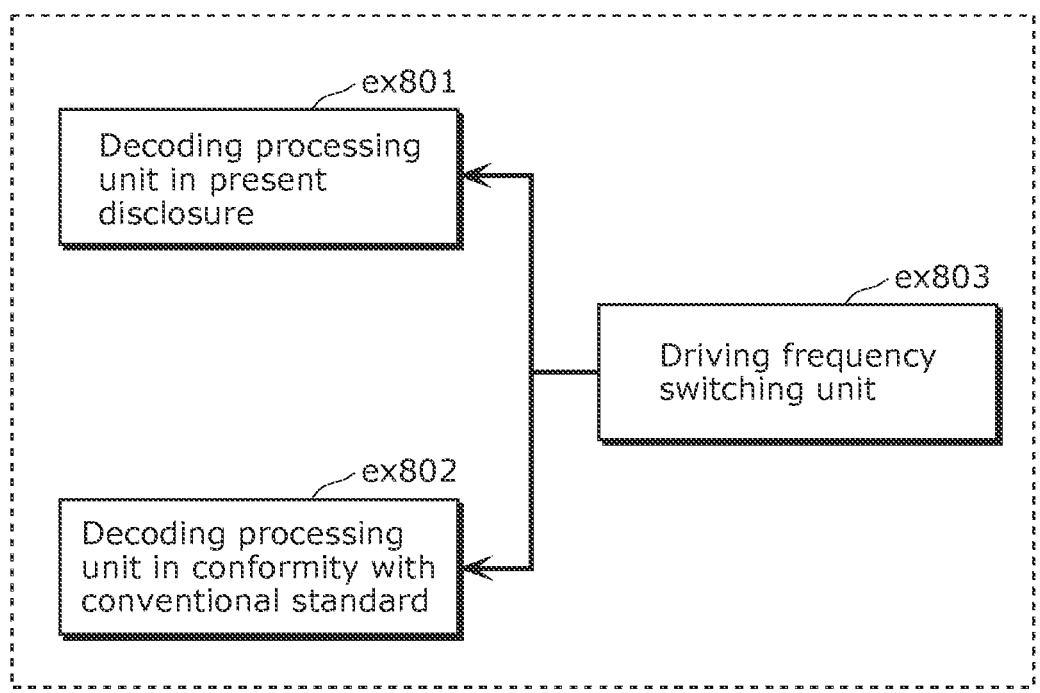
FIG. 42 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 42 illustrates a configuration ex800 in the present embodiment. A driving frequency switching unit ex803 sets a driving frequency to a higher driving frequency when video data is generated by the moving picture encoding method or the moving picture encoding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture encoding method or the moving picture encoding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 41. Here, each of the decoding processing unit ex801 that executes the moving picture decoding method described in each of embodiments and the decoding processing unit ex802 that conforms to the conventional standard corresponds to the signal processing unit ex507 in FIG. 41. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 4 is probably used for identifying the video data. The identification information is not limited to the one described in Embodiment 4 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 44. The driving frequency can be selected by storing the look-up table in the buffer ex508 and in an internal memory of an LSI, and with reference to the look-up table by the CPU ex502.

Figure 43:
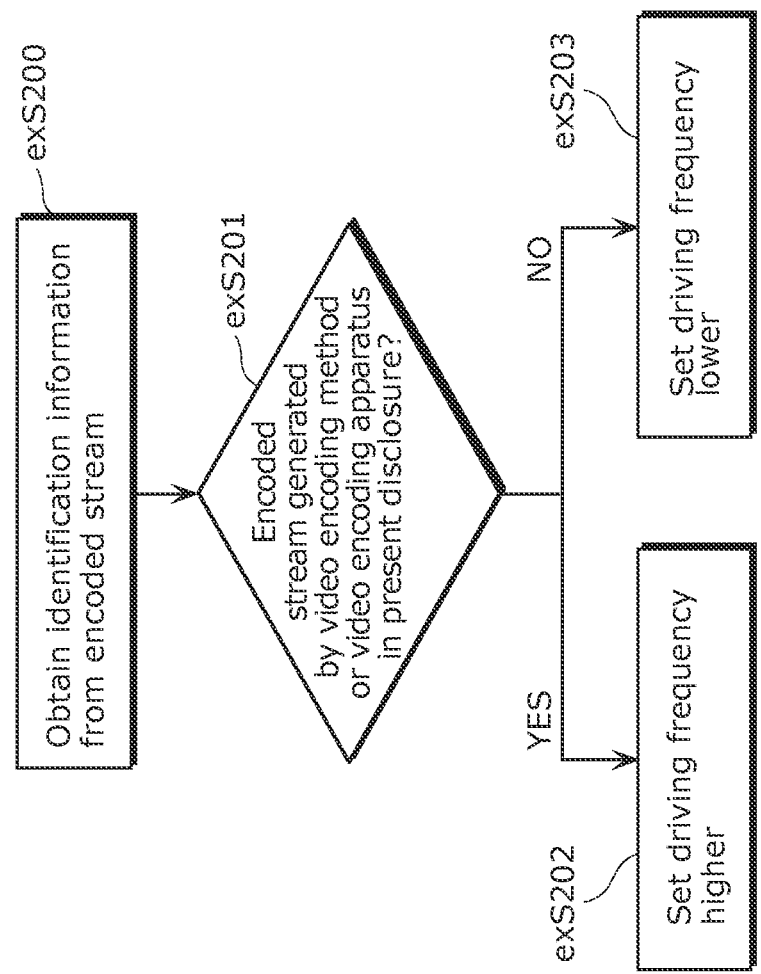
FIG. 43 shows steps for identifying video data and switching between driving frequencies.

FIG. 43 illustrates steps for executing a method in the present embodiment. First, in Step exS200, the signal processing unit ex507 obtains identification information from the multiplexed data. Next, in Step exS201, the CPU ex502 determines whether or not the video data is generated by the encoding method and the encoding apparatus described in each of embodiments, based on the identification information. When the video data is generated by the moving picture encoding method and the moving picture encoding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture encoding method and the moving picture encoding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture encoding method and the moving picture encoding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture encoding method and the moving picture encoding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture encoding method and the moving picture encoding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture encoding method and the moving picture encoding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 7

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 45A:
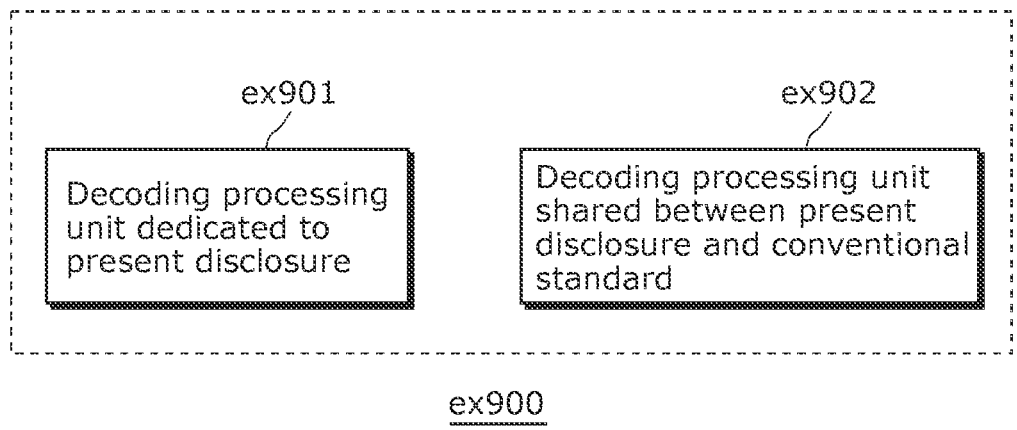
FIG. 45A is a diagram showing an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 45A shows an example of the configuration. For example, the moving picture decoding method described in each of embodiments and the moving picture decoding method that conforms to MPEG-4 AVC have, partly in common, the details of processing, such as entropy encoding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing which is unique to an aspect of the present disclosure and does not conform to MPEG-4 AVC. Since the aspect of the present disclosure is characterized by inverse quantization in particular, for example, the dedicated decoding processing unit ex901 is used for inverse quantization. Otherwise, the decoding processing unit is probably shared for one of the entropy decoding, deblocking filtering, and motion compensation, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 45B:
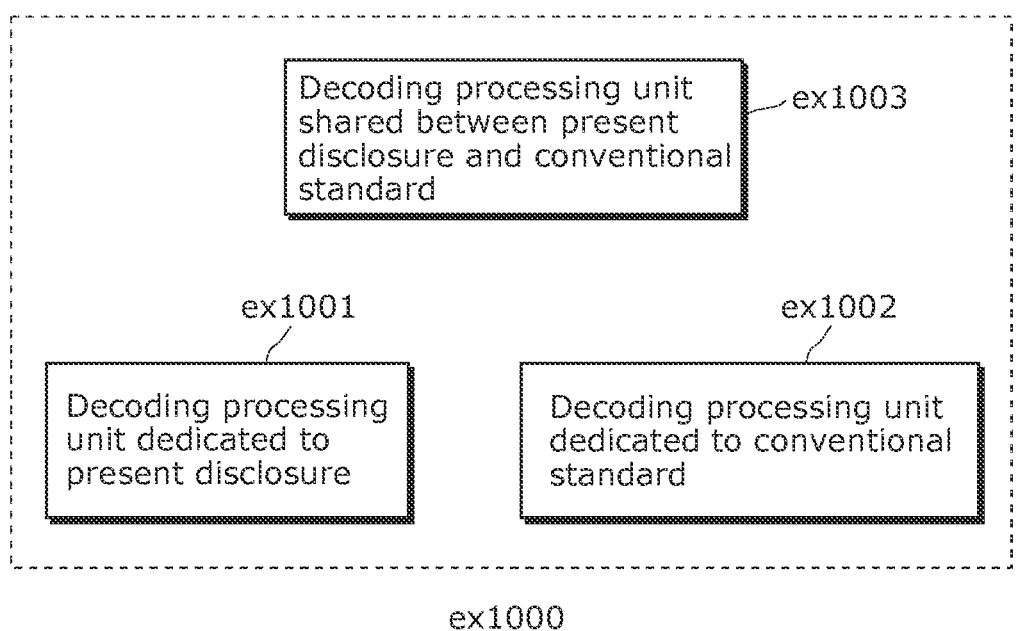
FIG. 45B is a diagram showing another example of a configuration for sharing a module of the signal processing unit.

Furthermore, ex1000 in FIG. 45B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The image encoding method and image decoding method according to one or more exemplary embodiments disclosed herein are applicable to a moving picture encoding method and a moving picture decoding method.

The invention claimed is:

1. A decoding method for decoding, on a block-by-block basis, an image included in a bitstream, the method comprising:
    dividing a current block that is a unit of decoding into a plurality of sub-blocks each of which is a unit of prediction;
    deriving, for each of the plurality of sub-blocks, one or more prediction information candidates each of which is a candidate for prediction information indicating a reference picture list, a motion vector, and a reference picture index;
    obtaining, from the bitstream, an index for selecting a prediction information candidate to be used for decoding the current block from among the one or more prediction information candidates; and
    decoding the current block using the prediction information candidate selected by the index,
    wherein the deriving includes:
    determining whether or not a neighboring block neighboring each of the plurality of sub-blocks is included in the current block, and when the neighboring block is not included in the current block, determining the neighboring block to be a reference block available to the sub-block, and when the neighboring block is included in the current block, determining the neighboring block not to be the reference block;
    deriving a prediction information candidate of the sub-block from prediction information of the reference block; and
    when a total number of the prediction information candidates is smaller than a predetermined number, generating one or more new candidates without using the prediction information of the reference block until the total number of the prediction information candidates reaches the predetermined number.

2. The decoding method according to claim 1,
    wherein the deriving of one or more prediction information candidates further includes:
    determining whether or not the neighboring block is (i) a block decoded by intra prediction, (ii) a block outside a boundary of a slice including the current block or a boundary of a picture including the current block, and (iii) a block yet to be decoded; and
    when the neighboring block is (1) not included in the current block, (2) not a block decoded by intra prediction, (3) not a block outside a boundary of a slice including the current block or a boundary of a picture including the current block, and (4) not a block yet to be decoded, determining the neighboring block to be the reference block.

3. The decoding method according to claim 1, further comprising
    determining a maximum number of the prediction information candidates,
    wherein the deriving of one or more prediction information candidates further includes:
    determining whether or not the total number of the prediction information candidates is smaller than the maximum number; and
    when the total number of the prediction information candidates is smaller than the maximum number, deriving the one or more new candidates each of which has a reference picture index for a picture that is available for decoding the sub-block.

4. The decoding method according to claim 1, further comprising:

generating a prediction picture of the sub-block using the prediction information candidate selected in the selecting.

5. A decoding apparatus which decodes, on a block-by-block basis, an image included in a bitstream, the apparatus comprising:
- a division unit configured to divide a current block that is a unit of decoding into a plurality of sub-blocks each of which is a unit of prediction;
- a deriving unit configured to derive, for each of the plurality of sub-blocks, one or more prediction information candidates each of which is a candidate for prediction information indicating a reference picture list, a motion vector, and a reference picture index;
- an index obtainment unit configured to obtain, from the bitstream, an index for selecting a prediction information candidate to be used for decoding the current block from among the one or more prediction information candidates; and
- a decoding unit configured to decode the current block using the prediction information candidate selected by the index, wherein the deriving unit is configured to:
- determine whether or not a neighboring block neighboring each of the plurality of sub-blocks is included in the current block, and when the neighboring block is not included in the current block, determine the neighboring block to be a reference block available to the sub-block, and when the neighboring block is included in the current block, determine the neighboring block not to be the reference block; and
- derive a prediction information candidate of the sub-block from prediction information of the reference block; and
- when a total number of the prediction information candidates is smaller than a predetermined number, generate one or more new candidates without using the prediction information of the reference block until the total number of the prediction information candidates reaches the predetermined number.

6. A decoding apparatus which decodes, on a block-by-block basis, an image included in a bitstream, the apparatus comprising:
- storage; and
- processing circuitry that is coupled to the storage and executes the decoding, wherein the decoding includes:
- dividing a current block that is a unit of decoding into a plurality of sub-blocks each of which is a unit of prediction;
- deriving, for each of the plurality of sub-blocks, one or more prediction information candidates each of which is a candidate for prediction information indicating a reference picture list, a motion vector, and a reference picture index;
- obtaining, from the bitstream, an index for selecting a prediction information candidate to be used for decoding the current block from among the one or more prediction information candidates; and
- decoding the current block using the prediction information candidate selected by the index, wherein the deriving includes:
- reading, from the storage, a neighboring block neighboring each of the plurality of sub-blocks;
- determining whether or not the neighboring block is included in the current block, and when the neighboring block is not included in the current block, determining the neighboring block to be a reference block available to the sub-block, and when the neighboring block is included in the current block, determining the neighboring block not to be the reference block; and
- deriving a prediction information candidate of the sub-block from prediction information of the reference block; and
- when a total number of the prediction information candidates is smaller than a predetermined number, generating one or more new candidates without using the prediction information of the reference block until the total number of the prediction information candidates reaches the predetermined number.

* * * * *